US008870010B2

(12) United States Patent
Buck

(10) Patent No.: US 8,870,010 B2
(45) Date of Patent: *Oct. 28, 2014

(54) CUP LID WITH INTEGRATED CONTAINER

(71) Applicant: Ronald Mark Buck, Encinitas, CA (US)

(72) Inventor: Ronald Mark Buck, Encinitas, CA (US)

(73) Assignee: Top-That!, LLC, Encinitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/733,153

(22) Filed: Jan. 3, 2013

(65) Prior Publication Data

US 2013/0119065 A1    May 16, 2013

Related U.S. Application Data

(63) Continuation-in-part of application No. 13/680,011, filed on Nov. 17, 2012, which is a continuation-in-part of application No. 13/360,707, filed on Jan. 28, 2012, now Pat. No. 8,381,935, which is a continuation-in-part of application No. 13/226,346, filed on Sep. 6, 2011, now Pat. No. 8,596,491.

(51) Int. Cl.
*A47G 19/22* (2006.01)
*B65D 21/036* (2006.01)
*B65G 51/28* (2006.01)

(52) U.S. Cl.
CPC .......... *B65G 51/28* (2013.01); *B65D 2231/022* (2013.01); *A47G 19/2222* (2013.01); *B65D 2203/00* (2013.01); *A47G 19/2205* (2013.01)
USPC ........ 220/23.83; 220/709; 220/212; 220/729; 206/217; 206/501

(58) Field of Classification Search
USPC ........ 220/4.01, 4.03, 4.27, 212, 254.3, 254.5, 220/259.1, 505, 521, 523, 709, 713, 840, 220/799, 23.83, 729; 206/217, 501, 514, 206/546; 426/112, 115, 120
See application file for complete search history.

(56) References Cited

U.S. PATENT DOCUMENTS 1,600,758 A    9/1926 Goldstein
1,665,289 A    4/1928 Weaver
(Continued)

FOREIGN PATENT DOCUMENTS

EP    1397986    3/2004

OTHER PUBLICATIONS

International Search Report Dated Mar. 19, 2013, 14 pages.
(Continued)

*Primary Examiner* — Fenn Mathew
*Assistant Examiner* — James N Smalley
(74) *Attorney, Agent, or Firm* — ARC IP Law, PC; Joseph J. Mayo

(57) ABSTRACT

Cup lid with integrated container(s) that couples with the top of a cup. The cup and cup lid form at least two containment volumes, Embodiments enable easy containment, inclusion of fresh food, transportation and access of solid or liquid in the container and cup without disengagement of the cup lid from the cup. Contents of the container may be accessed, partially consumed, replaced in the container and resealed at any time as desired by the user. Embodiments may employ a one-size-fits-all coupling element to couple any size container to the lower lid that couples with a cup. Simplifies eating and drinking from one unified container and cup in a theater or stadium having seats for example that provide one cup-holder per seat. Provides one free hand to hold a child's hand for safety while in stadiums and amusement parks.

25 Claims, 63 Drawing Sheets

(56) References Cited

U.S. PATENT DOCUMENTS

| | | | |
|---|---|---|---|
| 2,241,044 | A | 5/1941 | Knut |
| 3,288,344 | A | 11/1966 | Woollen |
| 3,323,706 | A | 6/1967 | Gereke |
| 3,413,128 | A | 11/1968 | Steinbarth et al. |
| 3,421,654 | A | 1/1969 | Hexel |
| 3,439,841 | A | 4/1969 | Irving |
| 3,616,897 | A | 11/1971 | Vrana |
| 3,679,089 | A | 7/1972 | Swett et al. |
| 3,817,419 | A | 6/1974 | Moller et al. |
| 4,054,205 | A | 10/1977 | Blow, Jr. et al. |
| 4,074,827 | A | 2/1978 | Labe |
| 4,091,953 | A | 5/1978 | Daenen |
| 4,380,307 | A | 4/1983 | Stillinger |
| 4,627,537 | A | 12/1986 | Rogers |
| 4,699,299 | A | 10/1987 | Gach |
| 5,145,646 | A | 9/1992 | Tyranski |
| 5,180,079 | A | 1/1993 | Jeng |
| 5,283,140 | A | 2/1994 | Netz et al. |
| 5,310,072 | A | 5/1994 | Matusovsky et al. |
| 5,318,787 | A | 6/1994 | Brauner |
| 5,402,903 | A | 4/1995 | Mann |
| 5,503,858 | A | 4/1996 | Reskow |
| 5,573,131 | A | 11/1996 | Berjis |
| 5,624,053 | A | 4/1997 | Freek et al. |
| 5,720,555 | A | 2/1998 | Elele |
| 5,743,423 | A | 4/1998 | Franco |
| D397,911 | S | 9/1998 | Waldmann |
| 5,954,195 | A | 9/1999 | Krueger et al. |
| 6,003,671 | A | 12/1999 | McDonough et al. |
| 6,079,586 | A | 6/2000 | Hanneman |
| 6,085,919 | A | 7/2000 | Singer |
| 6,119,884 | A | 9/2000 | Lowry |
| 6,164,485 | A | 12/2000 | Hilton |
| 6,209,748 | B1 | 4/2001 | Dunbar |
| 6,299,014 | B1 | 10/2001 | Nava et al. |
| 6,314,866 | B1 | 11/2001 | Melton |
| 6,338,417 | B1 | 1/2002 | Ferraro |
| 6,412,526 | B2 | 7/2002 | Castillo |
| 6,425,480 | B1 | 7/2002 | Krueger et al. |
| 6,427,864 | B1 | 8/2002 | Asselin |
| 6,528,105 | B1 | 3/2003 | Gerhart et al. |
| 6,557,698 | B2 | 5/2003 | Gordon |
| 6,641,854 | B2 | 11/2003 | Gerhart |
| 6,706,297 | B1 | 3/2004 | Toth et al. |
| 6,708,735 | B1 | 3/2004 | Kenihan |
| 6,793,075 | B1 | 9/2004 | Jeter |
| 6,932,231 | B2 | 8/2005 | Haynes |
| 7,063,229 | B2 | 6/2006 | Westerhof et al. |
| 7,111,748 | B2 | 9/2006 | Cha |
| 7,159,732 | B2 | 1/2007 | Smith et al. |
| 7,217,434 | B1 | 5/2007 | Loh et al. |
| 7,387,063 | B2 | 6/2008 | Vu et al. |
| D590,662 | S | 4/2009 | Cheng |
| 7,588,275 | B2 | 9/2009 | Borg |
| 7,594,584 | B2 | 9/2009 | Durdon et al. |
| 7,721,911 | B2 | 5/2010 | Chou |
| D635,855 | S | 4/2011 | Smith et al. |
| D637,079 | S | 5/2011 | Brown et al. |
| 8,006,854 | B2 | 8/2011 | Waugh |
| 2001/0035417 | A1 | 11/2001 | Kantor et al. |
| 2003/0089714 | A1 | 5/2003 | Dart et al. |
| 2004/0050724 | A1 | 3/2004 | Grul et al. |
| 2004/0050847 | A1 | 3/2004 | Yoon |
| 2004/0084452 | A1 | 5/2004 | Hsieh |
| 2004/0089662 | A1 | 5/2004 | Smith et al. |
| 2004/0149755 | A1 | 8/2004 | Olivar |
| 2004/0182862 | A1 | 9/2004 | Scott |
| 2005/0035011 | A1 | 2/2005 | McRobbie |
| 2005/0115845 | A1 | 6/2005 | Cho |
| 2005/0178677 | A1 | 8/2005 | Morrow |
| 2005/0178688 | A1 | 8/2005 | Hasson |
| 2005/0199639 | A1 | 9/2005 | Tucker et al. |
| 2005/0205437 | A1 | 9/2005 | Huffman et al. |
| 2005/0269328 | A1 | 12/2005 | Crider et al. |
| 2006/0060589 | A1 | 3/2006 | Lee |
| 2006/0096983 | A1 | 5/2006 | Patterson |
| 2007/0029322 | A1 | 2/2007 | Durdon et al. |
| 2007/0278122 | A1 | 12/2007 | McCumber |
| 2008/0023503 | A1 | 1/2008 | Freeman |
| 2008/0099481 | A1 | 5/2008 | D'Amato |
| 2008/0230541 | A1 | 9/2008 | Bayss et al. |
| 2009/0065377 | A1 | 3/2009 | Olomi et al. |
| 2009/0206089 | A1 | 8/2009 | Mueller |
| 2009/0250479 | A1 | 10/2009 | Kaufman et al. |
| 2009/0272390 | A1 | 11/2009 | Blondeel |
| 2011/0114643 | A1 | 5/2011 | Bogdziewicz |
| 2011/0168719 | A1 | 7/2011 | Lotterhos |
| 2011/0198351 | A1 | 8/2011 | D'Amato |
| 2011/0198355 | A1 | 8/2011 | Mullen |
| 2011/0210126 | A1 | 9/2011 | Vovan |
| 2011/0248033 | A1 | 10/2011 | Mehrvijeh |
| 2011/0266295 | A1 | 11/2011 | Yacktman |
| 2011/0284537 | A1 | 11/2011 | Cerasani |

OTHER PUBLICATIONS

International Preliminary Report on Patentability and Written Opinion received for PCT Application No. PCT/US2012/054032, dated Mar. 20, 2014, 10 pages.

International Search Report and Written Opinion issued for PCT Appl. No. PCT/US2013/070630, dated Mar. 13, 2014, 6 pages.

International Search Report and Written Opinion issued for PCT Appl. No. PCT/US2013/070632, dated Mar. 13, 2014, 6 pages.

International Search Report and Written Opinion issued for PCT Appl. No. PCT/US2014/010181, dated Apr. 24, 2014, 7 pages.

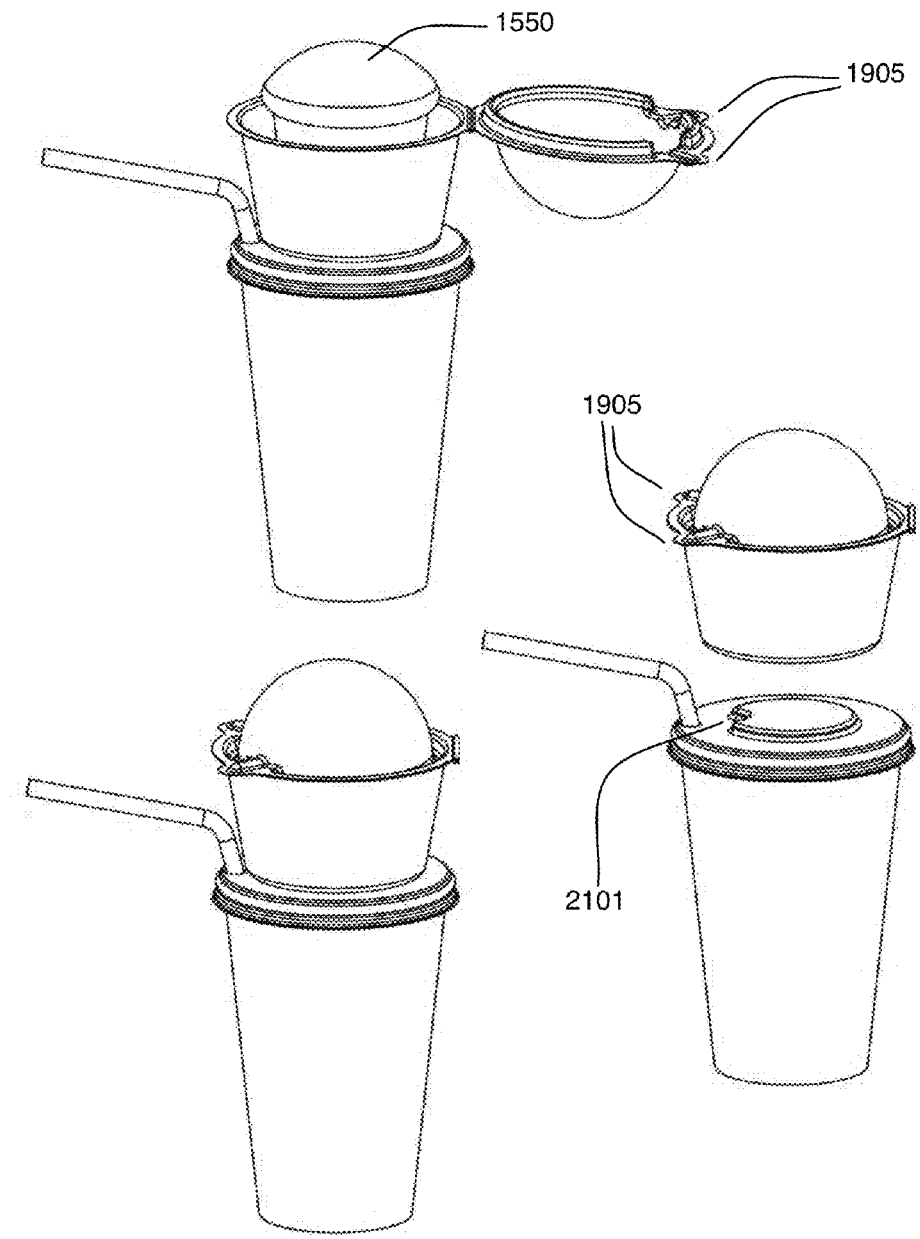

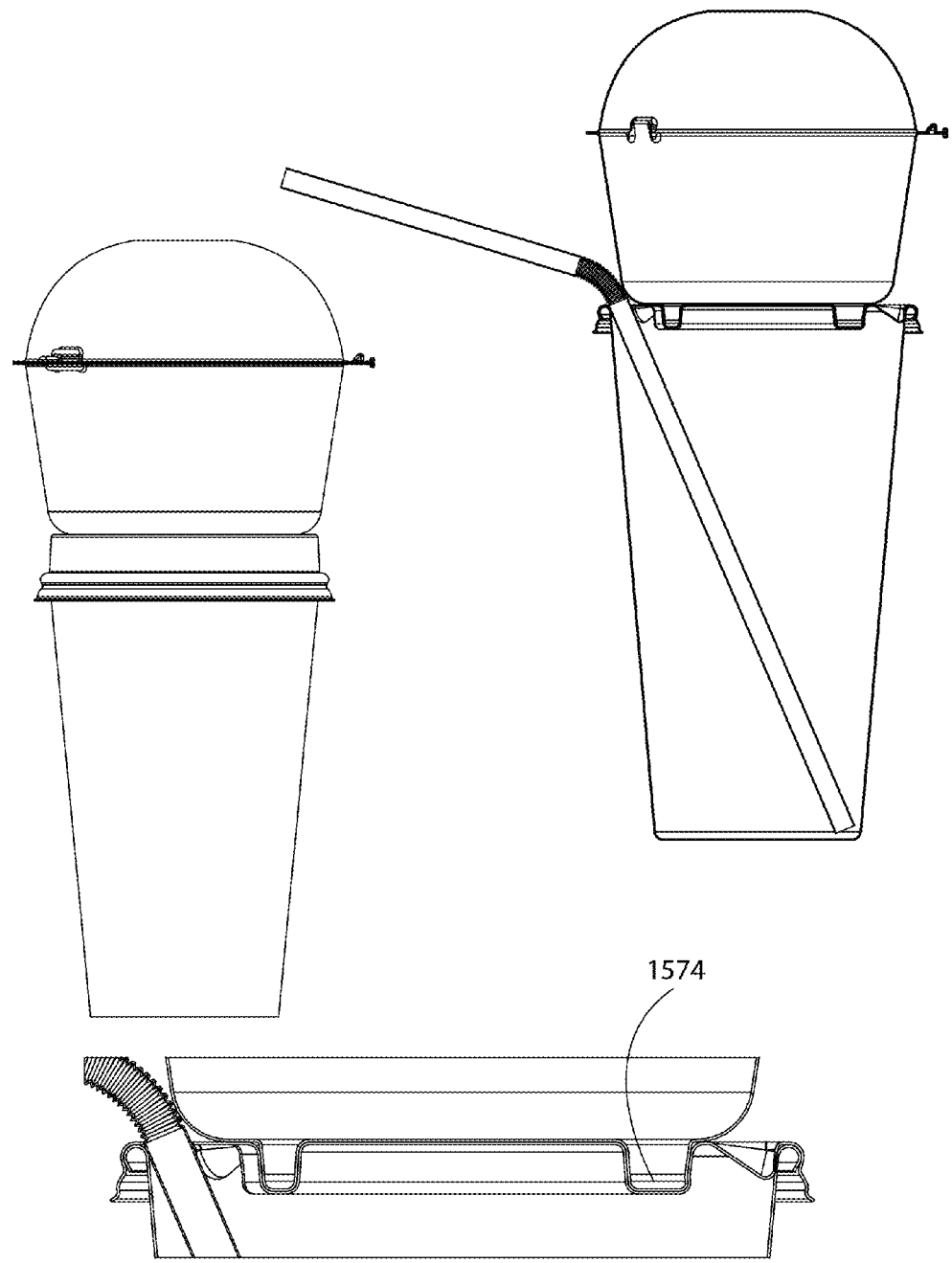

FIGURE 20B
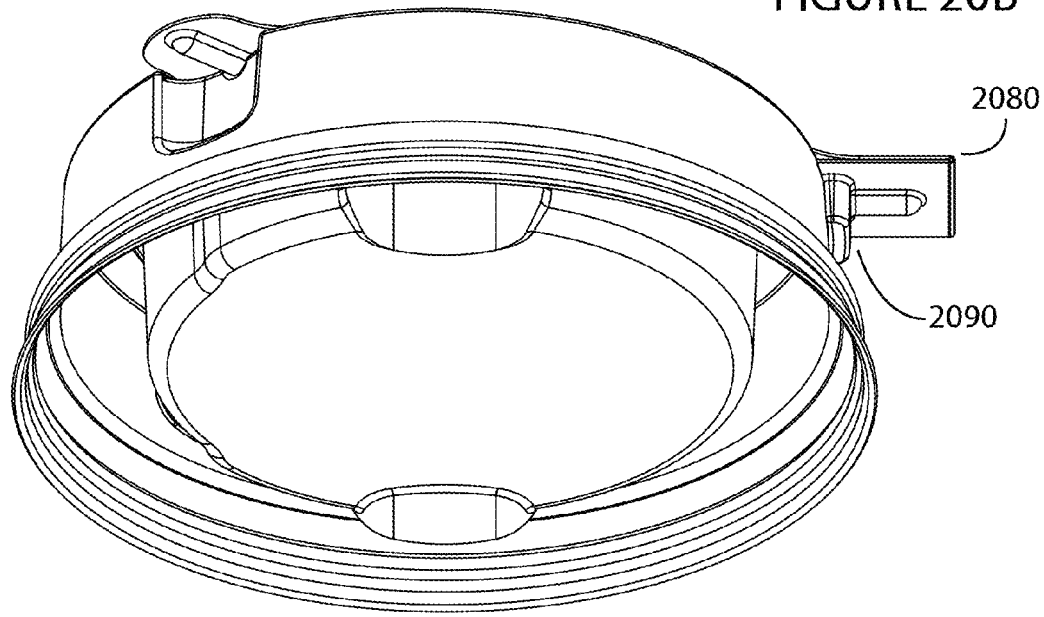
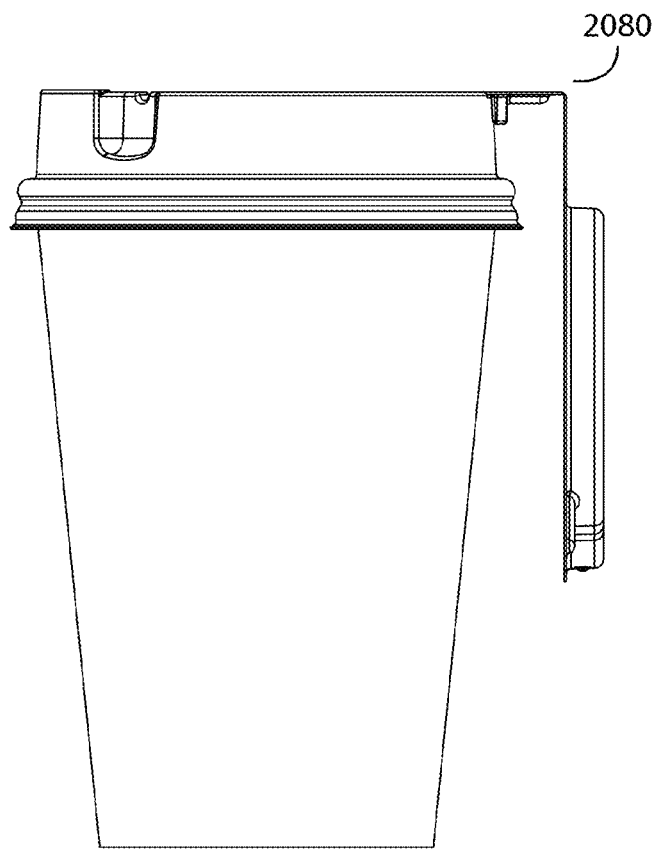

FIGURE 31
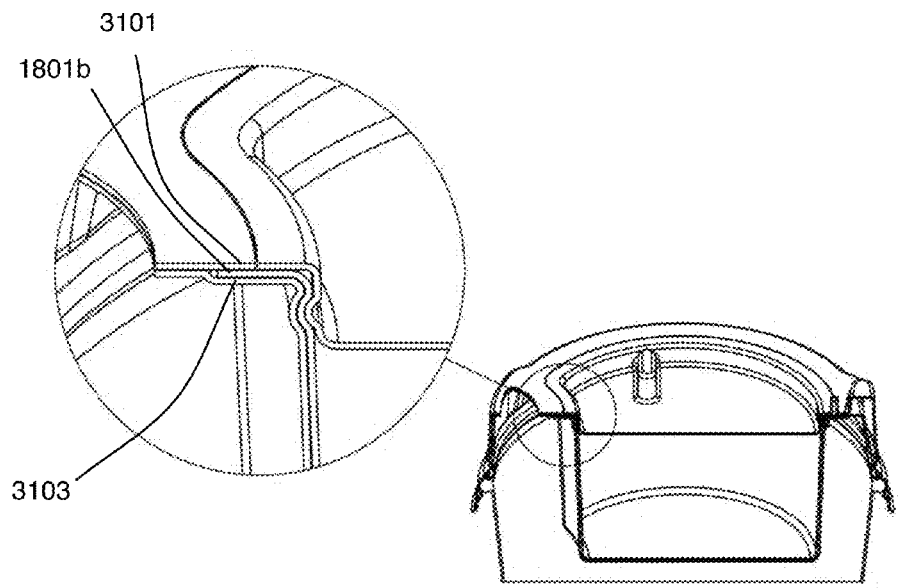
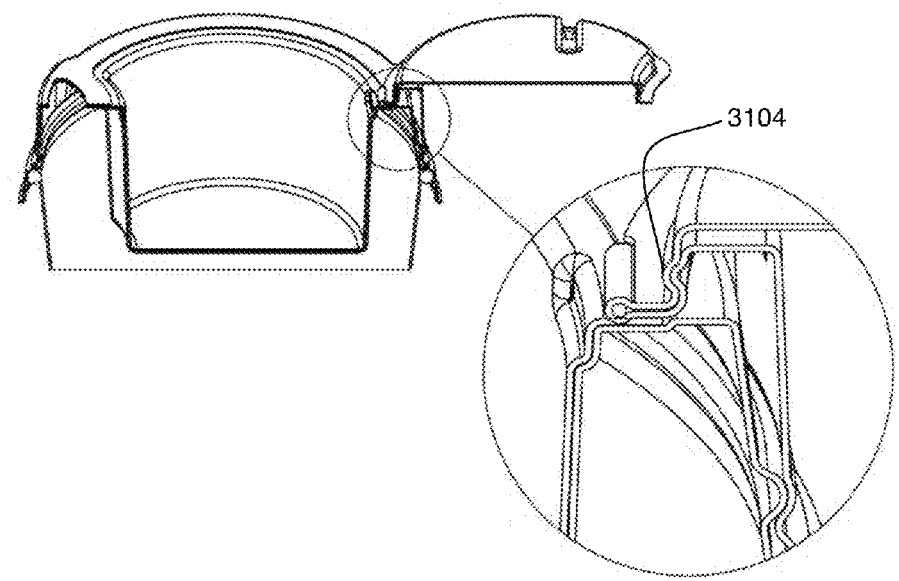

FIGURE 42
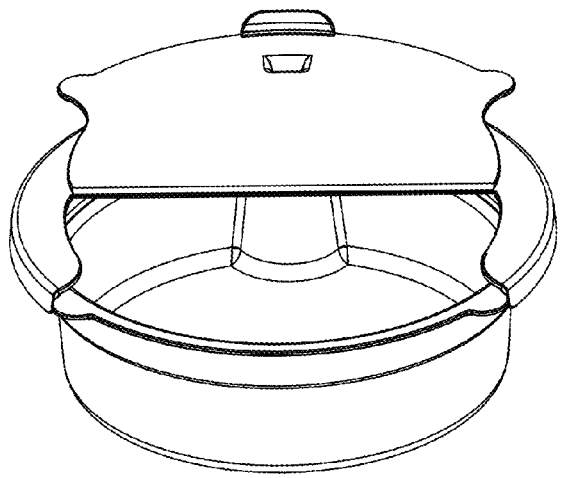
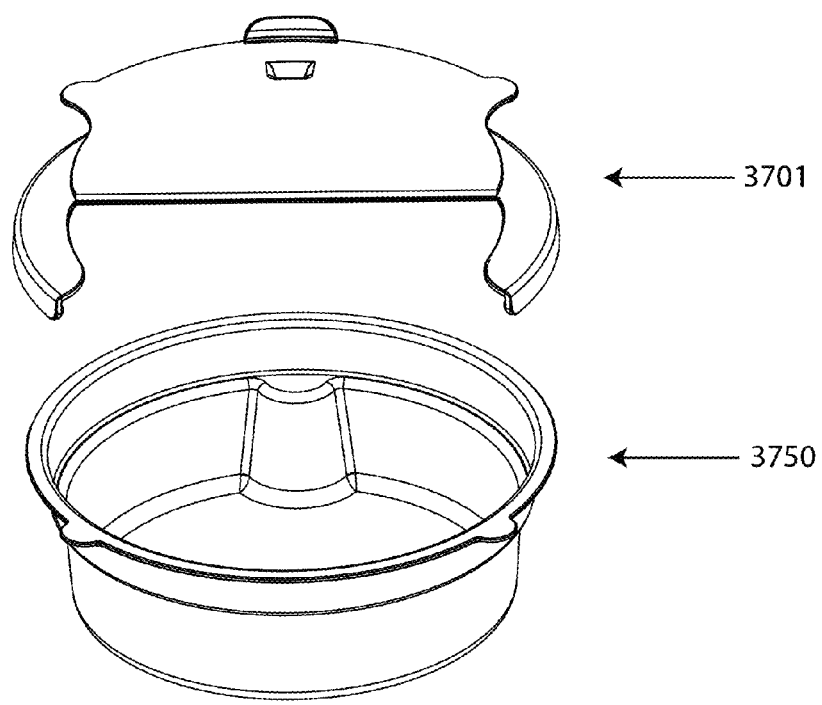

FIGURE 43
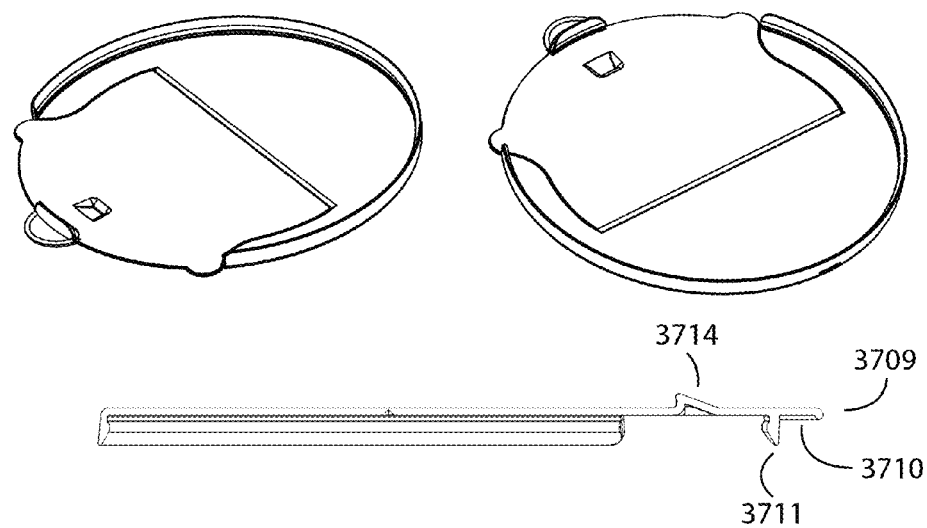
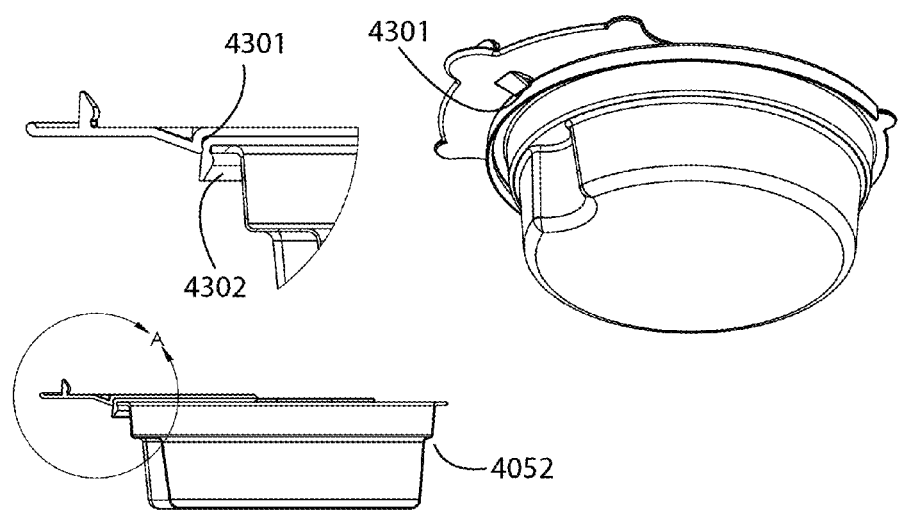

FIGURE 46
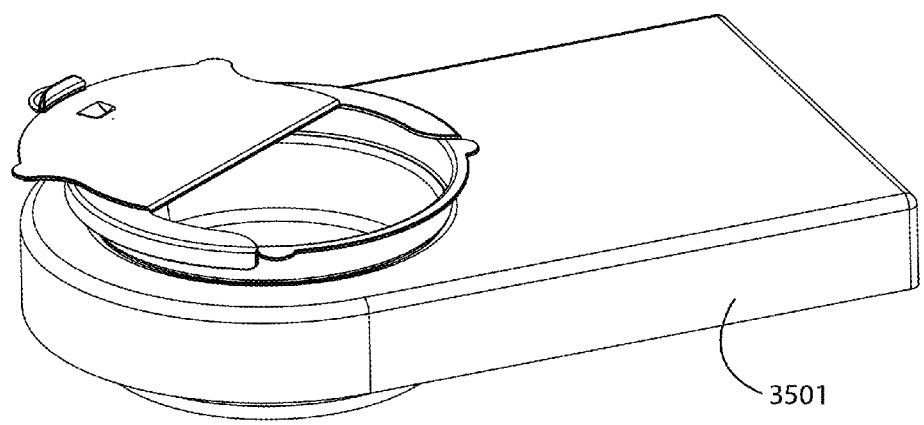
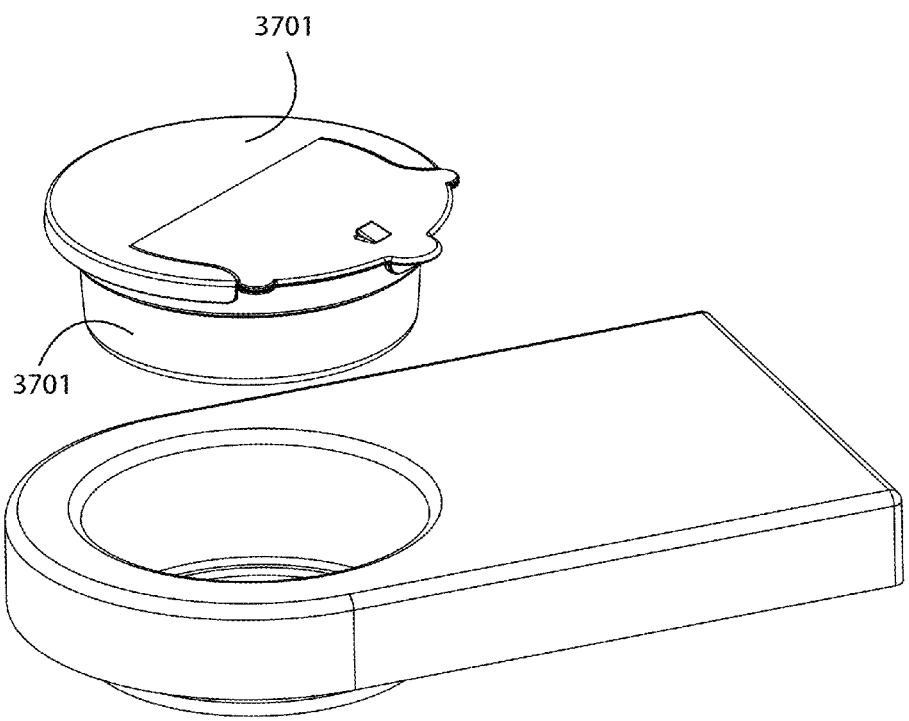

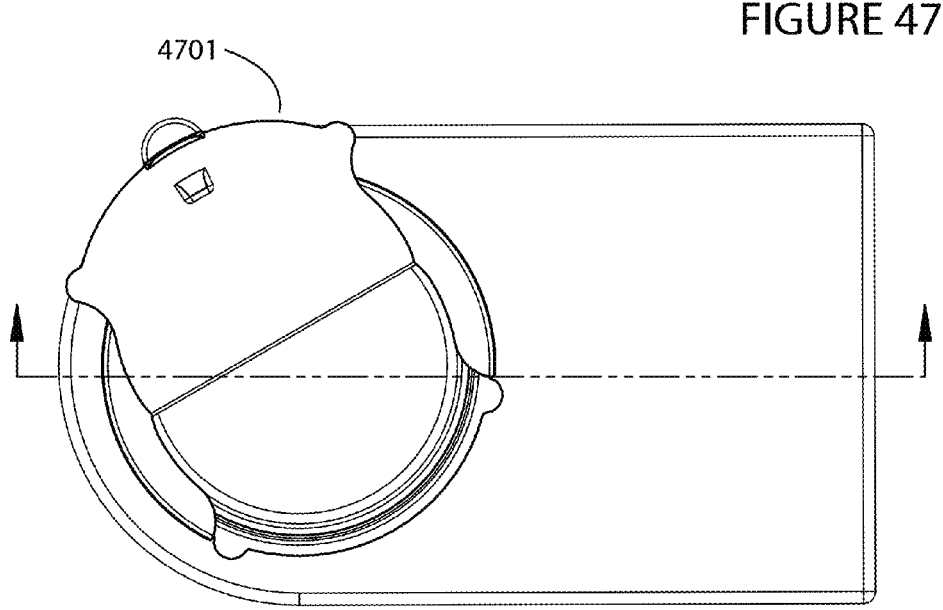
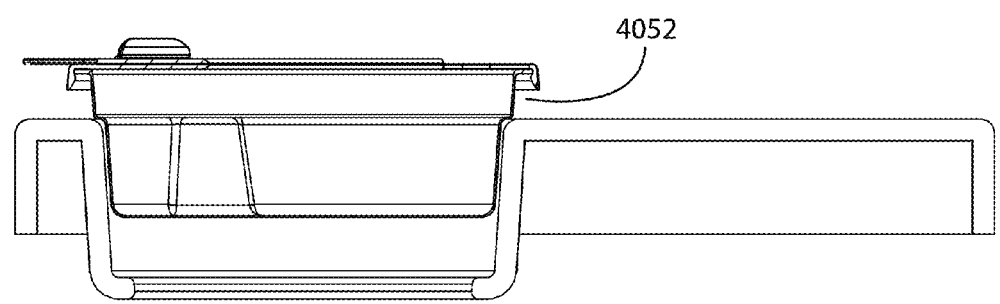
FIGURE 47

CUP LID WITH INTEGRATED CONTAINER

This application is a continuation in part of U.S. Utility patent application Ser. No. 13/680,011, filed 17 Nov. 2012, which is a continuation in part of U.S. Utility patent application Ser. No. 13/360,707, filed 28 Jan. 2012, which is a continuation in part of U.S. Utility patent application Ser. No. 13/226,346, filed 6 Sep. 2011, the specifications of which are hereby incorporated herein by reference.

BACKGROUND OF THE INVENTION

1. Field of the Invention

One or more embodiments of the invention are related to the field of containers. More particularly, but not by way of limitation, one or more embodiments of the invention enable a cup lid with integrated container that enables for example simultaneous or intermittent access of the contents of the container and attached cup without disengagement of the cup lid from the cup. Additionally, an independent drop-in container may reside within the cup lid cavity such that after partially consuming the contents of the independent drop-in container it may be resealed with an additional lid and removed from the lid cavity and transported to another location such as a car or home.

2. Description of the Related Art

Standard cup lids are simple covers that do not include an integrated container. Rather, known lids cover the contents of a cup which forms a closed container in combination with the cup itself. Known containers that couple with cups include food containers that fit onto the top of yogurt cups for example. Known containers have to be removed from the yogurt cup and then flipped over and opened before the contents of the container and cup may be accessed. It is generally not possible to access the contents of the cup while also accessing the contents of the container without first disengaging the container from the cup. Additionally, food containers that attach to yogurt cups in an upside-down position have a limited food-volume capacity. In such cases, as the yogurt example shows, the food-container walls narrow as they proceed upward toward the bottom of the upside down container. Other known devices having a container or shelf combined with a lid have limitations, which makes these devices impractical to use. One category of devices includes a container combined with a cup, but utilizes a hole in the middle of the lid. This makes it impossible to store relatively circular items, i.e., non-ring or non-annular items having no central hole, in the container, such as hamburgers, cookies or muffins for example. Another category of device includes a container combined with a lid, but does not allow for simultaneous access of the contents of the cup and the container at the same time, and does not allow for the container to be resealed or a drop-in container to be removed from the container. Other devices that include drop-in functionality require removal of the container before accessing the contents of the cup. Yet these devices do not contemplate a drop-in container that is configured to fit into the arm rest of a movie theater seat. Other devices have relatively small peel containers for pills such as mints and are not suitable for larger food items. Another category of devices utilizes dividers in the cup with access on each side of the cup. None of the known devices enable a container to be disengaged from the lid of the cup while retaining the lower lid on the cup. No known devices have a non-permanent or male/female bottom oriented coupling system for coupling a container with the lid. Furthermore, there are no known rotational covers that enable or disable access to the liquid and/or solid in the cup as desired by the user.

Known containers that couple with bottles include gift containers that fit onto the top of bottles for example. It is generally not possible to access the contents of the bottles while also accessing the contents of the gift containers without disengaging the gift container from the bottle and then disengaging the lid of the bottle.

Thus simultaneous or intermittent access of the contents of known cups or bottles and of the contents of an attached container is not possible. This makes for difficult drinking/eating coffee, soda, snacks, popcorn, etc., in malls, fast food restaurants, theaters, amusement parks, sports stadiums or in any other venue. For example, this makes it difficult to eat and drink food in a theater or stadium with one cup-holder per seat.

For at least the limitations described above there is a need for a cup lid with integrated container.

BRIEF SUMMARY OF THE INVENTION

One or more embodiments described in the specification are related to a cup lid with integrated container. Embodiments of the cup lid generally provide a cavity, compartment or closed space, wherein the cup lid is configured to couple with the top of a cup. One or more embodiments may include volumes that extend to, into, out of, or both into and out of the plane defined by the circular top of the cup. In this manner, the cup and lid form at least two containment volumes, one volume formed by the bottommost portion of the cup lid and the inner walls of the cup, and another volume within the upper cup lid itself. In relation to the volume within the lid, the contents within this volume may be accessed, partially consumed, replaced (such as a cookie), and resealed within the volume through various secondary lid configurations and this may be done at any time as desired by the user. Embodiments of the invention enable easy containment, inclusion of fresh foods, transportation and simultaneous or intermittent access of solid or liquid in the container with solid or liquid held in the cup, without requiring disengagement of the cup lid from the cup. Additionally, a separate and independent drop-in/removable pre-sealed container may reside within the cup lid cavity such that after removing the pre-sealed cover and partially eating from a movie theater cup for example the user can then reseal the independent container and remove it from the lid cavity and take it to another location such as a car or home.

Embodiments of the invention may be made to fit any cup size, for example a paper coffee cup, and may be quickly attached and removed from the cup. Embodiments may be constructed from vacuum, thermal or injection molding techniques or in any other manner as desired. Any type of material may be utilized in the construction of one or more embodiments of the invention, for example plastic or polymer. One such plastic may be clear or opaque or any level of translucency. Materials may be chosen for strength and function as required. Common thermosetting polymers include epoxy and phenolic materials. Thermoplastic materials that may be utilized include polypropylene, nylon, polyethylene and polystyrene for example. Alternatively, additional configurations may utilize paper, hard-molded plastic, ceramic, metal (for example, stainless steel), and silicon. Coffee cup lids are generally white or black while most soda or drink-cup lids are clear. Any colors or color combinations may be used. One or more embodiments may utilize components of different translucent values, for example a bottom compartment of the container may be white, while the seal-on/peel-off cover or press-on friction cover portion of the container may be clear so that the contents of the container may be viewed without opening the container. The cavity may contain a thermal liner, for example Styrofoam for cold items such as ice cream or frozen yogurt or alternatively for hot items such as sliders, hamburgers, chili or soup. The cavity may contain a paper liner with an optional ruffled edge to act as a barrier between a cookie for example and the plastic which forms the inner wall of the lid cavity. The cavity may include a single or double wall for extra insulative effect or for any other reason. Thermal sensitive plastics, for example thermochromics may also be utilized to show how hot or cold the item in the container is. These types of plastics change color for example based on their temperature. Graphic symbols, for example bar codes, arrows and/or letters or any other informative element that for example read "Caution Contents Hot", may be displayed for example when the thermochromic is hot, for example in Red, wherein the letters would not be shown otherwise, or would be shown in Blue for example if the contents of the container were not hot. These colors are exemplary and any color including transparent may be chosen to represent hot and cold in any embodiment of the invention. For embodiments that do not utilize thermochromic materials, any graphical symbols or lettering may be utilized to warn or inform a potential user. Graphical symbols and/or lettering may be placed on the cover or sides, or inside of the container or in any other area that may be viewed or touched, including but not limited to the cover for example. Graphical symbols and/or lettering may include logos, advertisements, bar codes, puzzles, promotions, trivia or any other type of information that is viewable and may include tactile information including Braille.

The vertical dimension of the cavity may vary from a low, for example about a half an inch when the container is configured to hold a cookie, to a medium, for example about one and a half inches when the container is configured to hold a doughnut, or high, for example, up to or more than four inches when the container is configured to hold frozen yogurt, ice cream, a hamburger, French fries, or a sandwich. As one skilled in the art will appreciate, any desired dimension of the container may be utilized as desired for the particular application. The horizontal dimension of the container may be of a width less than, equal to, or greater than the diameter of the cup measured across the plane formed by the top of the cup opening. When the horizontal dimension of the container is less than the diameter of the cup opening, then the vertical offset of the dimension may extend downward into the main volume of the cup. Other embodiments enable containers having a horizontal dimension less than, equal to, or greater than the diameter of the cup opening to reside on top of the plane defined by the cup opening. Other embodiments of the container may include portions having a smaller horizontal dimension to extend into the main volume of the cup and a portion of the container that is smaller, equal to, or larger that also extends above the plane defined by the cup opening. Embodiments may be constructed from one or more parts. In the case of an embodiment having a container that extends above, and in some instances, below, the horizontal plane of the cup top, two elements may be fused or permanently bonded together for example, or molded or formed as a single unit may be two separate units that clip or lock together, e.g., through mating parts, or in any other manner. The shape of the container may be of any type, circular, oval, triangular, square or a polygon of any number of sides, or any other shape.

One or more embodiments of the invention may optionally include indented cut-outs to facilitate lifting of the item or items from within the cavity. For example, an embodiment with at least one indented cut-out allows for a finger to be inserted into the cavity in order to provide a lifting force to the item in the cavity. More than one indented cut-out for example may be employed so that opposing locations in the cavity may be employed to lift the item from the cavity as desired. Indented cut-outs can also be integrated such that uniform or level stacking may be achieved for ease of storage. Embodiments having three indented cut-outs, for example, stack evenly regardless of initial positioning; however, this is merely an exemplary embodiment, as other embodiments may be formed to readily stack as desired.

One or more embodiments of the invention may employ a hole such as a sip/gulp hole or straw hole for example, so that liquid in the cup may be accessed without removing the container. Any shape of hole or any shape straw, i.e., oblong from a cross-sectional view, for any purpose may be utilized as desired. Embodiments employing a hole may make use of a hole in the horizontal top surface of the container, or at the base of the container in the horizontal surface adjacent to the outer perimeter of the cup lid, when the container bottom is sufficiently smaller than the diameter of the cup rim, or on a vertical wall of the container for example, so that oversize containers may be utilized that, for example, have a larger diameter than the diameter of cup rim. For example, one embodiment of an oversize container allows for a hamburger or French fries to be placed on top of a soda or beer cup. In this latter configuration, a tri-bend straw is provided to effectively follow the contour of a larger container, located directly above, before heading diagonally upward toward the user.

Although the top container may be heat fused or permanently bonded to the cup lid, or made from a single molded or thermal-formed unit, for example, in the case of the large container configuration where the straw exits the vertical side wall, the large container may clip or couple to the cup lid below via a bottom oriented male/female coupling system or a vertical wall male/female ridge coupling system. Such clip, ridge or coupling systems as mentioned here provide for removal and reattachment of the top container to the cup lid, as desired by the user.

Embodiments of the invention may utilize a lid to cover the container, wherein in effect, a cup that is coupled with an embodiment of the invention effectively has two lids, one for the container and one formed by the container with the cup. To avoid confusion, "cover" as utilized herein refers to the lid for the container. Embodiments of covers include seal-on/peel-off, press-on, i.e., external and/or internal wall friction, press-on friction dome, rotational, hinge, clamshell, or swivel types of covers. Seal-on/peel-off covers may be configured using a thermal bonding process of similar or compatible materials (foil is an example of one option, and if a plastic or plastic composite, i.e., more than one layer, is utilized, any opacity or transparent or translucent characteristic may be utilized as desired), or may utilize an adhesive that allows the cover to be removed permanently or temporarily (cover may be resealed to the cup lid with cavity or the independent drop-in/removable container as desired), depending on the adhesive, to access the cavity. Seal-on/peel-off covers may be optionally scored such that only a specific portion of the entire lid is removed when pulling or lifting the removal tab. Press-on friction covers are generally plastic covers that may be removed and placed back on the cavity, for example, when placing fresh foods such as cookies within the cavity, or if the contents of the container have not all been removed. Seal-on/peel-off and press-on friction covers may be utilized in combination, so that after the press-on friction cover and seal-on/peel-off covers are removed, exposing the contents of the container, then the press-on friction cover may be placed over the container again to enclose the contents of the container for example. Press-on friction dome covers for example may also include a hole on top that enables a spoon, fork or other utensil such as chopsticks or any other utensil to access food within the container, such as frozen yogurt or fruit. Press-on friction covers may also include an adjustable open/close sip-hole or straw hole. Press-on external and/or internal wall friction covers may engage or couple in any manner that utilizes friction for the coupling. Press-on friction type covers may be implemented with a flat portion that is hinged at any peripheral location of the container that allows the lid to flex open in a clamshell fashion, exposing the contents of the container, while retaining the cover such that it remains attached to the exterior wall of the container. Lids or covers that act to contain the contents of the lid container/cavity are optional, such that the contents may reside within the lid container/cavity without a cover as to enable immediate access to the contents.

Items suitable for placement within the container include solids or liquids. For example, items may include any combination of one or more solid and/or liquid alone or in combination. Example items include one or more cookies, doughnuts, chocolates, chips, crackers, nuts, popcorn, candies, ice cream, frozen ice, ice coffee, frozen yogurt, cream, water, soda or coffee, fruit pieces, burgers, French fries, sandwiches, or any other solid or liquid. Items that may be sealed in and stored for use or purchase may be refrigerated after sealing if necessary, or items that are selectively prepared or fresh can be placed into the container and may utilize the press-on friction cover embodiment if desired based on the particular application.

Embodiments of the invention allow for one-handed transportation and simultaneous or intermittent access of the contents of the cup and container without disengaging the cup lid from the cup. Although, as specified here within, a clip-on male/female coupling system of engagement of the container to the lid below may be utilized, which allows the user to remove or reattach the top container as desired. Additionally, the contents of the lid container may be accessed, and partially consumed, then replaced within the container (a cookie for example) and resealed through various secondary lid configurations at any time as desired by the user. A movie theater configuration enables an independent drop-in container to reside within the cup lid cavity such that after partially consuming the contents of the independent drop-in container, it may be resealed with an additional lid and removed from the cup lid cavity and transported to another location such as a car or home. Independent drop-in pre-sealed cup style containers are extremely efficient and compatible with various configurations described herein due to the fact that after automated machinery (such as Oyster machinery) fills and seals these containers, they can then be easily transported to any location and then simply dropped into the lid cavity as specified per configuration as set forth herein. Various embodiments allow for ease of carrying and drinking/eating coffee, soda, cookies, snacks, etc., in malls, fast food restaurants, theaters, amusement parks, sport stadiums or in any other venue. For example, this allows a parent in an amusement park to carry food and beverages at the same time with one hand, while providing one hand free to hold the hand of a child for safety. In addition, embodiments of the invention simplify eating and drinking by combining these processes into one container and cup, which is significantly more convenient in theaters or stadiums having seats, for example, which provide a single cup holder per seat.

With respect to the movie theater/armrest embodiment, or general soda or drink embodiment, embodiments may employ a flap-style lid to provide convenient access and reclosure of items in the container. Specifically, one or more embodiments of the invention enable a primary clip-on top cover with an integrated secondary flap-style lid configured within the top horizontal surface of the primary top cover where additionally the flap-style lid intersects and cuts through the outer diameter edge of the top primary cover. The straight score-line hinge of integrated flap-style lid may be located anywhere in the top horizontal surface of the primary cover, however in one embodiment, the location is proximal to the diagonal midpoint of the primary top cover. The sides of the flap-style lid that cut through the top horizontal surface and outer diameter of the primary cover may be curved or straight, while the front leading edge of flap-style lid is substantially arched to match the outside diameter of the primary top lid. The downward vertical clip-on lip (of the top primary cover) does not extend between the two points where the flap-style lid intersects with the outer diameter of the primary cover in one embodiment. Additionally as a result of the flap-style lid having a straight score-line hinge located proximal to the diagonal midpoint of the primary cover, this means that when the flap-style lid is in the open position, the open half of the lid folds back over the back half of the lid such that the majority of the two halves overlap, which leaves only a small portion of the open half of the lid overhanging past the outer diameter edge of the primary cover. In movie theaters it is important that lids do not substantially overhang past the outer diameter of the cup rim or primary cover, because in these environments people are coming and going and space is tight and limited such that the possibility of bumping into overhanging lids is magnified or increased. The flap-style lid enables the drop in container to be reclosed and then removed from the movie theater cup or arm rest and put a jacket pocket or purse where at a later time the container may be removed again and placed in a car cup holder or any other desired location. Movie theater cups are large, oversized and clumsy for most outdoor activities. Thus, by resizing the cup to a standard soda or drink cup size, additional venues such as fairs and amusement parks may be accessed. To resize the cup, the mid-portion of the cup may be made to fit the average size hand while the top portion of the cup may flair outward toward a wide top opening. At the midpoint in the vertical wall where the top portion begins to flair outward, this point may be utilized to determine a fill-line for the beverage that will be poured into the cup. Flaring the top portion of the cup outward means the drop-in container may retain its original large movie theater container size. A large diameter drop-in container is paramount for marketing and sales where it is important to project a visual image of a large amount of candy or snacks within the container. Similar strategies are currently used in movie theaters where large candy boxes are used to project the idea of a large amount of candy.

One or more embodiments that couple to the lid of a drink cup are configured to hold a large donut, bagel, sandwich or burger. These embodiments may optionally employ a recessed half-circle indicator that may include an arrow located in the top horizontal wall of the hinge cover of the container that is coupled to a coffee or teacup or cold drink cup. Additionally, there is a recessed coupling alignment indicator arrow in the top horizontal wall of the lower lid container that may also be utilized to show the direction in which to align the container with the lower lid container. In one or more embodiments, the container may couple with various sizes of cups, wherein the lower lid container includes a coupling element of a particular size while various size containers include a bottom coupling element of a corresponding size, i.e., universal size independent of cup size, that couples the container to the lower lid container. Any embodiments described herein may utilize frictional coupling in keeping with the spirit of the invention.

In one or more embodiments, that couple to the lid of a drink cup, a tri-bend straw may be utilized to access material from the cup at the outside of the lower lid container via a channel. This enables access of the cup contents independent of the size of the container utilized in combination with the cup.

In one or more embodiments, relating to theater, amusement park or any other locality having seats with armrests configured to hold a cup for example, there is a singular half-circular shaped lift tab at the mid-point of the front leading edge of the integrated flap-style lid. The half circular shaped lift tab may include a strength rib on the bottom side that follows the outer diameter of the lift tab. Additionally the strength rib has rounded edges that add comfort for the user. Below the lift tab (at the back edge of the lift tab) there is a downward vertical wall clip-on element for securing the flap-style lid to the container lip edge located directly below. There are two small half circular tabs, for example one located at each side of the curved front leading edge of the flip-style lid. These tabs match the directional/alignment tabs integrated into the container lip that is located directly below, and additionally act as visual aids for orienting of the top primary cover.

In one or more embodiments, relating to theater, amusement park or any other locality having seats with armrests configured to hold a cup for example, a clip-on element is located centrally on the top horizontal surface of the integrated flap-style lid. This holds the flap-style lid in the open position by securing it to the primary cover via the clip-on element that clips into a small clip-on trough that is located in the outer surface of vertical wall that forms the lip of the primary cover. There is a slant-wall receiving edge integrated into the bottom portion of the downward vertical clip-on lip of the primary cover. The slant-wall slants diagonally downward and outward from the interior lip wall and allows the primary cover to be easily attached to the container to lip edge.

Embodiments of the invention may employ an optional Seal-On/Peal-Off Layer. The optional Seal-On/Peal Off layer may include a removal tab, and in one or more embodiments, additionally there is a laser or die scored shape that directly corresponds with the shape of the opening of the flap-style lid.

Embodiments of the invention may employ an Independent Drop-In Container, with a half-round vertical wall alignment indent or trough, or alternatively, the alignment element may be made in the bottom horizontal wall of the container, or both. One or more embodiments of the invention may include directional/alignment tabs that project outward from the container top lip edge to allow for only one way in which to attach the primary cover. The flared opening at the top portion of the independent drop in container provides a small horizontal shelf in the vertical side wall of the container which elevates the top edge of the container from the top surface of the lower cup lid and arm rest, such that a space is provided wherein finger tips can reach under and lift the container from within the item in which it has been placed. An optional indent may be removed from the bottom circular corner edge of the independent drop in container such that the upward projecting clip-on element of the flap-style lid is prevented from interfering with the bottom of an additional independent drop-in container as it is stacked upon the original container. This enables consolidation and efficient stacking while shipping and/or allows the independent drop-in containers to stack upon themselves while being displayed or sold separately. The independent drop-in container may have an optionally slanted interior bottom wall that causes round shaped food items to roll or shift to the open side of the container thus reloading or replacing food items as they are scoped from the open half of the container. The optional slanted bottom wall of the container may occur at an interior location in relation to the outer vertical wall of the container. Three small circular posts (drafted from top to bottom horizontal wall) that are each spaced 120 degrees from each other may project downward from the slanted bottom wall of the container such that primarily two of the longer legs compensate for the maximum upward height of the slant wall and provide support so the top of the container and rest of the container remain level while the container is placed or stacked upon other horizontal surfaces. The optional outer bottom corner indent and bottom slant wall may occur alone in the container bottom while the cup lid cavity bottom wall that is below remains flat, or additionally the cup lid cavity bottom wall that is below may conform to the above features such that these dual components mate.

Embodiments of the invention may utilize a lower cup lid that includes an interior vertical wall half-round alignment indent or trough. The alignment indent can optionally be placed in the bottom horizontal wall of the container and lower cup lid. The lower cup lid has a low profile cylindrical shaped projection that extends outward from the exterior vertical wall while additionally there is a corresponding top horizontal surface above the low profile cylinder that specifically provides a surface area location for a straw hole or sip hole if the independent drop-in container is removed.

Although not shown for brevity, there may be an optional integrated tab with a centrally located hole that extends from the outside diameter edge (at any location) of the seal-on/peal-off layer or primary clip-on top cover that may act as a hang tab for the drop-in container as it is hung from a post, peg, or wire as part of a point of purchase display.

In relation to the armrest embodiment of the invention, either the primary top cover, drop in container, or lower cup lid may be made from FDA approved glow in the dark plastic. Additionally all three of the components listed above may be made from this specialty material. If only one component such as the lower cup lid for example is made from glow in the dark plastic, then when the theater is dark a glowing ring will appear around the drop-in container.

BRIEF DESCRIPTION OF THE DRAWINGS

The above and other aspects, features and advantages of the invention will be more apparent from the following more particular description thereof, presented in conjunction with the following drawings wherein:

FIG. 15A illustrates an alternate embodiment shown in FIG. 15 that is rotationally aligned and wherein the container includes a hinged lid with an internal friction press-on element wherein the hinged lid opens away from the straw via easy open tabs with strength ribs. FIG. 15C shows a cutaway view of FIG. 15B on the right, a side view on the left and a close up of the snap in coupling element at the bottom of the figure that is smaller than the diameter of the lower cup lid. FIG. 15F illustrates a top and bottom perspective view of one of the embodiments of FIG. 15D, while

FIG. 20B shows a lower perspective view of the embodiment of FIG. 20A at the top of the page, and a side view perspective on the lower half of the page that shows the cover with a downward vertical orientation while the cover is in the open position.

Figure 24:
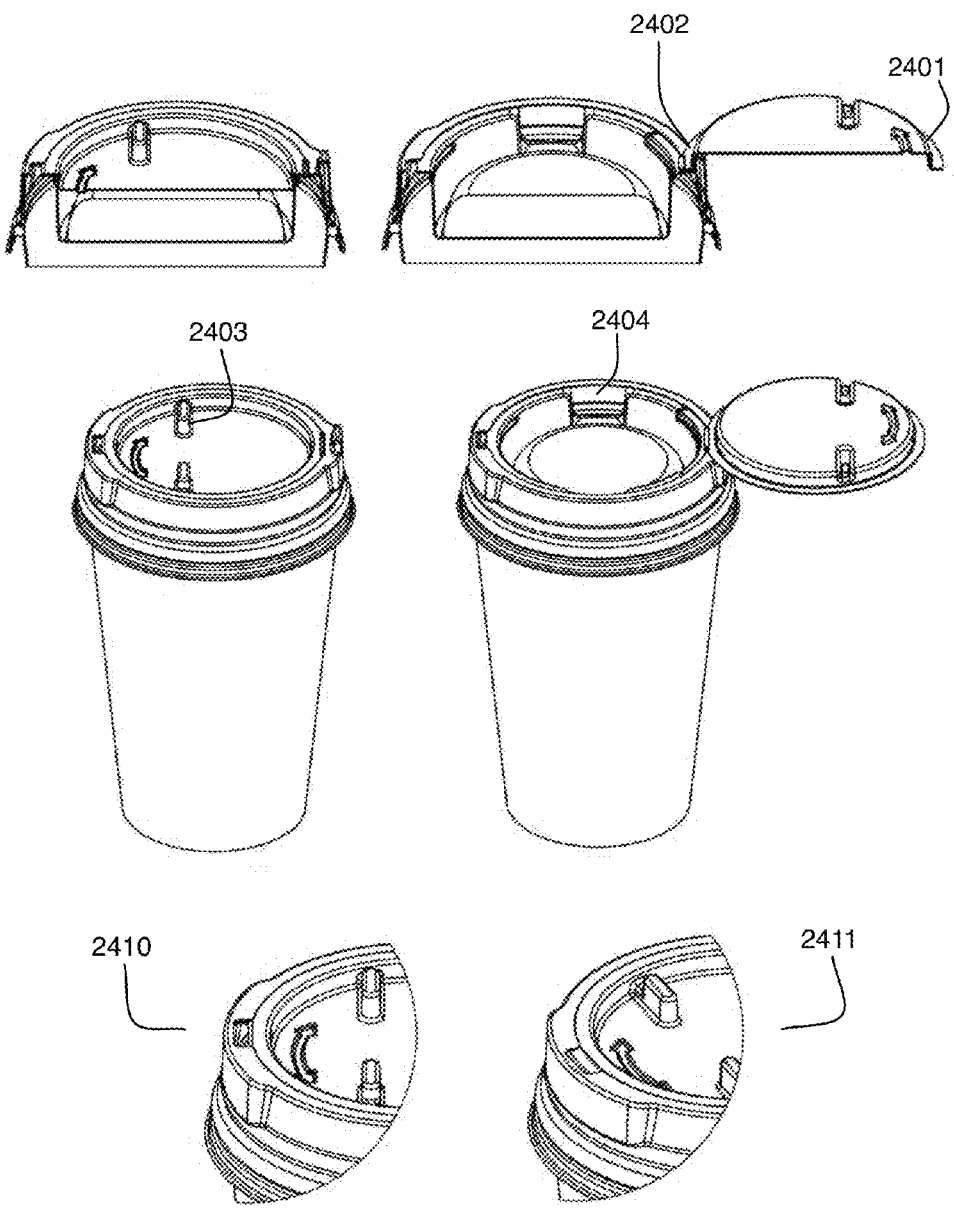

FIG. 24 illustrates a rotational/hinge lid/cover configured for example to hold a cookie or other item and configured with posts, for example grab posts, and optional snap open and close elements.

Figure 25:
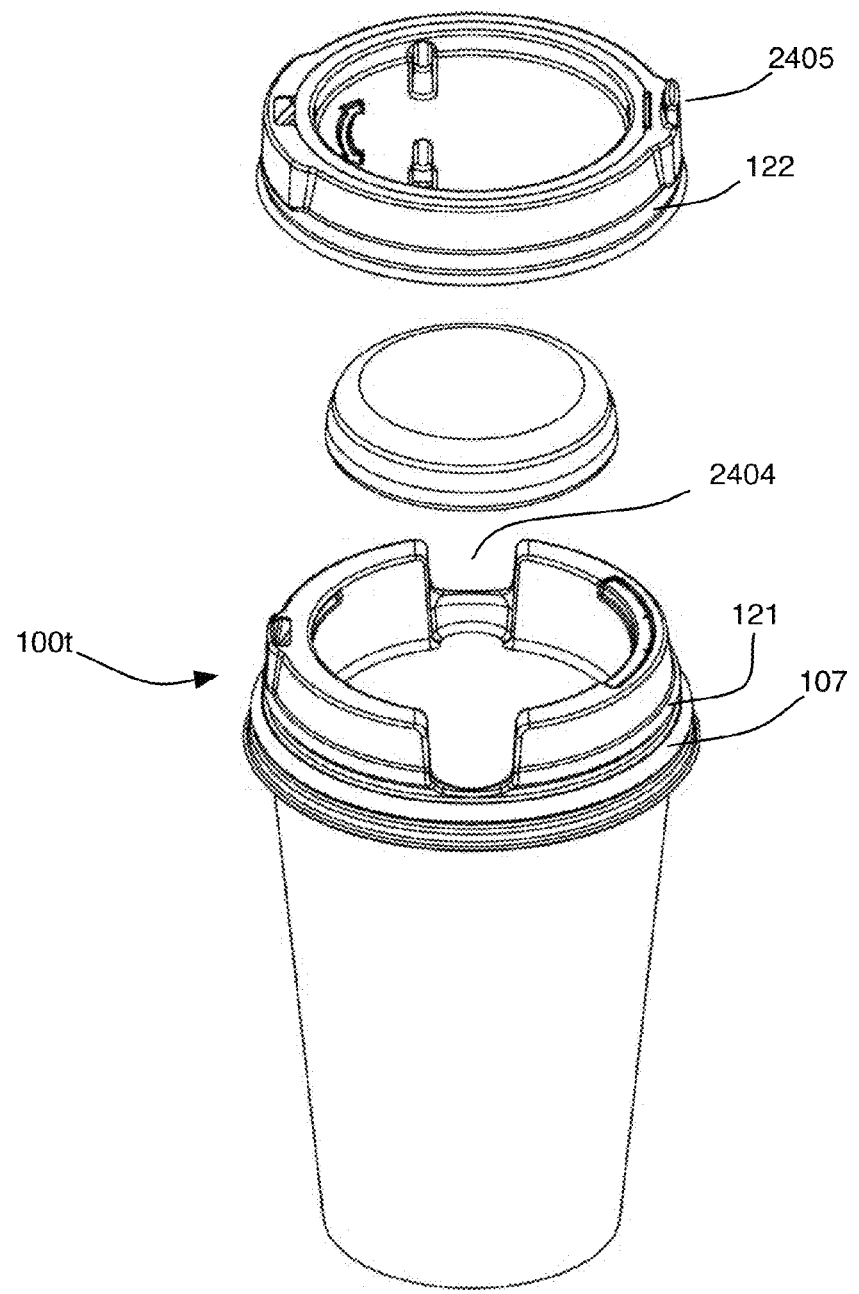

FIG. 25 illustrates the embodiment of FIG. 24 with the cover off and showing a food item and optional cut-outs for lifting the food item for example.

Figure 26:
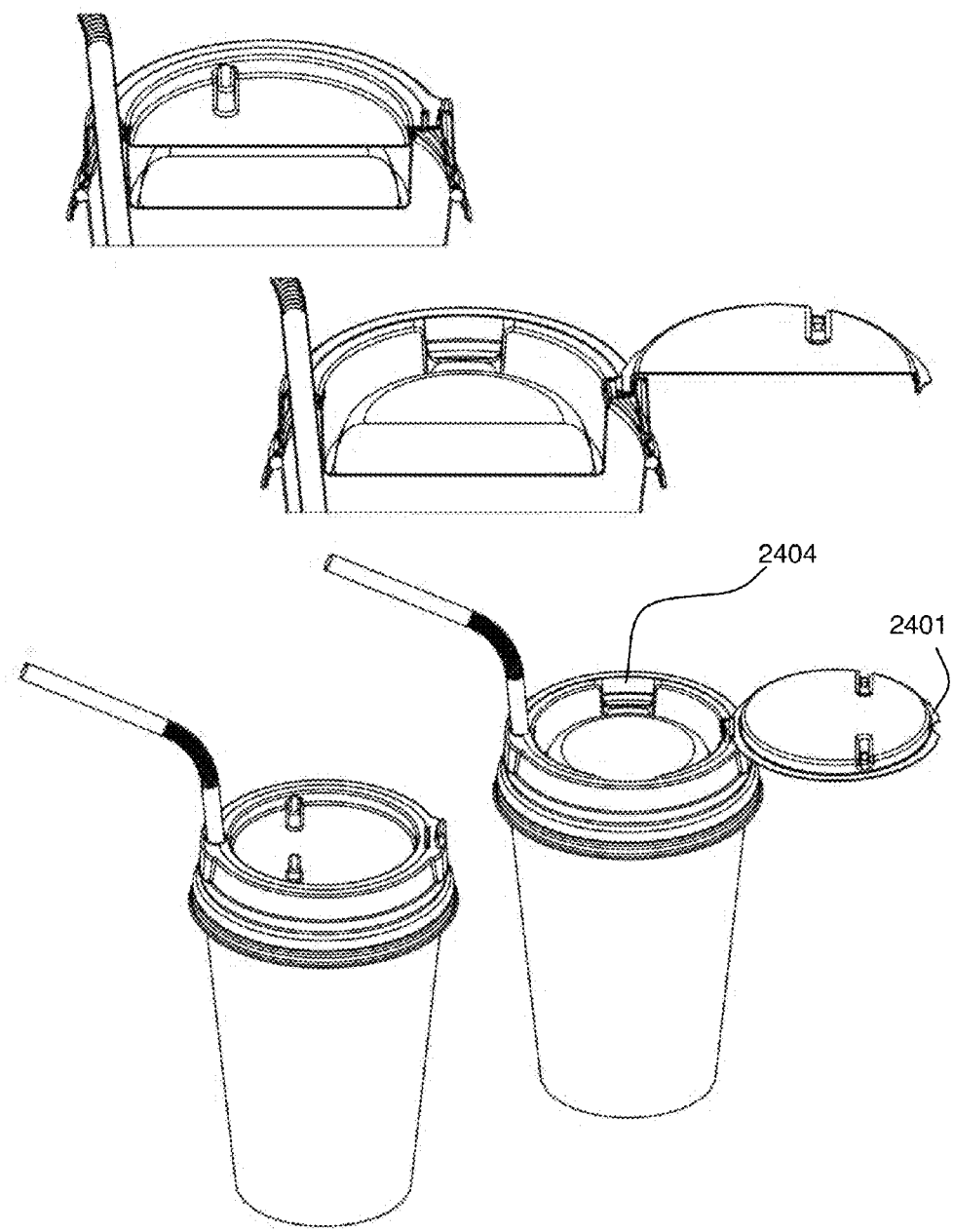

FIG. 26 illustrates an embodiment for example as shown in FIGS. 24 and 25 with a straw hole.

Figure 27:
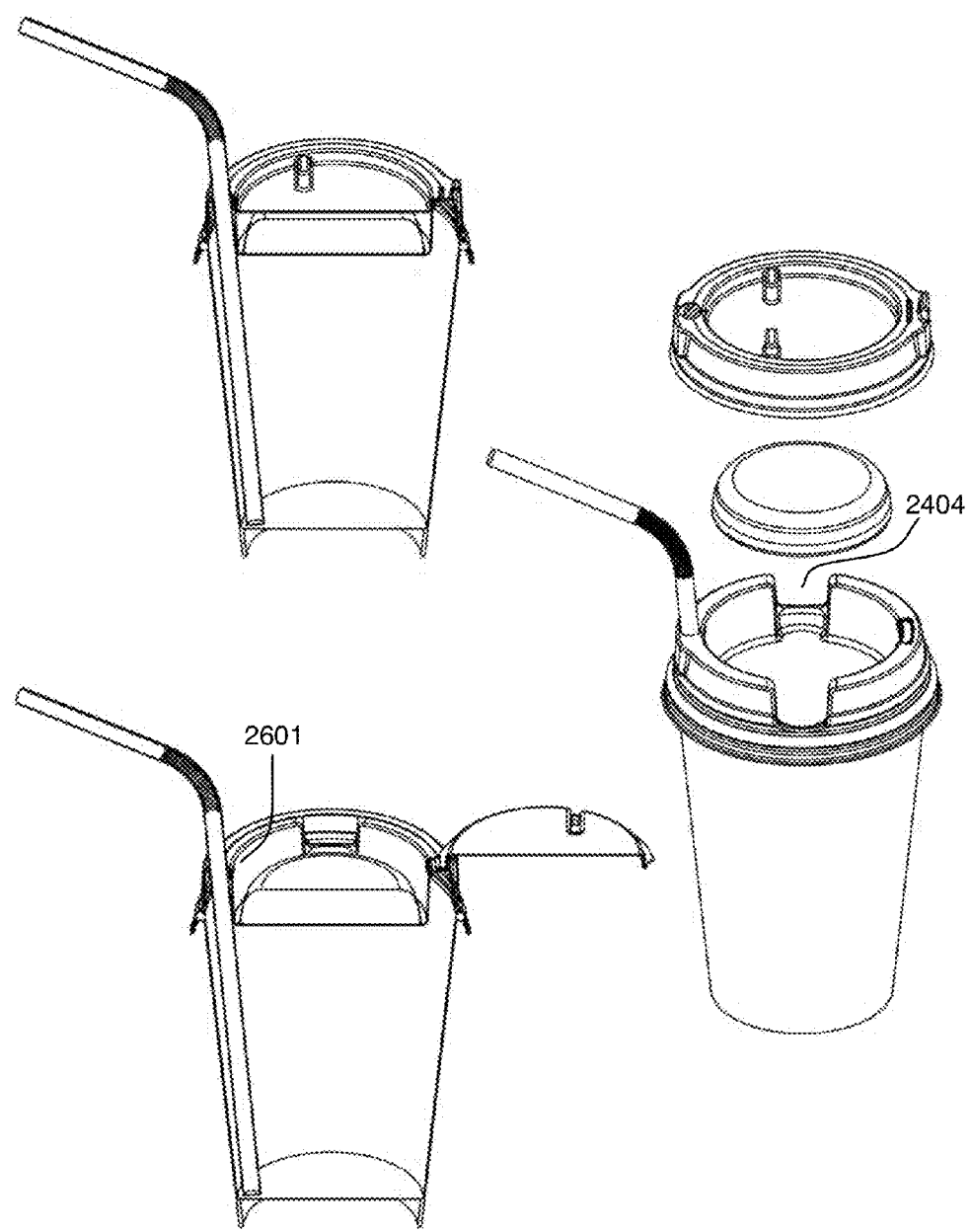

FIG. 27 illustrates the embodiment of FIG. 26 in further detail.

Figure 28:
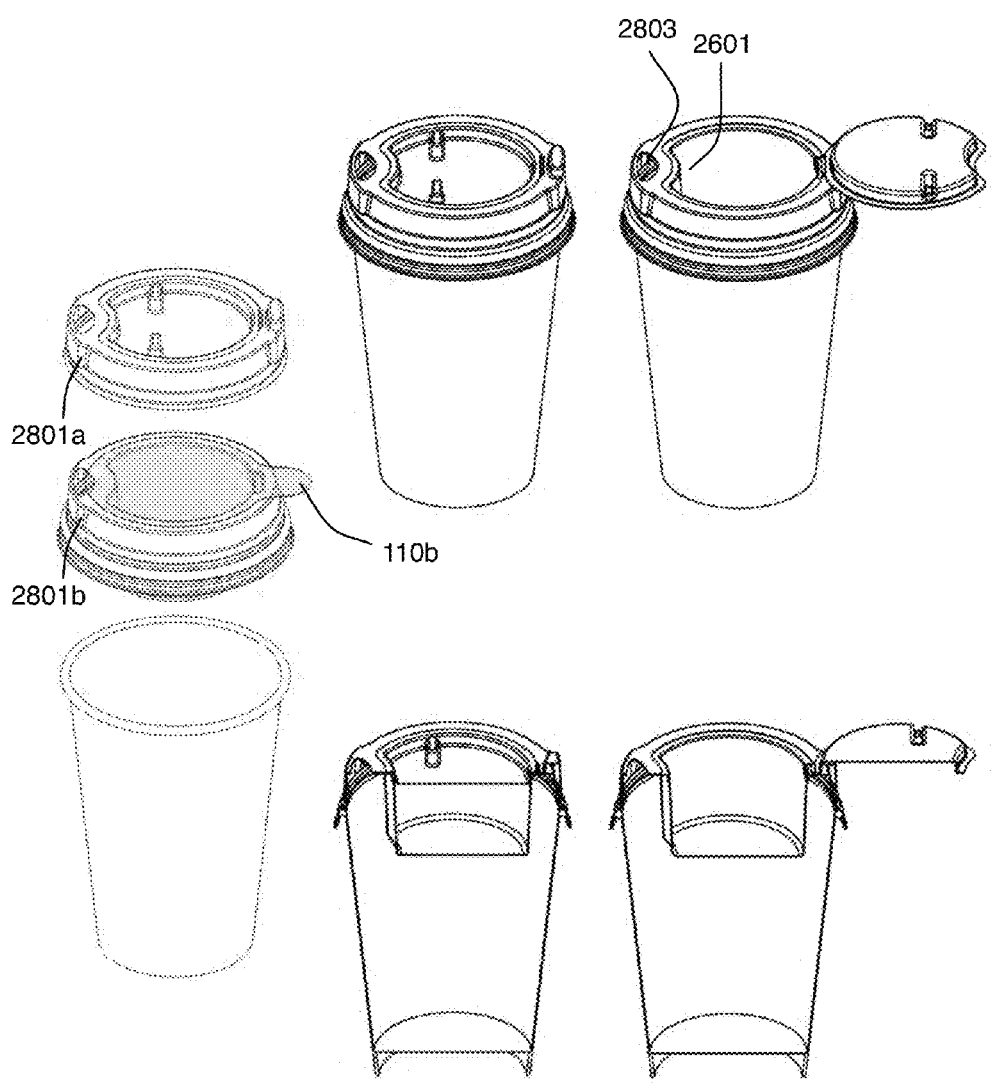

FIG. 28 illustrates an embodiment with an optional seal-on/peel-off cover and non-rotational hinge lid/cover that may be configured to click open or closed for example.

Figure 29:
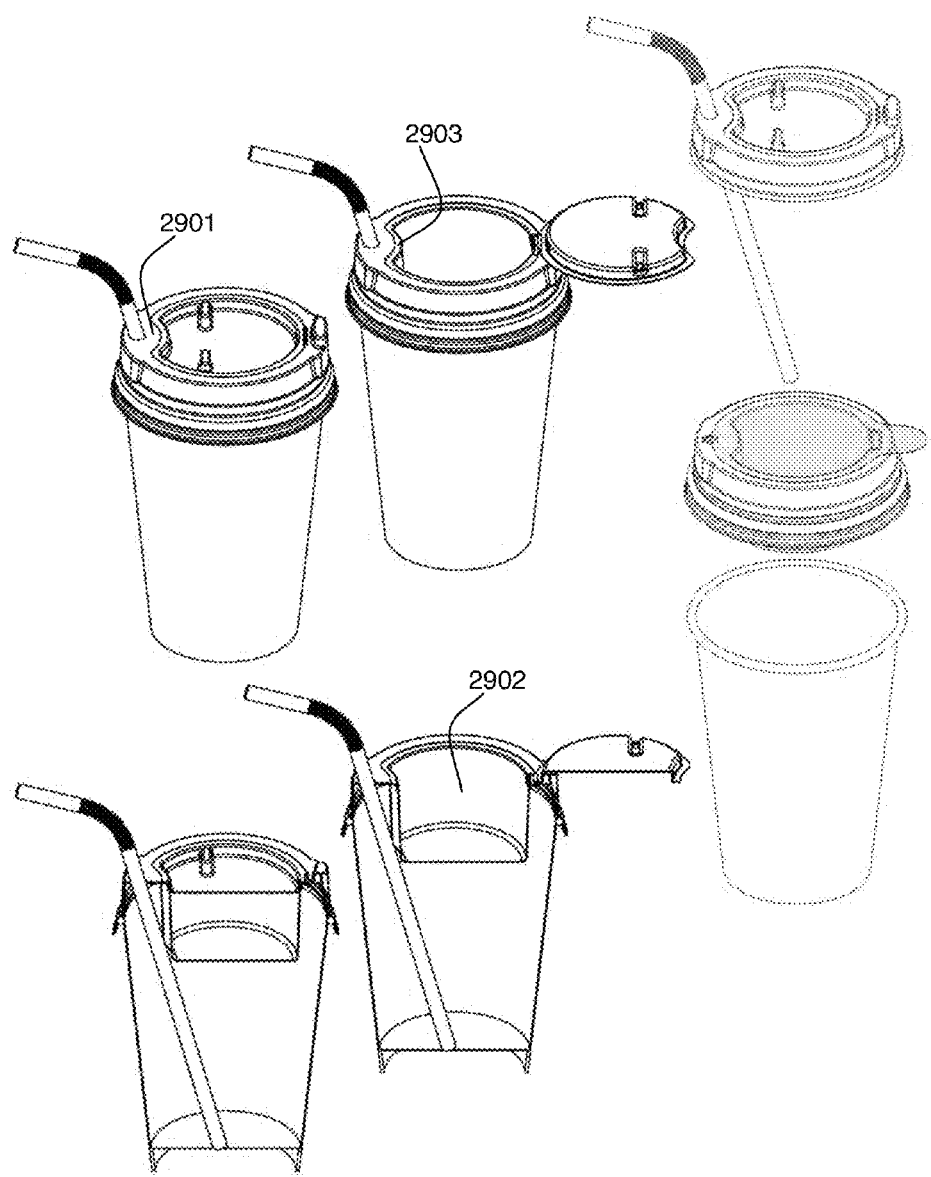

FIG. 29 illustrates an embodiment of FIG. 28 with a straw hole.

Figure 30:
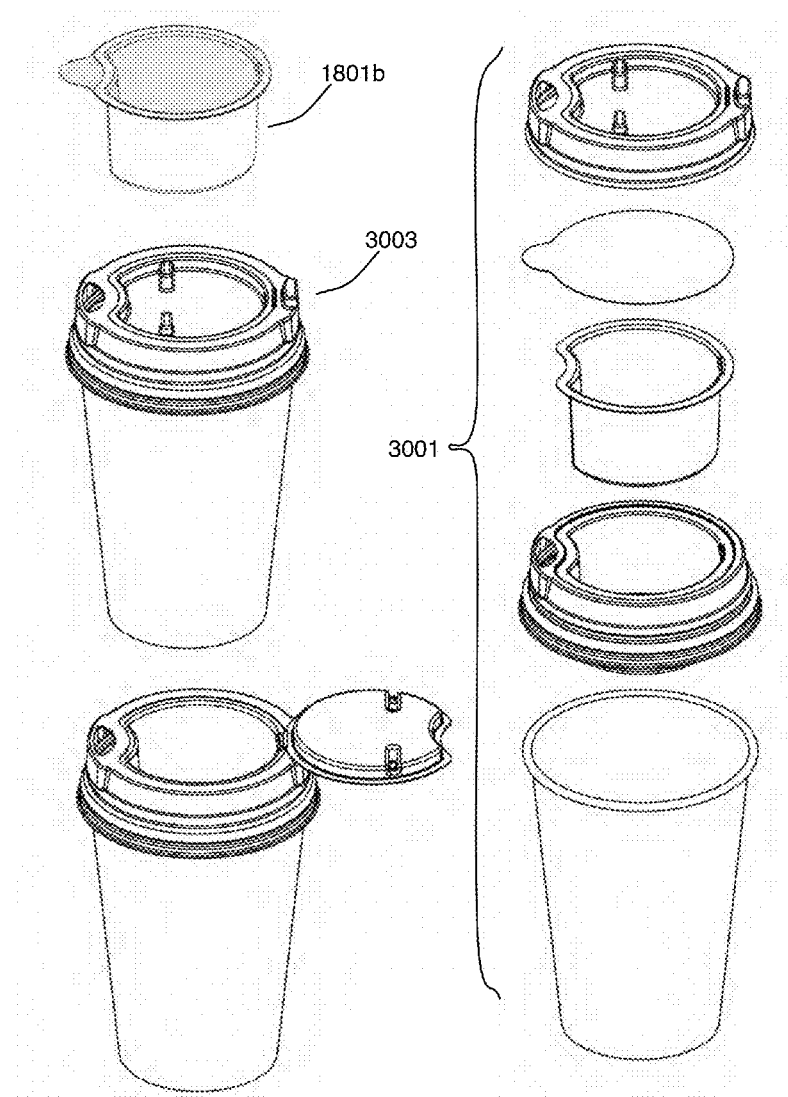

FIG. 30 illustrates an embodiment related to FIG. 28 configured for an independent drop-in/removable container.

FIG. 31 illustrates an embodiment of FIG. 30 in further detail.

Figure 32:
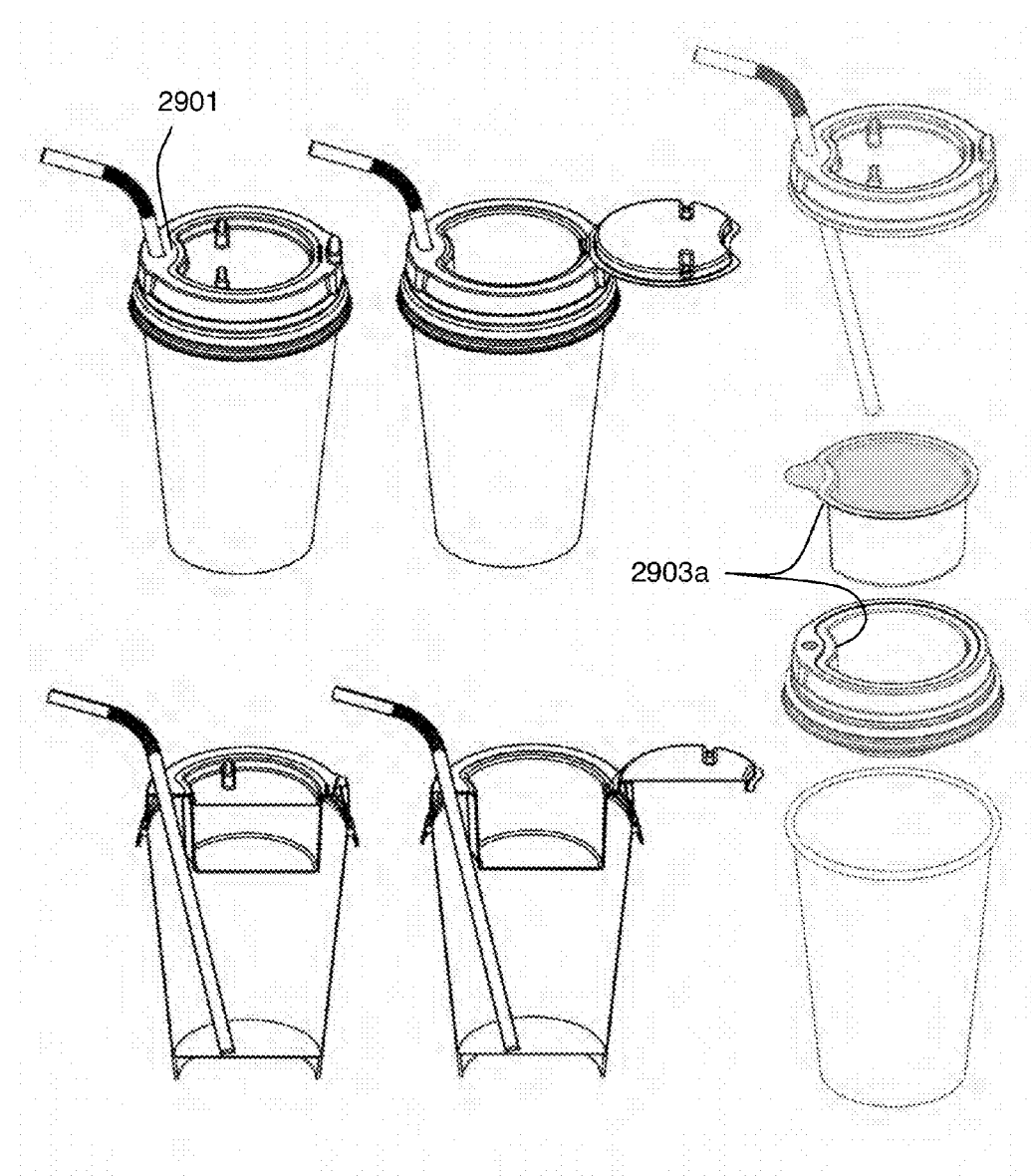

FIG. 32 illustrates an embodiment of FIG. 30 with a straw hole.

Figure 33:
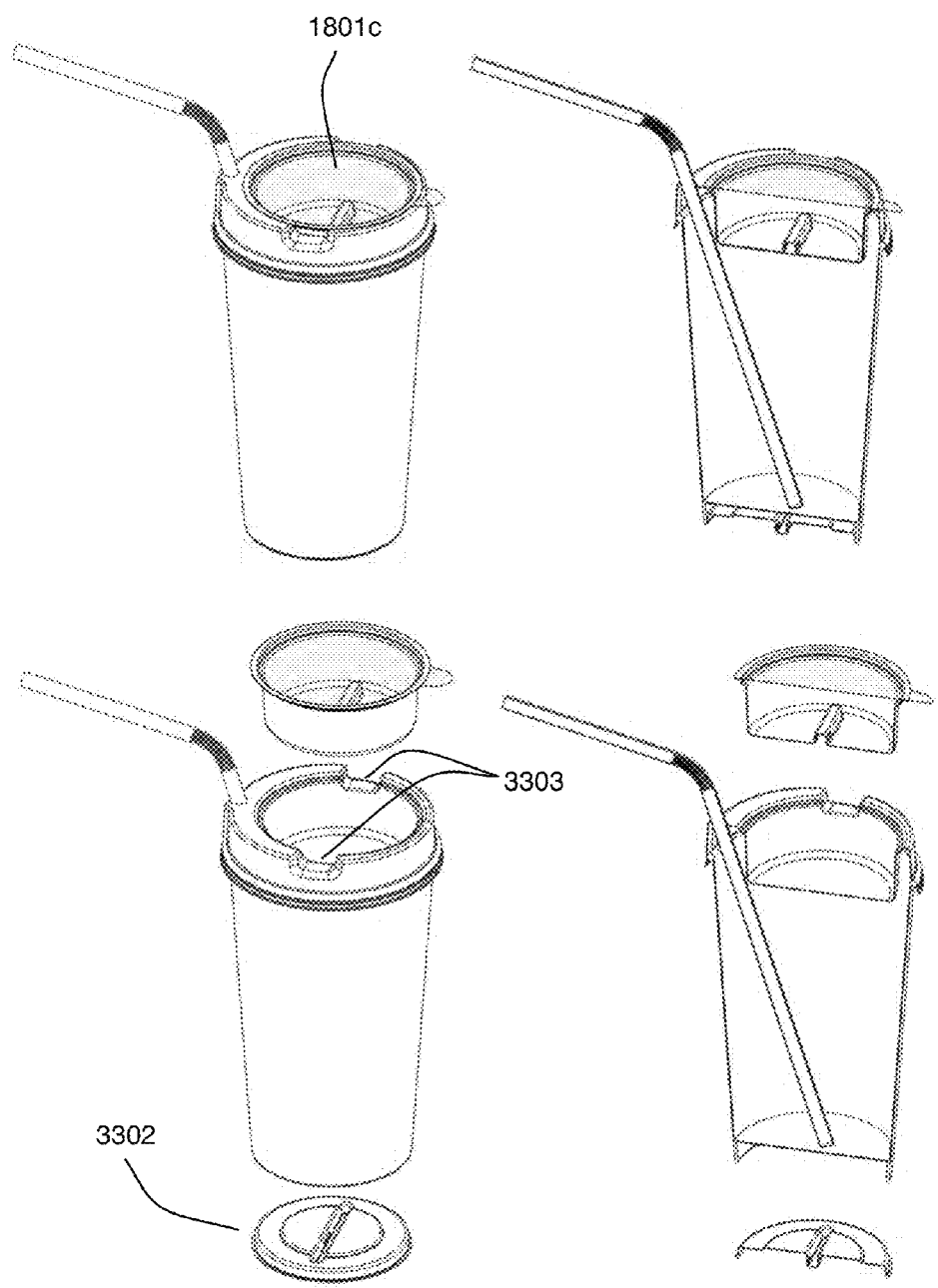

FIG. 33 illustrates an embodiment having a round off center volume to hold an optional cup/arm rest independent drop-in/removable container and a straw hole and optional container cover configured to fit under the bottom of the large cup and also on top of the cup/arm rest independent drop-in removable container as well.

Figure 34:
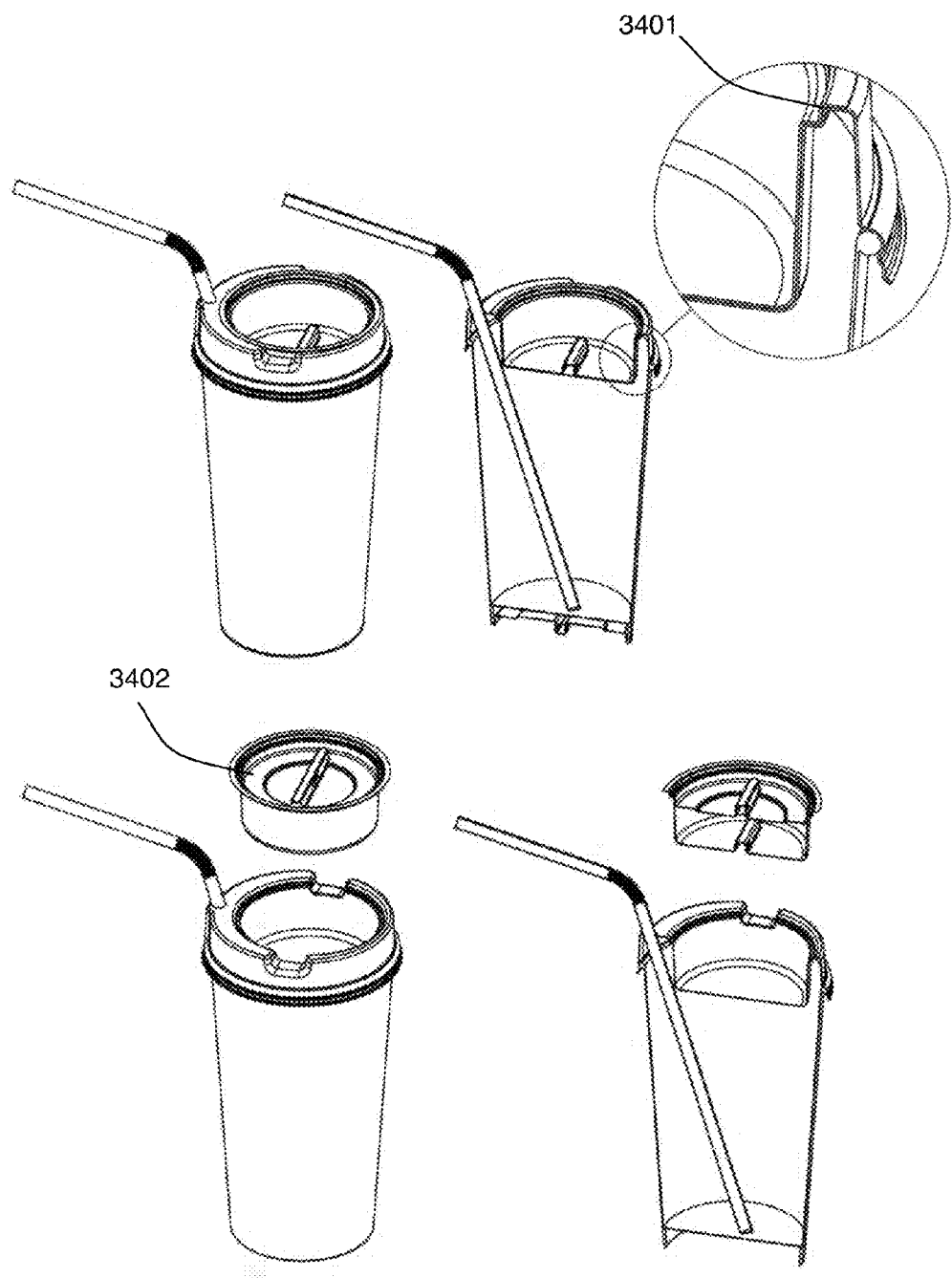

FIG. 34 illustrates the embodiment of FIG. 33 in greater detail.

Figure 35:
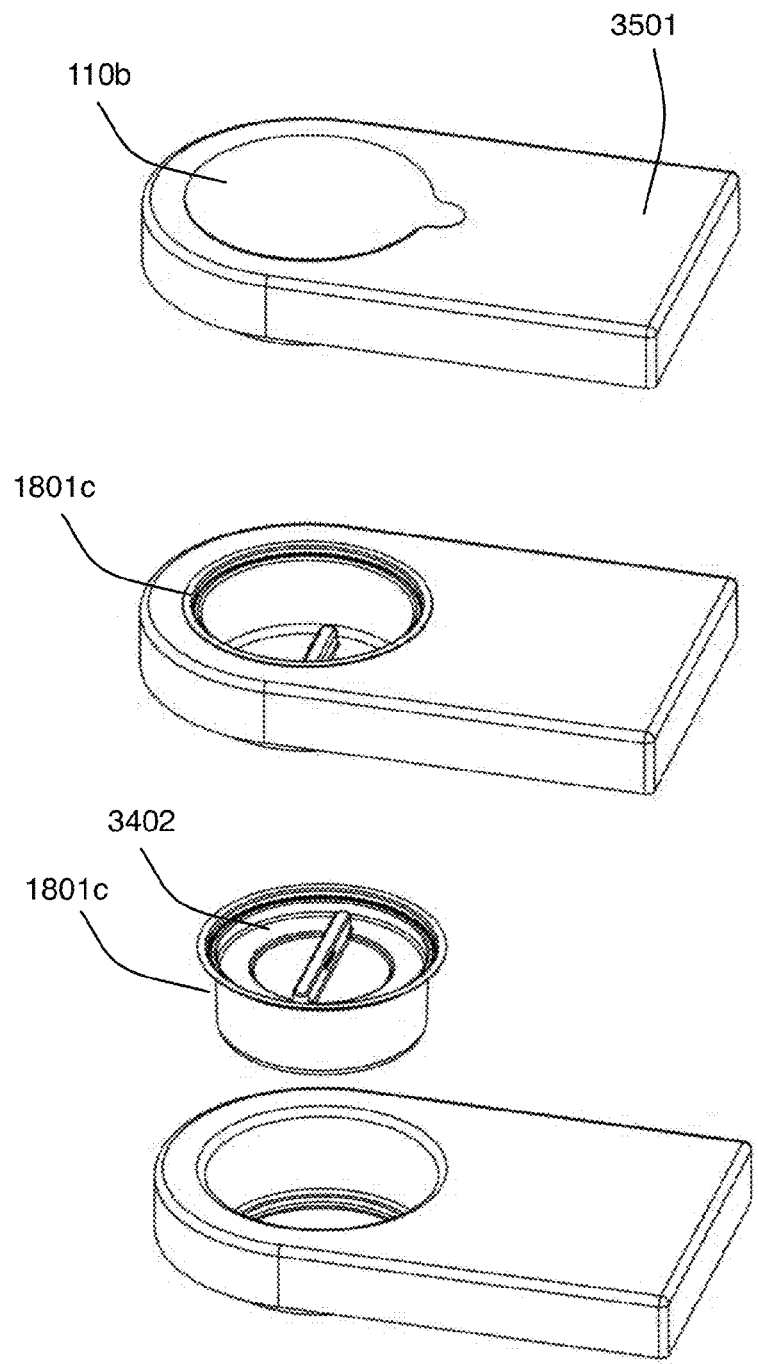

FIG. 35 illustrates the cup/arm rest independent drop-in/removable container in an arm rest hole and shown in the bottom portion of the figure above the arm rest.

Figure 36:
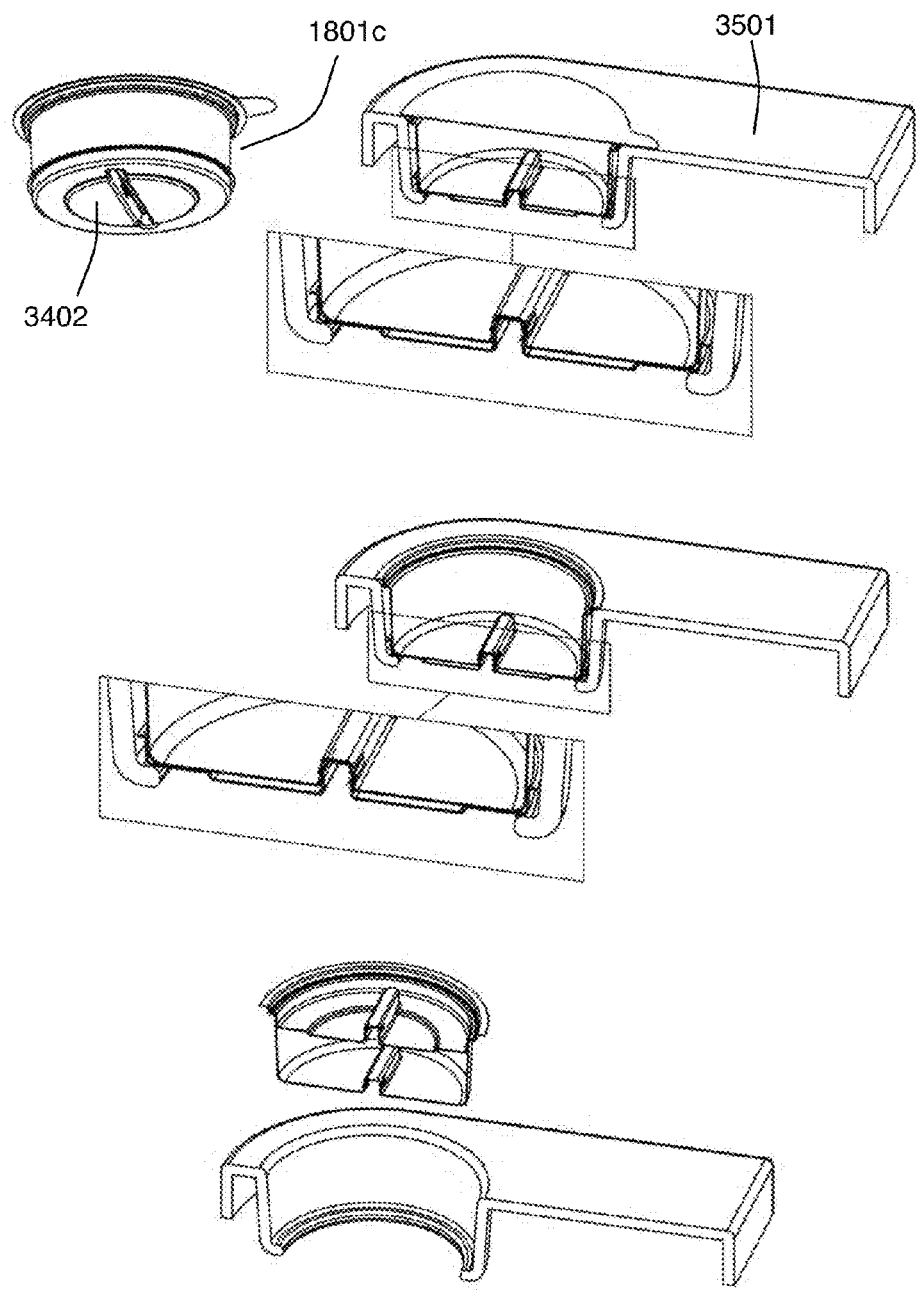

FIG. 36 illustrates a lower perspective view of the cup/arm rest independent drop-in/removable container with container press-on friction cover also configured to fit the bottom of the cup/arm rest independent drop-in/removable container on the bottom and top of the container.

Figure 37:
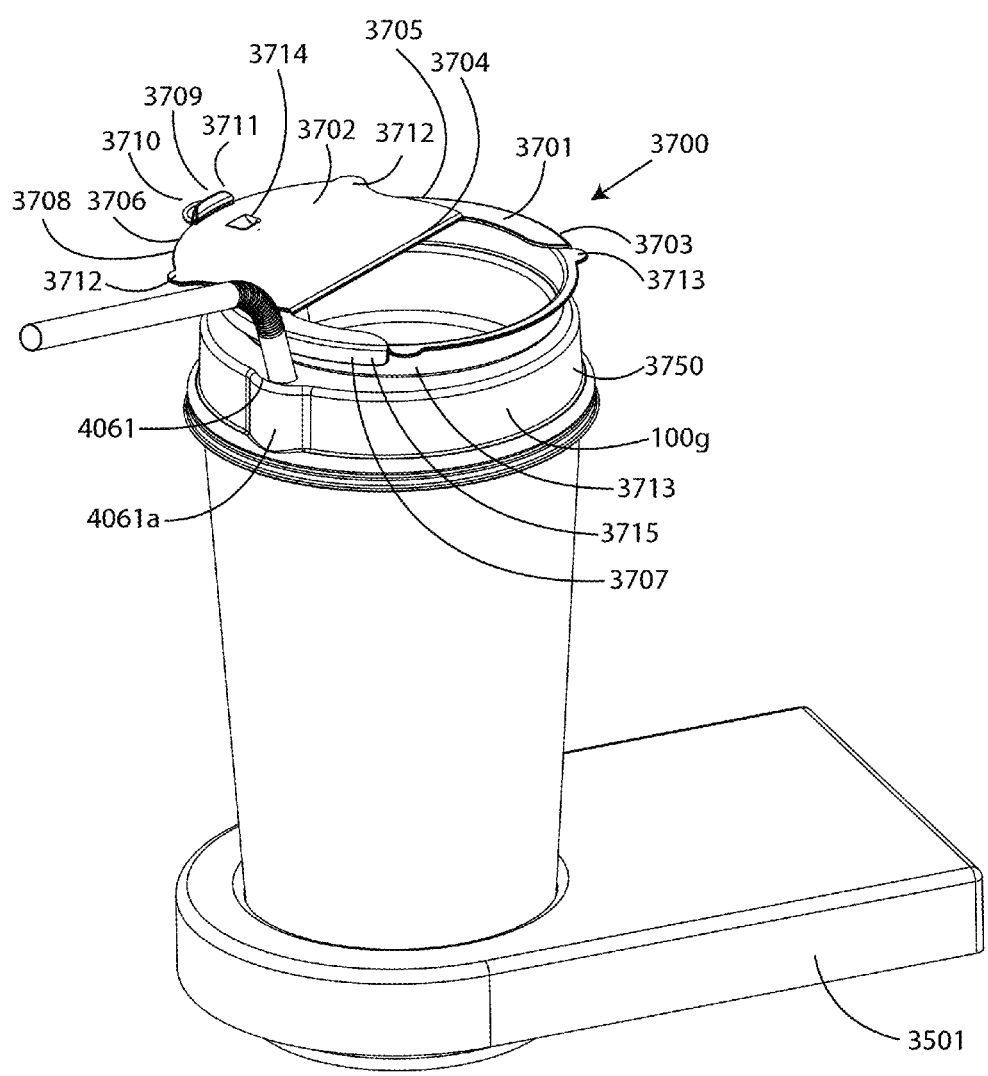

FIG. 37 illustrates an embodiment of the invention for use in an armrest for example wherein the primary clip-on top cover includes a secondary flap-style lid with a curved-sided opening.

Figure 38:
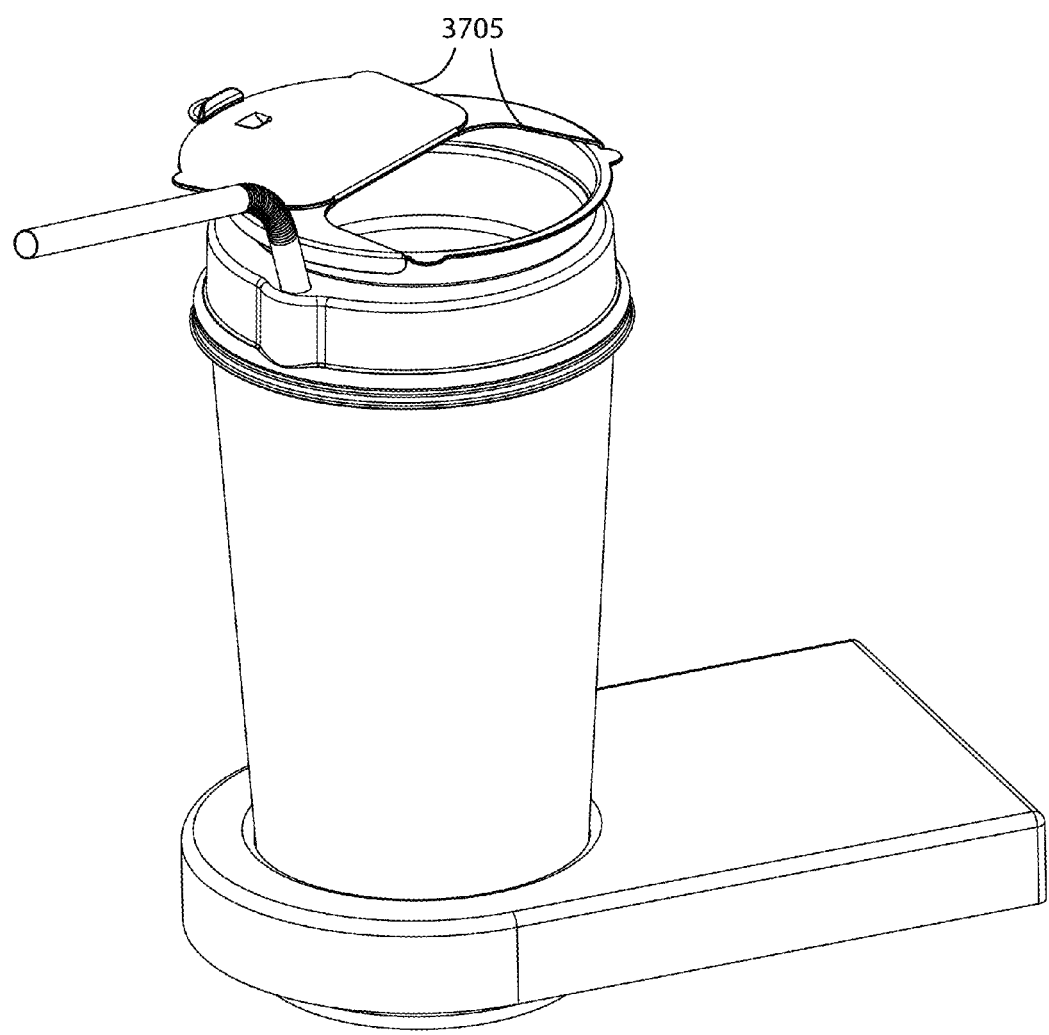

FIG. 38 illustrates an embodiment of the flap-style lid with a straight-sided opening.

Figure 39:
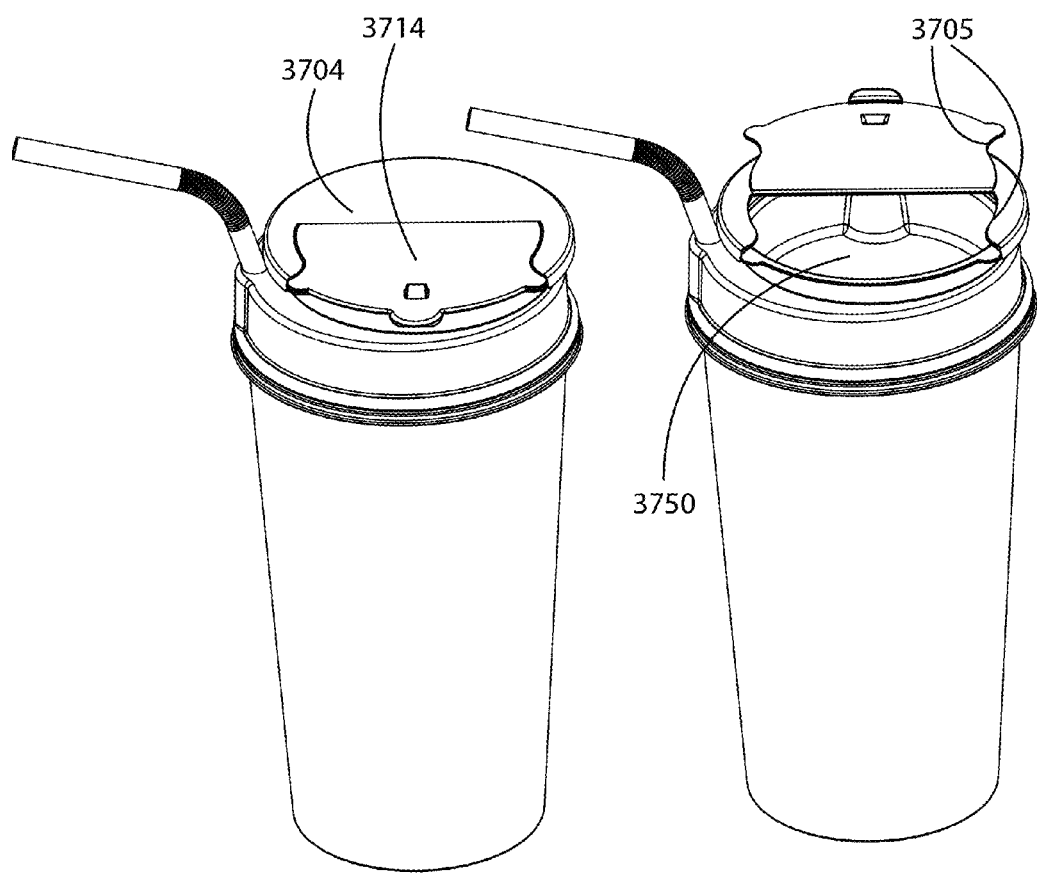

FIG. 39 illustrates a top perspective view of a closed and open flap-style lid.

Figure 40:
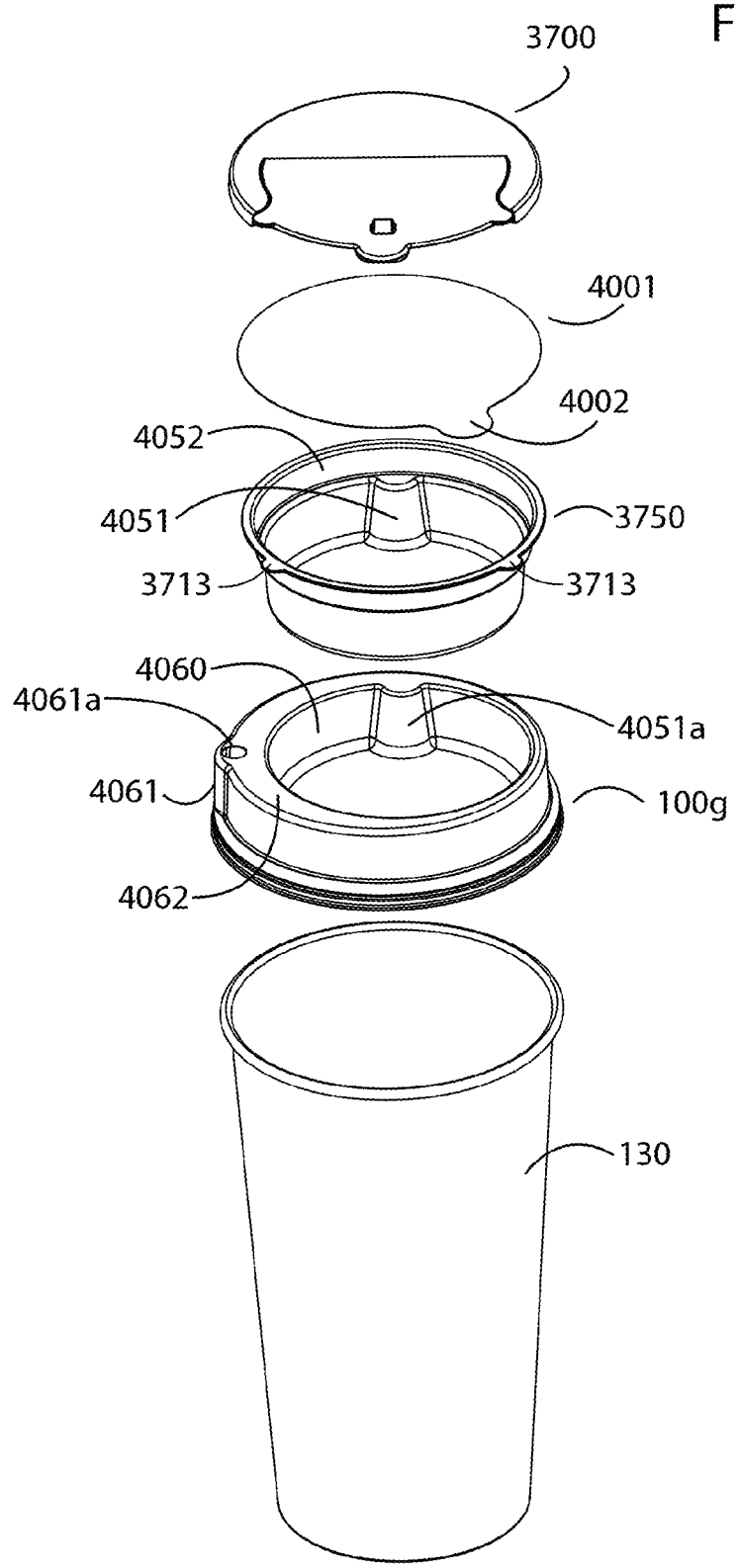

FIG. 40 illustrates an embodiment of the invention with the independent drop-in container with an optional seal-on/peal-off layer in exploded view.

Figure 41:
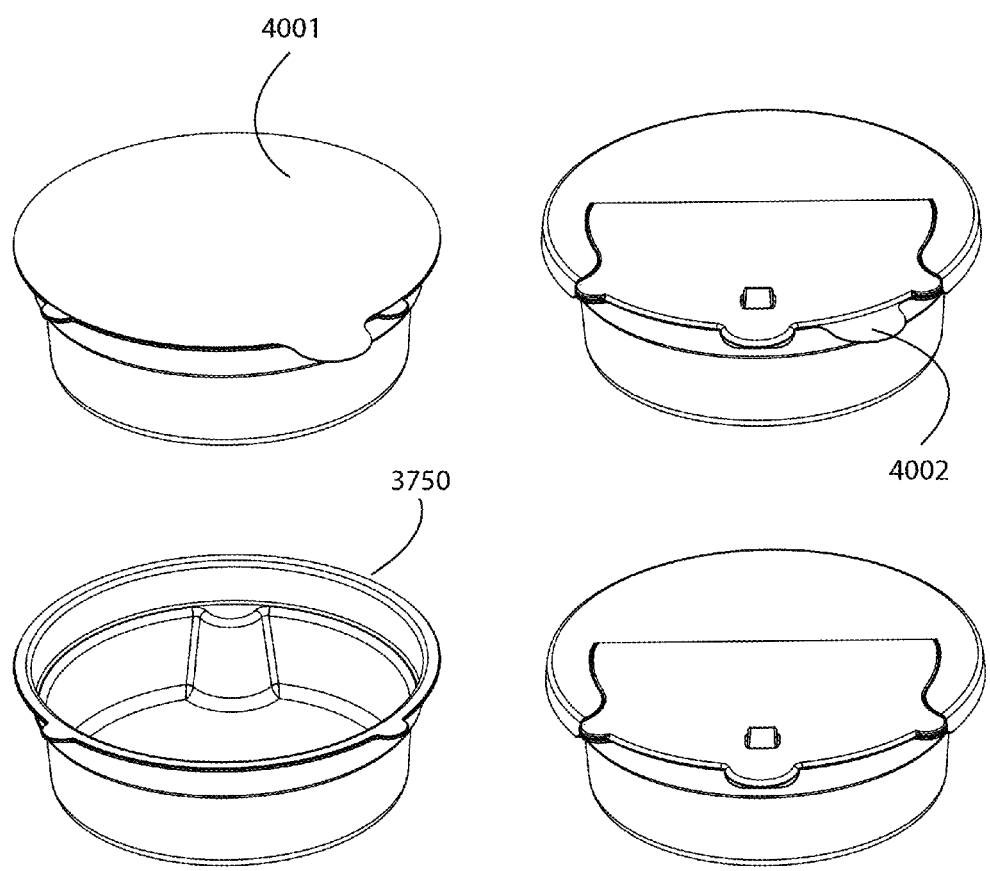

FIG. 41 illustrates an embodiment of the independent drop-in container with and without the optional seal-on/peal-off layer.

FIG. 42 illustrates an embodiment of the flap-style lid with a curved-sided opening attached to the independent drop-in container and removed from the drop-in container.

FIG. 43 illustrates an embodiment of the primary clip-on cover element and secondary flap-style lid clip-on element configured to hold the flap-style lid open with respect to the primary cover in perspective and close up views.

Figure 44:
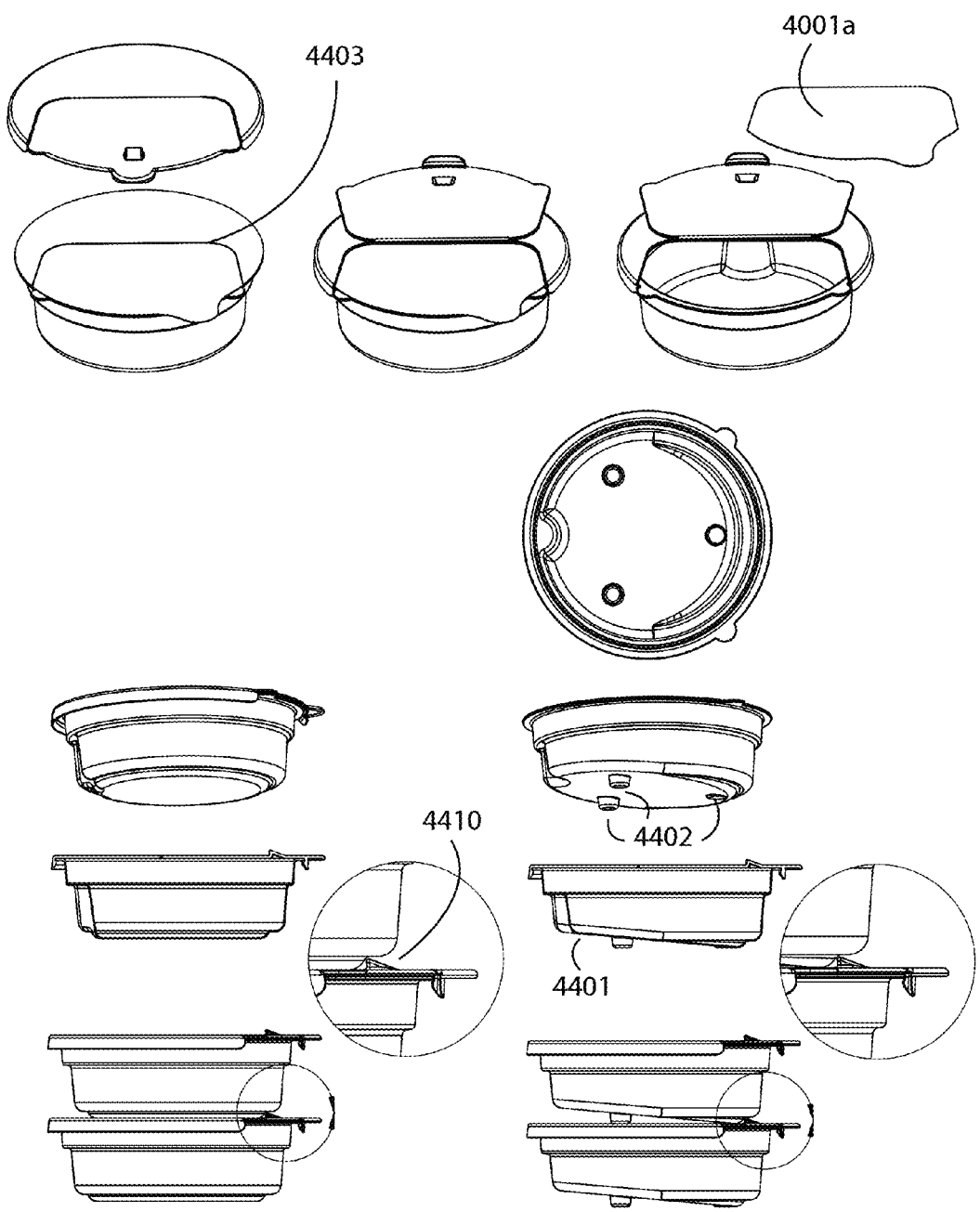

FIG. 44 illustrates an embodiment of the drop-in container with a laser scored seal-on/peal-off layer, and the bottom corner of the container having a portion removed or notched around the entire diameter and shown from a top and side perspective a slant wall integrated into the bottom of the drop-in container.

Figure 45:
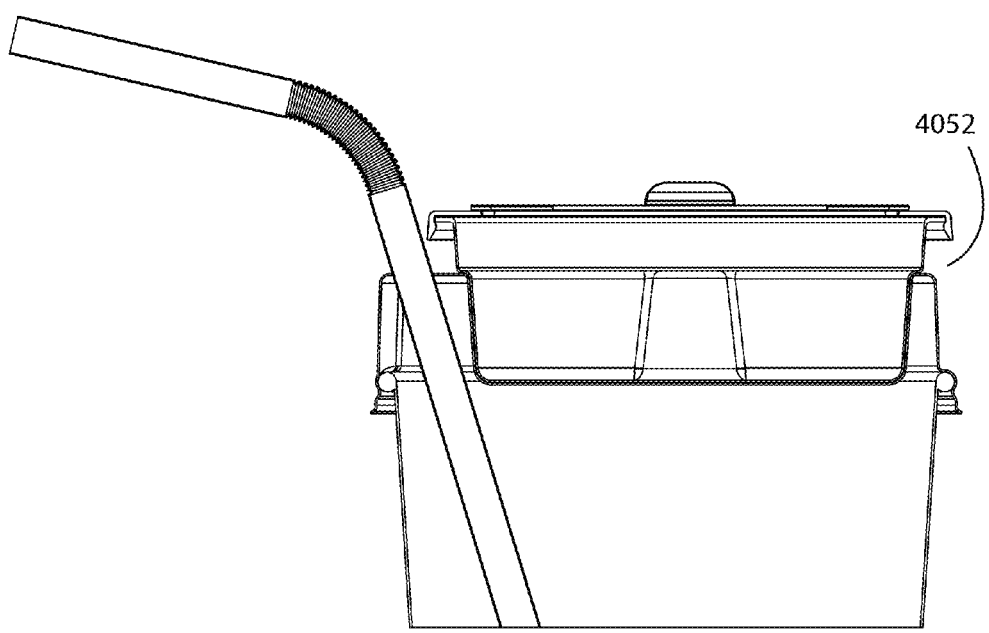

FIG. 45 illustrates an embodiment of the container residing on a cup that may still be accessed via the straw and where the drop-in container (due to ample finger space) may be easily lifted from the lower cup lid.

FIG. 46 illustrates the drop-in container residing in and out of an armrest.

FIG. 47 illustrates a top perspective of the drop-in container with the secondary flip lid in the open position while in an armrest and a cross-section of the drop-in container and primary top cover where there is ample finger space to lift/remove the drop-in container from the armrest.

DETAILED DESCRIPTION OF THE INVENTION

A cup lid with integrated container will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
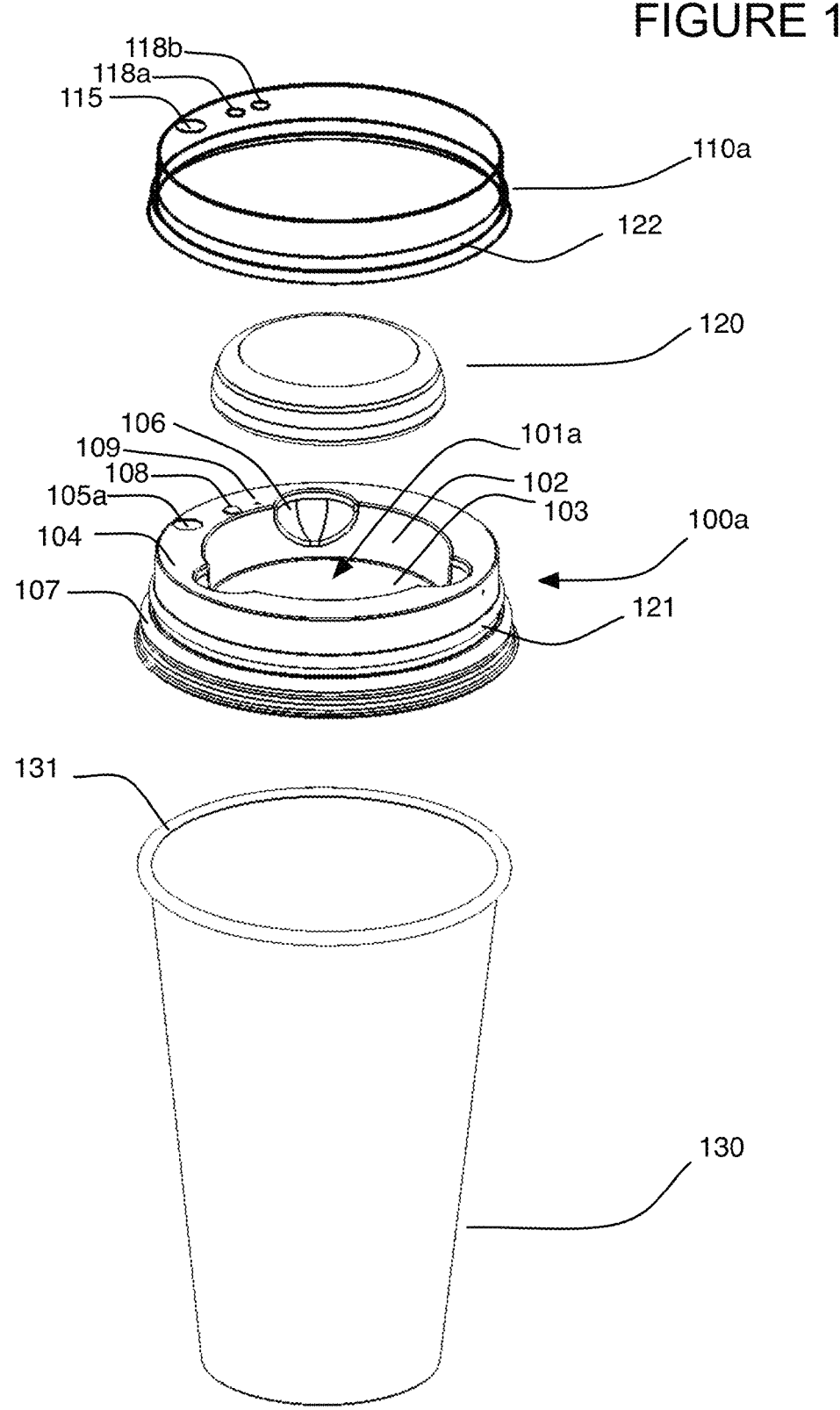
FIG. 1 illustrates an exploded view of an embodiment of the cup lid with integrated container above a cup, along with a food item and a cover.

FIG. 1 illustrates an exploded view of an embodiment of cup lid 100*a* with integrated container or cavity 101*a* shown above cup 130, along with any solid/liquid 120 or food item such as a cookie for example that fits in cavity 101*a*, and cover 110*a*, that covers the food item while the food item is in container 101*a*. Cup lid 100*a* includes coupling element 107 that allows the cup lid to couple with the cup.

Cup lid 100*a* includes at least one wall 102, for example that leads to container bottom 103, which for example may also be considered part of wall 102. As used herein, the term "wall" is not limited to a surface of any shape, but rather refers to the separation between container 101*a* and the contents of cup 130. Specifically, embodiments of the invention include at least one wall that defines container 101*a* that is configured to store a first solid or a liquid separate from a second solid or liquid stored in cup 130 wherein cup 130 generally includes an annular opening that lies in a plane on top of the cup. The cup as shown also includes a rolled rim 131 that coupling element 107 is configured to couple with to hold cup lid 100*a* onto cup 130. Specifically, coupling element 107 is configured to couple at least one wall to the annular opening on top of said cup, for example by stretching over the smaller diameter portion of the coupling element to allow the rolled edge of the cup to fit into the slightly larger diameter portion of the cup lid. Coupling element 107 is an exemplary form of attachment and any form of attachment may be utilized to couple cup lid 100*a* to cup 130, as one skilled in the art will appreciate, including for example a coupling element that includes a more difficult type of coupling to remove or even a permanent coupling. Container cover 110*a* is optionally configured to couple via coupling element 122 to coupling element 121 of cup lid 100*a*. An alternative is to extend the vertical sidewall of 110*a* such that coupling element 122 is configured to couple to coupling element 107 of cup lid 100*a* for example.

Horizontal area 104 includes hole 105*a* for example for a straw or sip hole and optional indented cut-outs 106. Optional elements include rotation indexer 108 and air hole 109. Rotation indexer 108 is described below with respect to its relation to cover 110*a*. Other optional elements may include optional indicators not shown for brevity, for example configured to press in to show whether the contents of cup 130 are for example diet/regular soda or caffeinated/decaffeinated or to show any other information in a tactile or visible manner.

At least one wall is configured to enable access of the first solid or liquid and the second solid or liquid without disengagement of the coupling element. For example, the contents of both integrated container 101*a* and cup 130 are accessible without removing the cup lid. This greatly simplifies eating and drinking in cars, theaters and sport stadiums for example that are equipped with one cup-holder per seat.

Cover 110*a* as shown is configured as an external wall friction press-on cover, but may also be configured as a seal-on/peel-off, press-on friction dome, press-on friction dome with hole, internal and external wall friction press-on, internal wall friction press-on, hinge or rotational cover, so long as the cover is configured to at least partially enclose the container and retain the contents of the container when the cover is coupled with corresponding version of the cup lid. As shown, cover 110*a* includes hole 115 to allow access of hole 105*a* when cover 110*a* is coupled with cup lid 100*a* and cover 110*a* may also include holes 118*a* and 118*b* that provide discrete rotation values for cover 110*a* when one or the other hole is rotated over the top of rotation indexer 108 on cup lid 100*a*. In one angular rotation, hole 105*a* is open for access and in the other angular rotation, hole 105*a* is thus closed by cover 110*a*. When open, i.e., when hole 105*a* is exposed through cover hole 115, air hole 109 is exposed via hole 118*b* and when closed, air hole 109 is also closed by cover 110*a*.

Figure 2A:
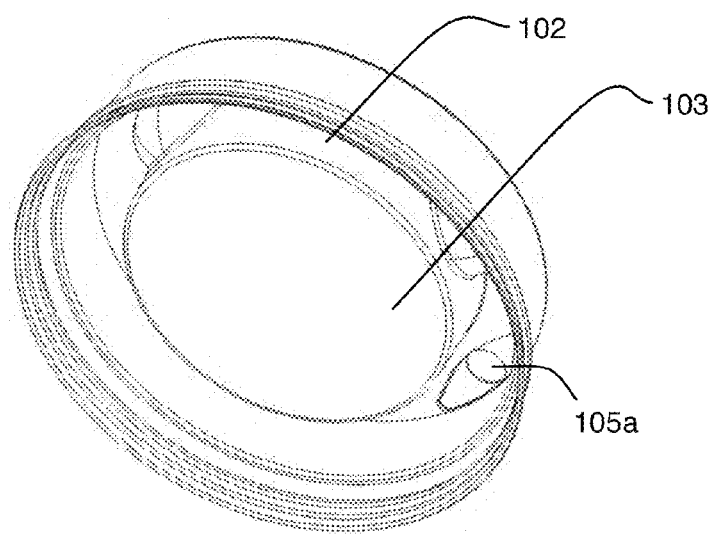
FIG. 2A illustrates a bottom view of an embodiment of the invention.
Figure 2B:
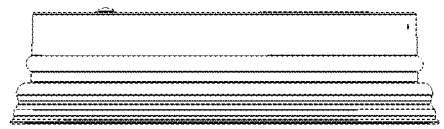
FIG. 2B shows a side view of an embodiment of the invention having a vertical dimension that extends to the plane of the cup opening.
Figure 2C:
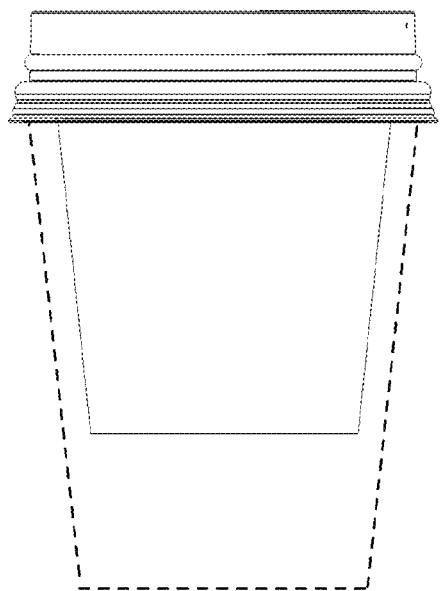
FIG. 2C shows a side view of an embodiment of the invention having a vertical dimension that extends down into the plane of the cup opening.

FIG. 2A illustrates a bottom view of an embodiment of the invention. At least one wall 102 includes a vertical dimension that extends to, into, out of, or both into and out of the plane defined by the annular opening of the cup. Even though FIGS. 1 and 2 show a limited depth container 101*a*, it is noted that this depth may be large enough to hold a typical amount of popcorn in the container while the cup holds a typical amount of soda in the cup. FIG. 2B shows a side view of an embodiment of the invention having a vertical dimension that extends down to the plane of the cup opening—this embodiment for example may be utilized to hold a cookie while cup 130 holds a cappuccino for example. FIG. 2C shows a side view of an embodiment of the lid container with a cup shown in dashed lines, having a vertical dimension that extends into the plane of the cup opening, this vertical dimension may be of any size and can be increased such that the embodiment, for example, may be utilized to hold popcorn while cup 130 holds soda for example. Furthermore, at least one wall 102 includes a horizontal dimension, for example across the diameter of the container, having a width less than, equal to, or greater than a width measured across the annular opening of the cup. See also FIG. 12 for embodiments wider than the opening of the cup for example. The embodiment shown in FIG. 2C may itself hold popcorn and fit into a standard popcorn cup that is then utilized for soda, and/or may fit into a cup that has a narrower, or stepped configuration on the bottom half of the cup so as to fit into a standard stadium or movie theater seat cup holder for example. Any type of cup that allows for an embodiment of the invention to be utilized in conjunction with a cup holder for an automobile, or stadium seat, movie theater seat or any other type of cup holder is in keeping with the spirit of the invention.

Figure 3:
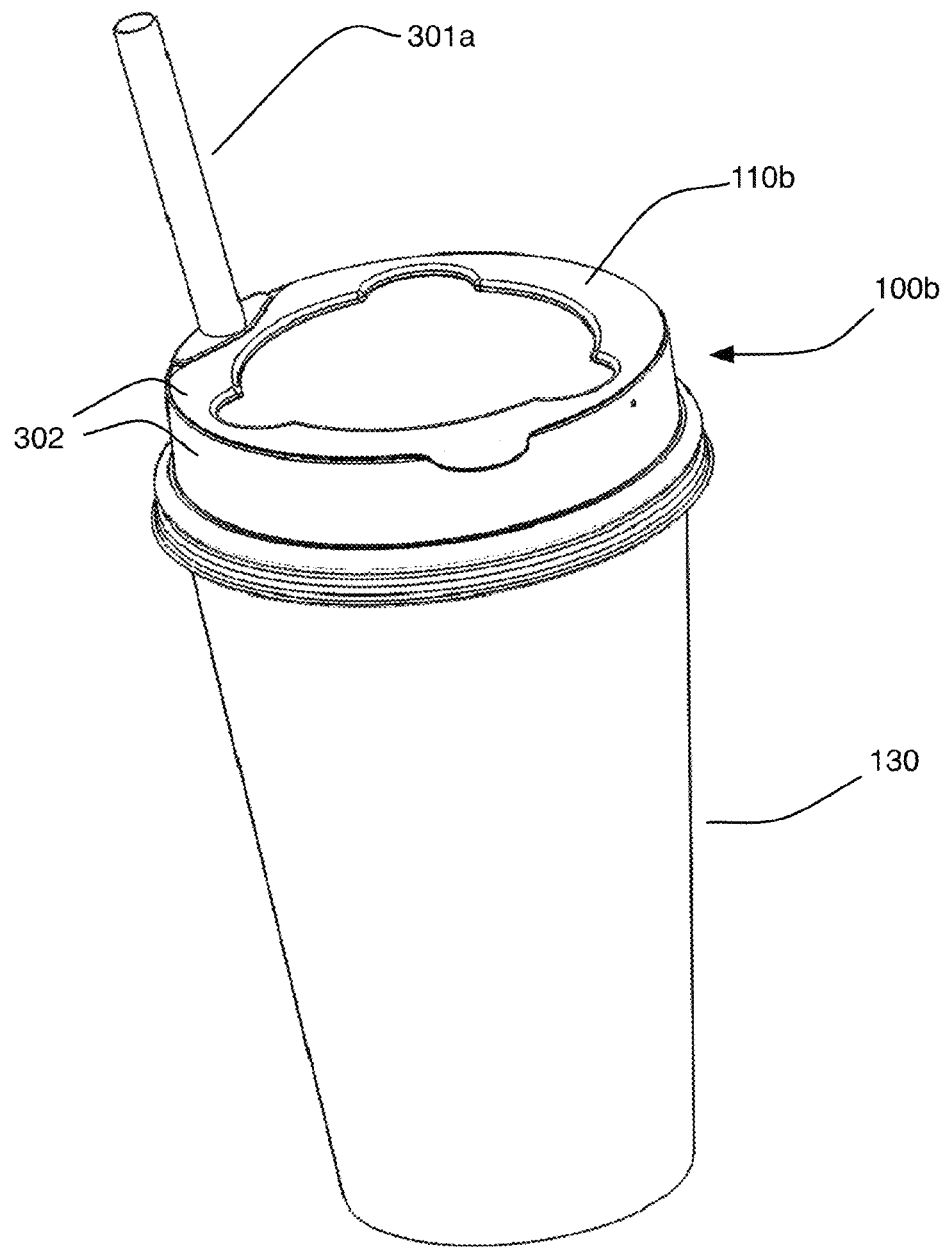
FIG. 3 illustrates a perspective view of an embodiment of the invention coupled with a cup, a seal-on/peel-off cover and configured to allow access to the contents of the cup via a straw.

FIG. 3 illustrates a perspective view of an embodiment of the invention 100*b* coupled with cup 130, seal-on/peel-off cover 110*b* and configured to allow access to the contents of the cup via straw 301*a*. The straw configuration is shown as one embodiment, although another embodiment may provide a sip hole or gulp hole for example. Area 302 may include graphic symbols or lettering or both graphic symbols and lettering of visual or tactile form, or logos, advertisements, bar codes, puzzles, promotions, trivia or information or any combination of any information, including thermochromic materials that show different information based on temperature.

Figure 4:
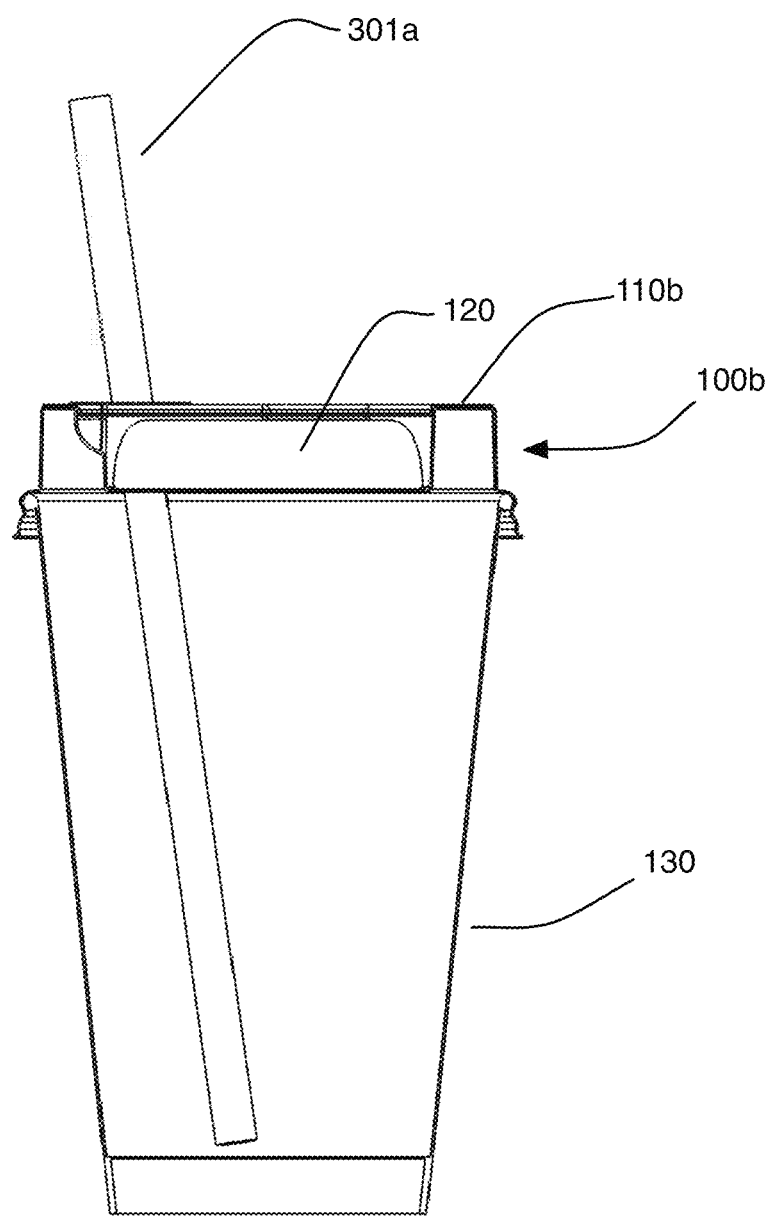
FIG. 4 illustrates a cross sectional view of FIG. 3.

FIG. 4 illustrates a cross sectional view of FIG. 3. As shown, the cup may be a soda, lemonade, coffee, or beer cup, for example, and is not limited to cups with a rolled rim, which are shown herein in an exemplary manner. One or more areas or walls may include a thermochromic plastic configured to change color based on a temperature of the first solid or liquid in the container. First solid or liquid 120 may include any combination of one or more cookies, chocolates, chips, crackers, nuts, popcorn, candies, ice cream, frozen yogurt, fruit pieces, burgers, French fries, sandwiches, milk, cream or any other item. Second liquid or solid in cup 130 may include any combination of ice cream, milk shake, frozen ice, ice coffee, milk, lemonade, water, soda, coffee, beer, mixed alcoholic beverage, frozen ice, ice coffee, or any other item.

Figure 5:
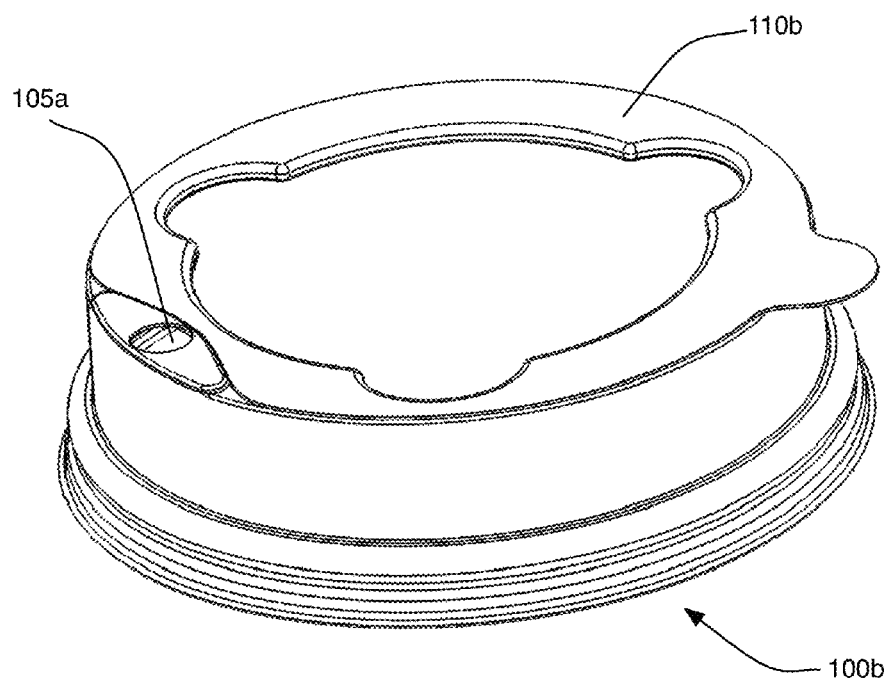
FIG. 5 illustrates a top perspective view of the embodiment shown in FIG. 3.

FIG. 5 illustrates a top perspective view of the embodiment of the invention shown in FIG. 3. The horizontal area on top of the embodiment shown includes hole 105*a* to allow access of the second liquid or solid, i.e., the contents of the cup. Without removing the cup lid, a person may also access the contents of the container on top of the cup. An optional vertical raised area surrounding the sip hole 105*a* is provided to elevate the sip hole area such that the user's lip does not come into contact with the potentially sharp edge of the container cover. The cover may optionally include any type of hole or cut out area such as a half oval for example that allows for hole 105*a* in the cup lid to be accessed. This is shown as a crescent indentation of cover 110*b* towards the centerline of the cup lid near hole 105*a*. Cover 110*b* is shown as vertically indented slightly downward to match the three finger indented cut-outs in the cup lid. Vertically indenting the cover acts to locate the cover in a desired position, however this is not required, and cover 110*b* may be implemented in any shape including a flat or planar embodiments as desired.

Figure 6:
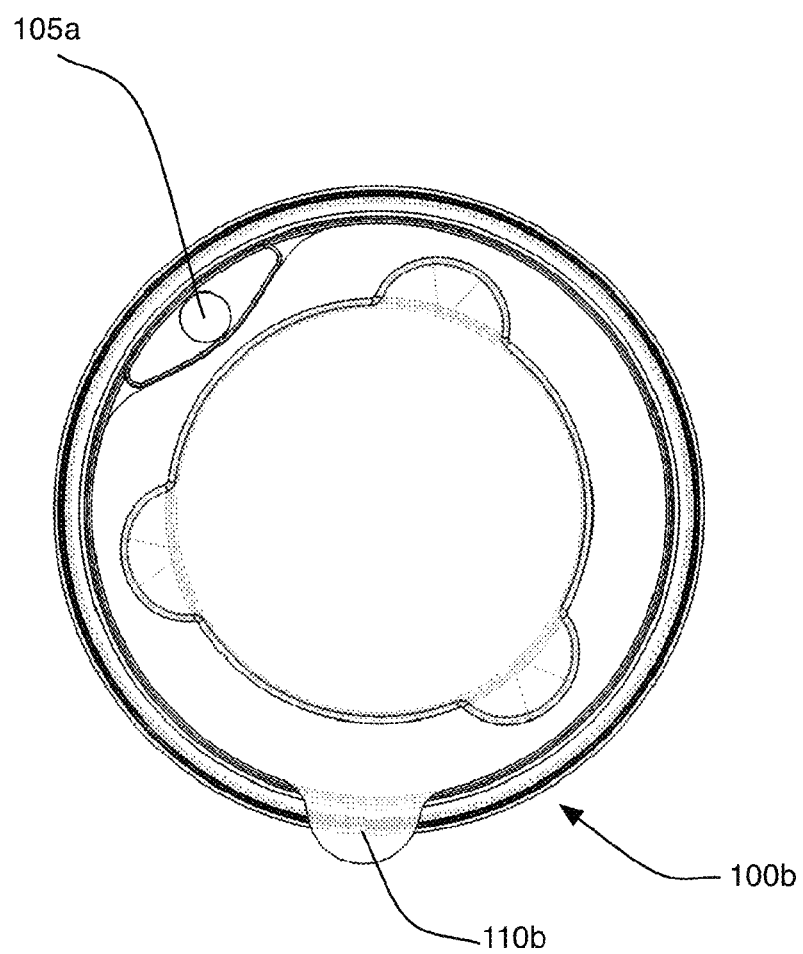
FIG. 6 illustrates a top view of the embodiment of the invention shown in FIG. 3.

FIG. 6 illustrates a top view of the embodiment of the invention shown in FIG. 3. The peel-off tab is shown at the bottom of the figure and allows for the seal-on/peel-off type cover 110*b* to be removed from the cup lid with cavity.

Figure 7A:
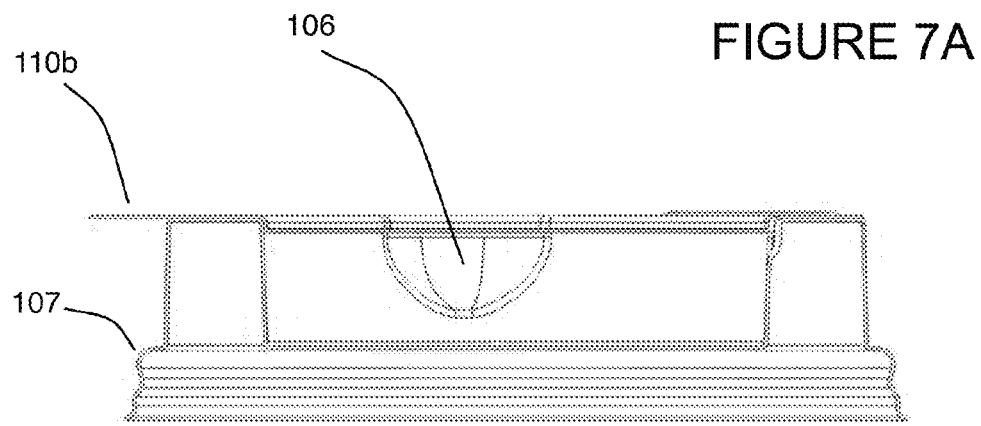
FIG. 7A illustrates a side cross sectional view of the embodiment of the invention shown in FIG. 3.

FIG. 7A illustrates a side cross sectional view of the embodiment of the invention shown in FIG. 3. Indented cut-outs 106 are configured to facilitate removal of items from within the container. The indented cut-outs are not required as some types of items to be stored in the container may not need cut-outs for finger access, e.g., ice cream. As shown the walls include two lines which may indicate a particular thickness of one wall or may indicated two or more walls to enable for more insulative embodiments.

Figure 7B:
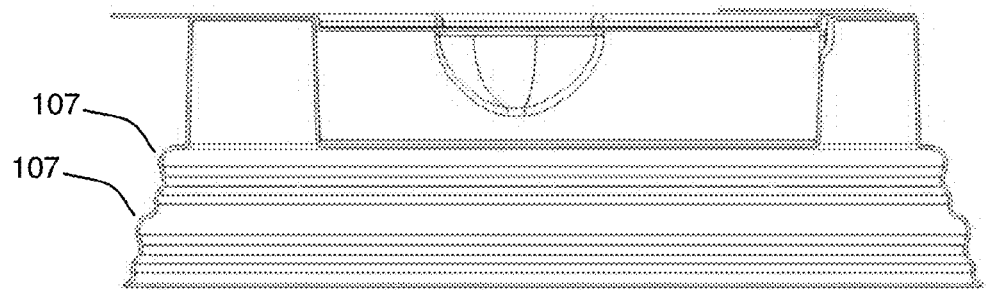
FIG. 7B illustrates a side cross sectional view of the embodiment of the invention shown having two or more coupling elements configured to couple with cups of different sizes.

FIG. 7B illustrates a side cross sectional view of the embodiment of the invention shown having two or more coupling elements configured to couple with cups of different sizes. In this figure, more than one coupling element, here 107 having different diameters are employed so that embodiments of the invention may fit different sized cups. For example, the embodiment shown in FIG. 7B may be sized to couple with large or small coffee cups or large or small soda cups. In addition, three or more coupling elements 107 may also be employed having three or more differing diameters, so that embodiments of the invention may couple with small, medium and large cups as one skilled in the art will appreciate. In this manner, only one size of cup lid, albeit with as many diameter coupling elements as desired, may be utilized to accommodate the different sized cups utilized. Although the embodiment shown has vertically offset coupling elements, other embodiments may utilize coupling elements that are horizontally offset without a vertical offset, as one skilled in the art will appreciate.

Figure 7C:
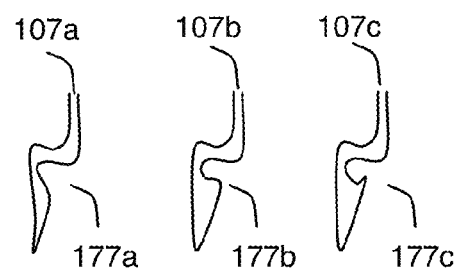
FIG. 7C illustrates different embodiments of coupling elements that may be utilized to attach the top container to the cup rim.

FIG. 7C illustrates different embodiments of coupling elements that may be utilized with embodiments of the cup lid. Cross section of coupling element 107a is similar to coupling element 107, and may be easier to decouple from the cup lid based on the large angle at bend 177a. Cross section of coupling element 107b is a harder-to-remove version of coupling element 107 based on the smaller angle at bend 177b, which requires more force to remove from the rolled edge of a cup for example. Cross section of coupling element 107c shows a semi-permanent or permanent coupling element based on the hook-like sharp angle at bend 177c. Depending on the stiffness of the material utilized in construction of the cup lid, the sharp angle at bend 177c may allow for the entire cup, even if full of liquid, to be lifted by the cup lid. This prevents spills by keeping the cup lid and cup attached even with large forces involved. As one skilled in the art will appreciate, multiple diameter coupling elements (as shown in FIG. 7B) on one cup lid may utilize any combination of the coupling elements 107a, 107b or 107c in any embodiment of the invention. For example, in one embodiment, the smallest diameter coupling element on the top portion of FIG. 7B may utilize coupling element 107a or 107b while the lower coupling element on the bottom portion of FIG. 7B may utilize coupling element 107b or 107c for example to allow for more strength for large cups that may weigh more. Any number of different diameters may be utilized with any embodiment of the coupling element and any other coupling element known in the art may be utilized if desired and based on the application, as one skilled in the art will appreciate.

Figure 8:
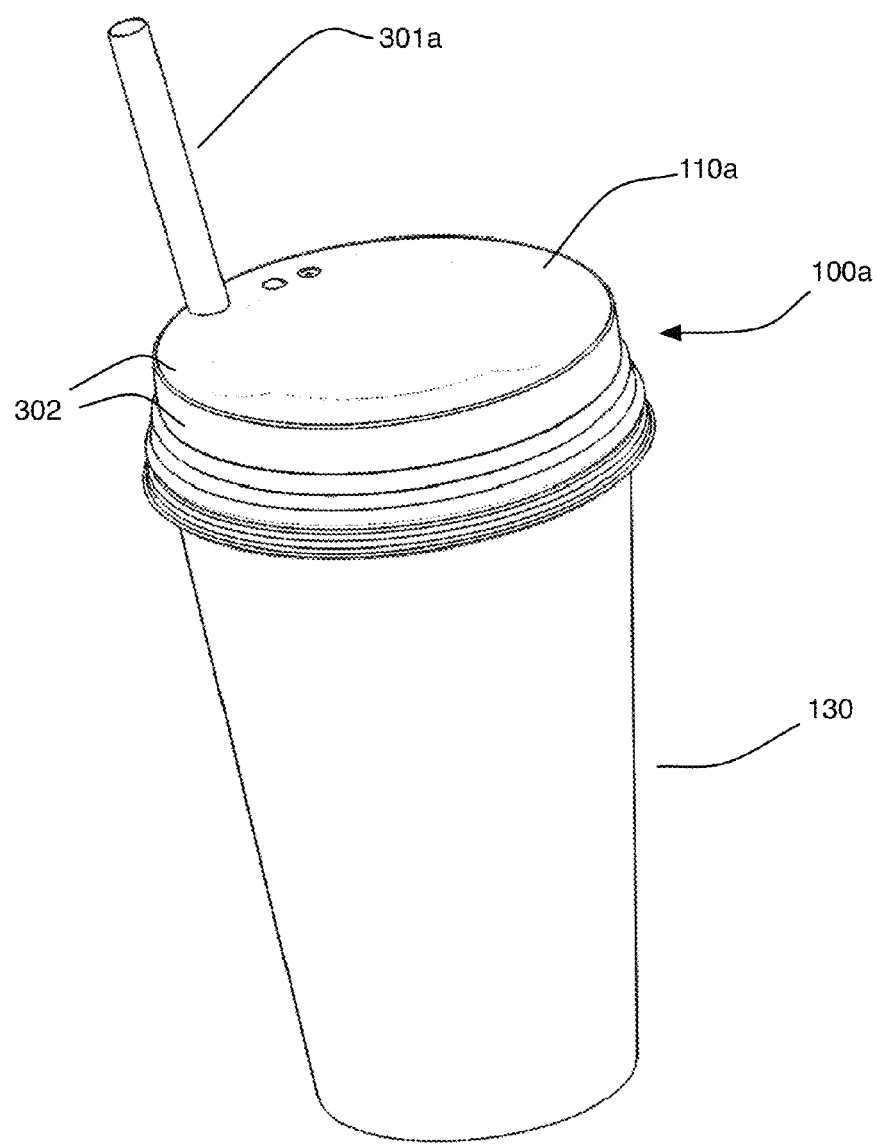
FIG. 8 illustrates a perspective view of an embodiment of the invention coupled with a cup, a press-on friction cover and configured to allow access to the contents of the cup via a straw.

FIG. 8 illustrates a perspective view of an embodiment of the invention 100a coupled with cup 130, press-on friction cover 110a and configured to allow access to the contents of the cup via straw 301a.

Figure 9:
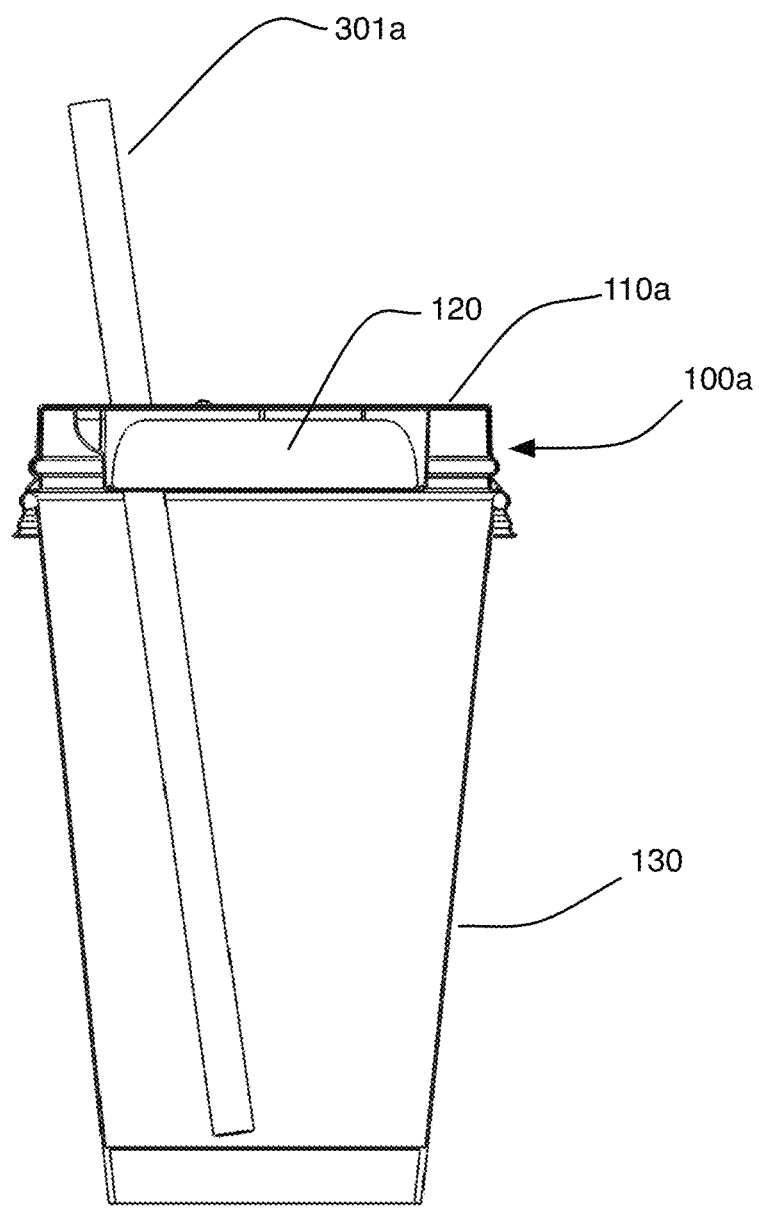
FIG. 9 illustrates a cross sectional view of FIG. 8.

FIG. 9 illustrates a cross sectional view of FIG. 8. Press-on friction cover 110a extends down the sides of the cup lid to couple with the cup lid as is described in more detail below with respect to FIG. 10.

Figure 10:
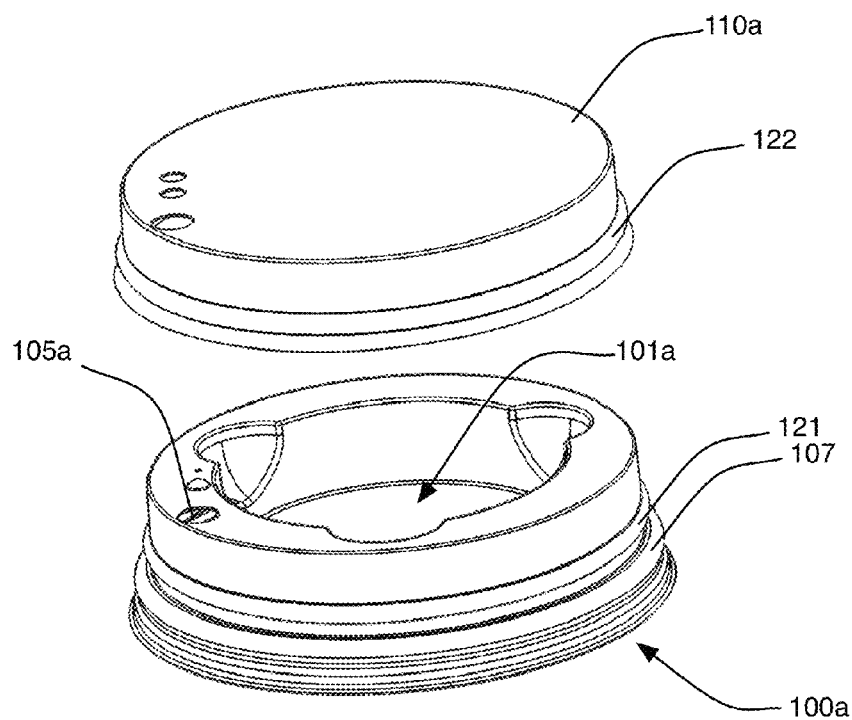
FIG. 10 illustrates a top perspective view of the embodiment of the invention shown in FIG. 8 along with an embodiment of a press-on friction cover.

FIG. 10 illustrates a top perspective view of the embodiment of the invention shown in FIG. 8 along with an embodiment of a press-on friction cover. As shown, cover coupling element 121 on embodiment 100a is optionally configured to couple with cover coupling element 122 on cover 110a. This allows for cover 110a to press onto cup lid 100a in a non-permanent manner that allows for cover 110a to be removed by pulling cover 110a vertically as shown with enough force to move cover coupling element 122 away from cover coupling element 121. An alternative is to extend the vertical side wall of 110a such that coupling element 122 is able to couple to coupling element 107 on cup lid 100a.

Figure 11:
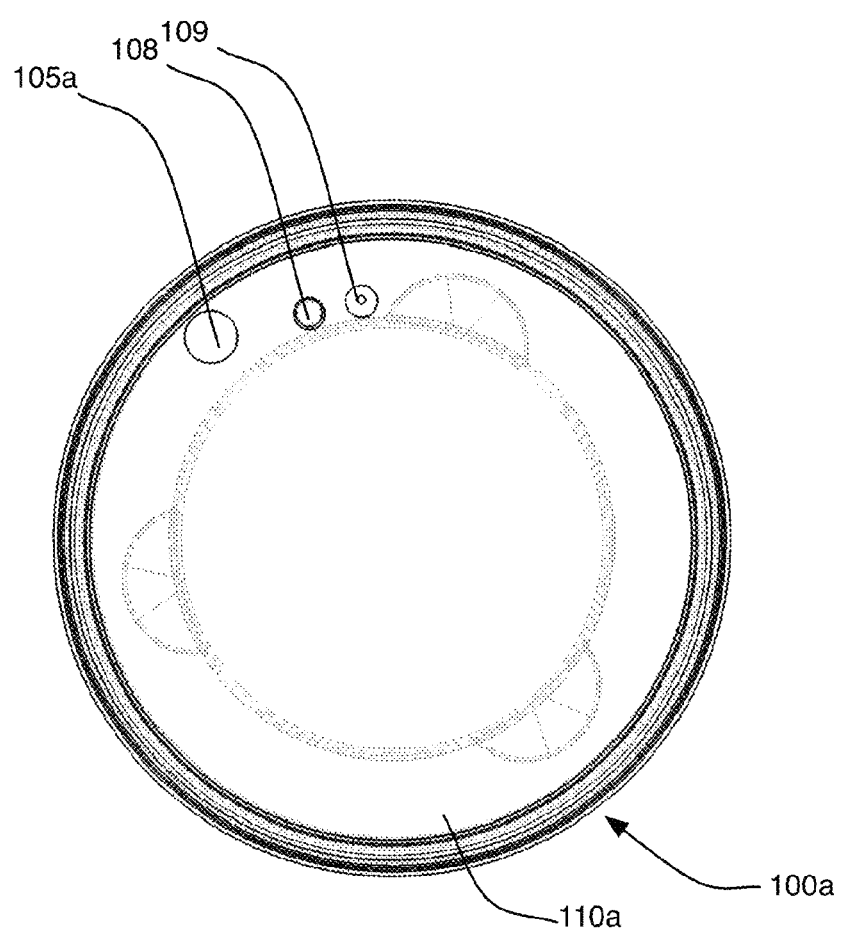
FIG. 11 illustrates a top view of the embodiment of the invention shown in FIG. 8 along with the open/close positioning holes for sealing off or providing access to the sip hole or straw hole.

FIG. 11 illustrates a top view of the embodiment of the invention shown in FIG. 8 showing sip hole open/close rotation index 108 of which there are two in the embodiment shown of which one is called out with reference number 108, the other of which is not called out for brevity, vacuum release pin hole 109 and hole 105a. Optional indicators may also be utilized on the top of cover 110a (not shown for brevity), which may be tactile or visual indicators of any information, including information as to whether the contents of the container or cup are of a certain type, e.g., chocolate/vanilla, caffeinated/decaffeinated, diet/regular, or any other information.

Figure 12A:
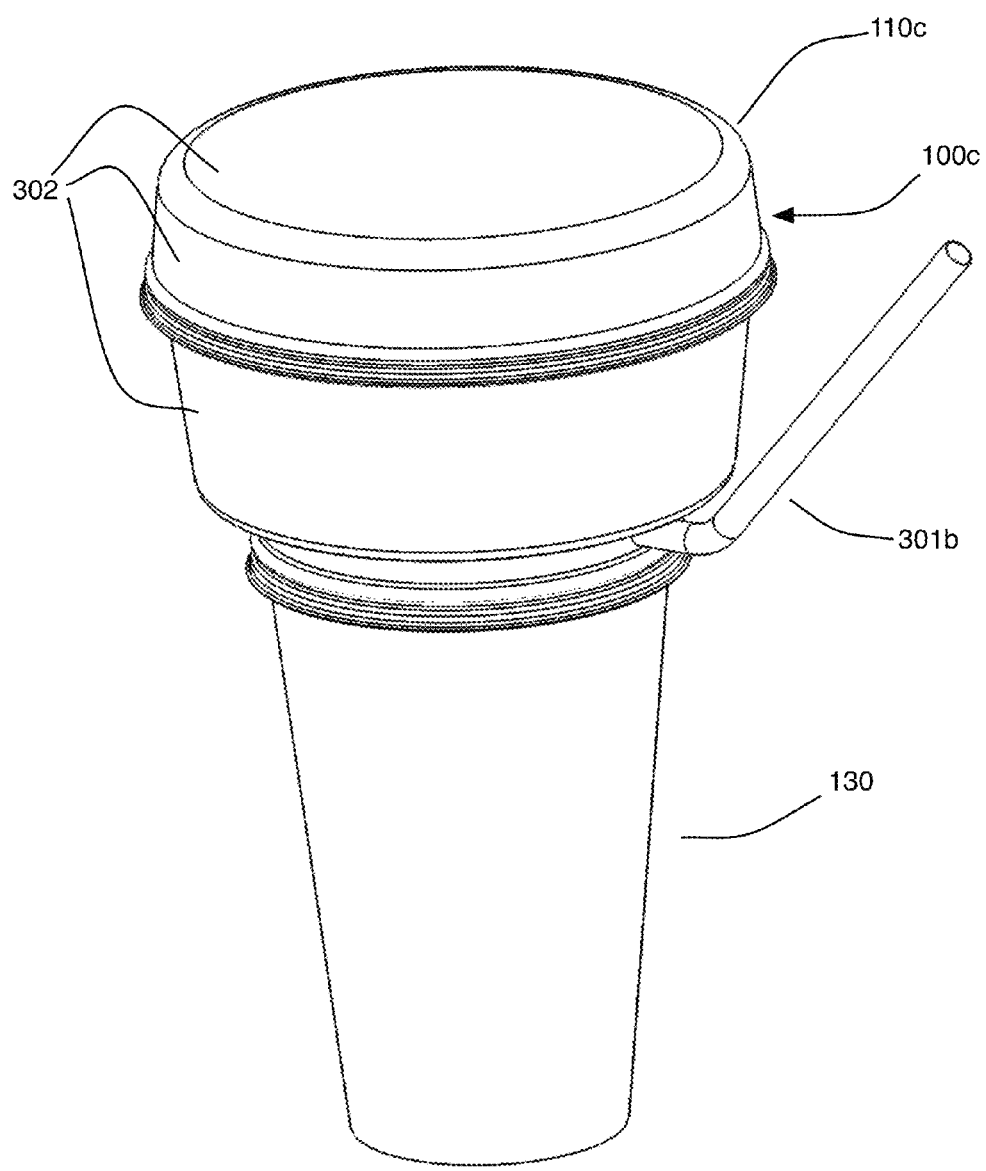
FIG. 12A illustrates a perspective view of an embodiment of the invention coupled with a cup, a container with an optional upper press-on friction dome style cover and configured to allow access to the contents of the cup through a hole in a vertical sidewall in the bottom cup lid, via a straw.
Figure 12B:
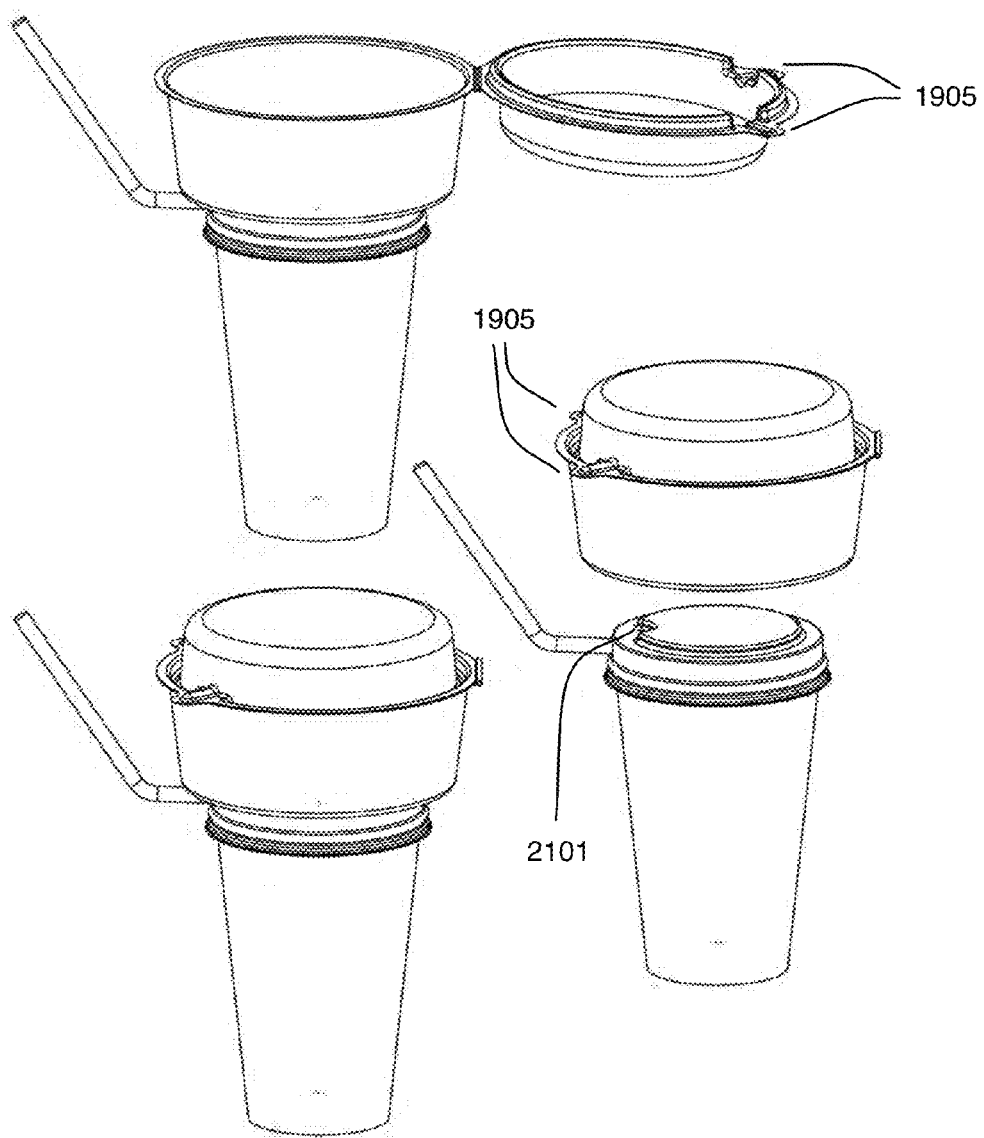
FIG. 12B illustrates a rotationally aligned embodiment of the container of FIG. 12A employing a clamshell style cover, to form a clamshell hinge container, with tabs for easy opening and wherein the clamshell style cover is configured to open away from the straw and wherein the contents of the cup are accessed via a hole in a vertical sidewall of the bottom cup lid via the straw. In one or more embodiments, tabs include strengthening ribs that project relatively orthogonal to the plane of the tabs to provide for a stronger tab and/or enable use of thinner plastic or both. As shown.
Figure 12C:
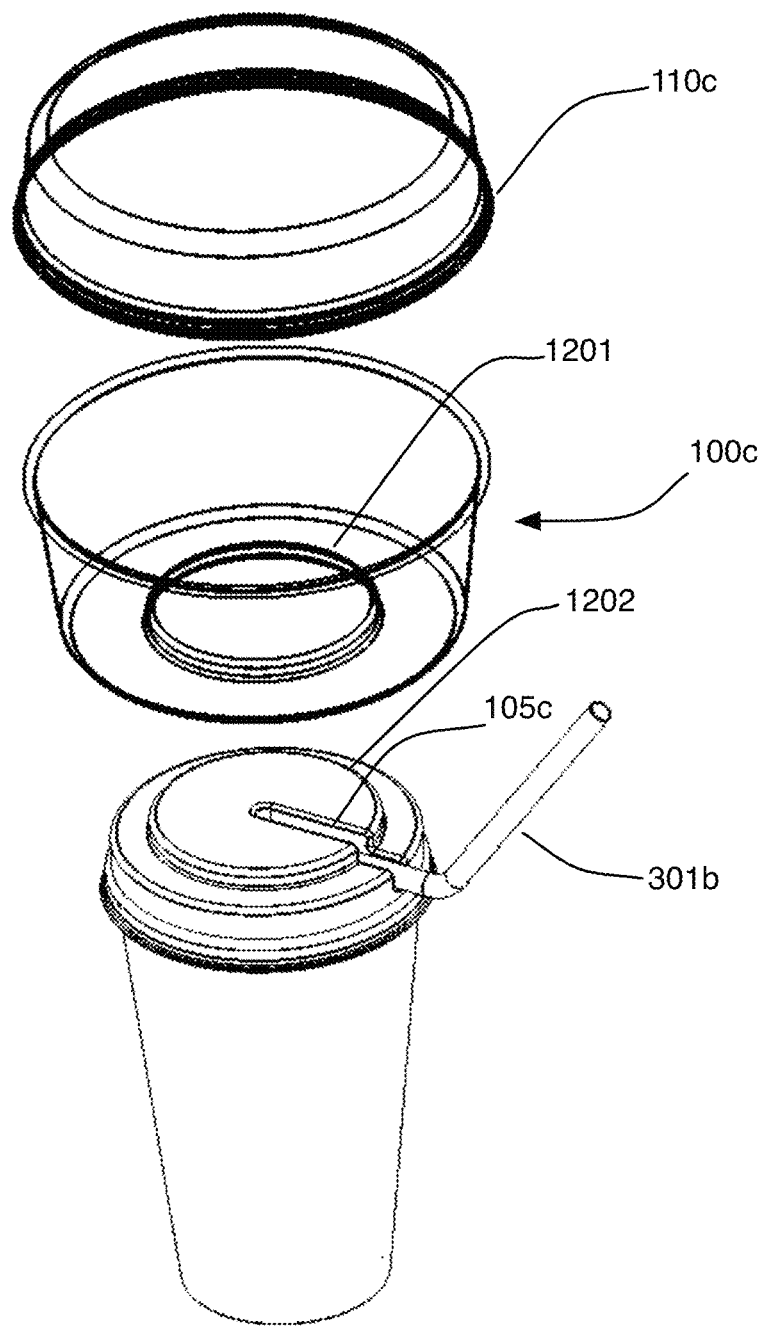
FIG. 12C illustrates an exploded view of a different embodiment of the base portion of the cup lid having a channel for the straw to travel up and out of the cup lid and a raised circular friction male/female coupling system that allows for the disengagement/reattachment of the top container to the cup lid below.
Figure 12D:
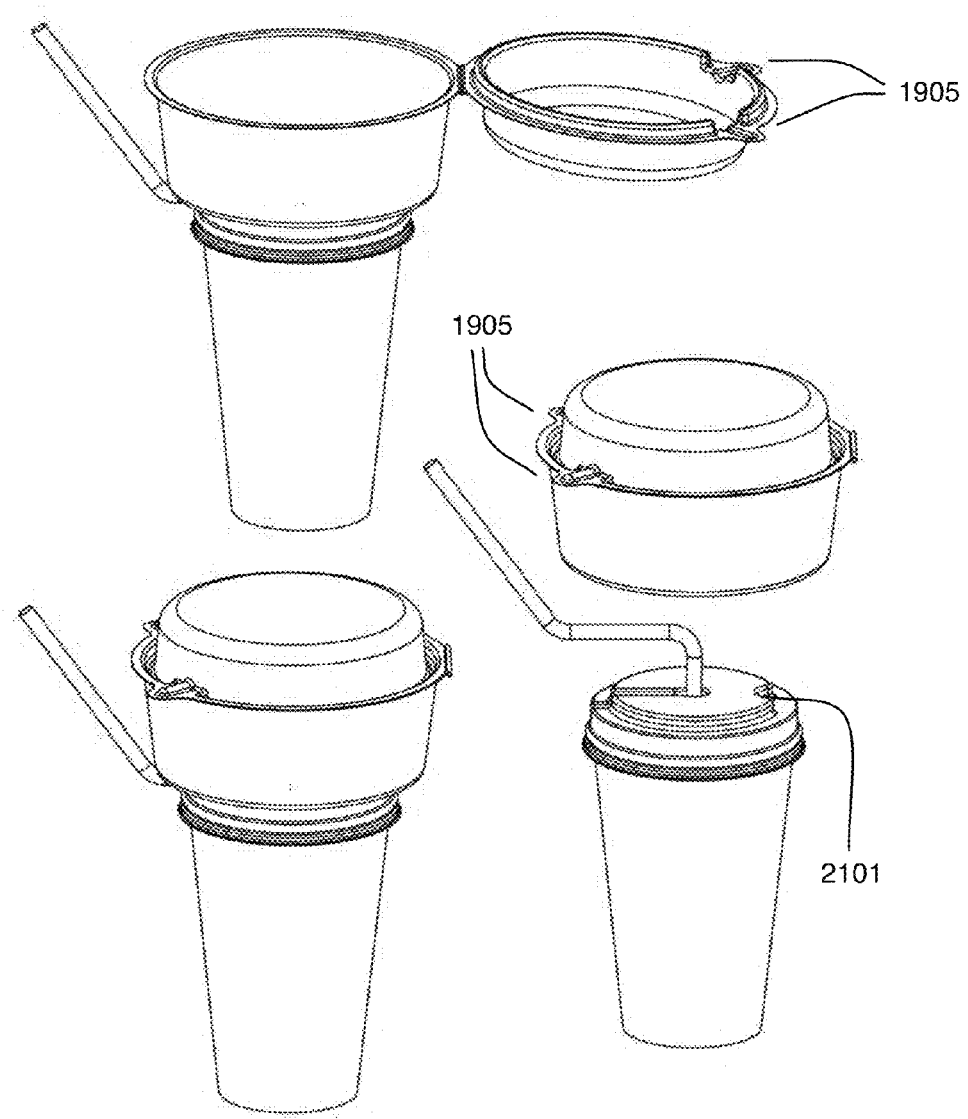
FIG. 12D illustrates a rotationally aligned embodiment of the container of FIG. 12C that utilizes a clamshell style cover with tabs for easy opening and wherein the clamshell style cover is configured to open away from the straw and wherein the contents of the cup are accessed via a channel in a vertical sidewall of the bottom cup lid via the straw and wherein the base portion of the cup lid utilizes the channel and coupling system of FIG. 12C.
Figure 12E:
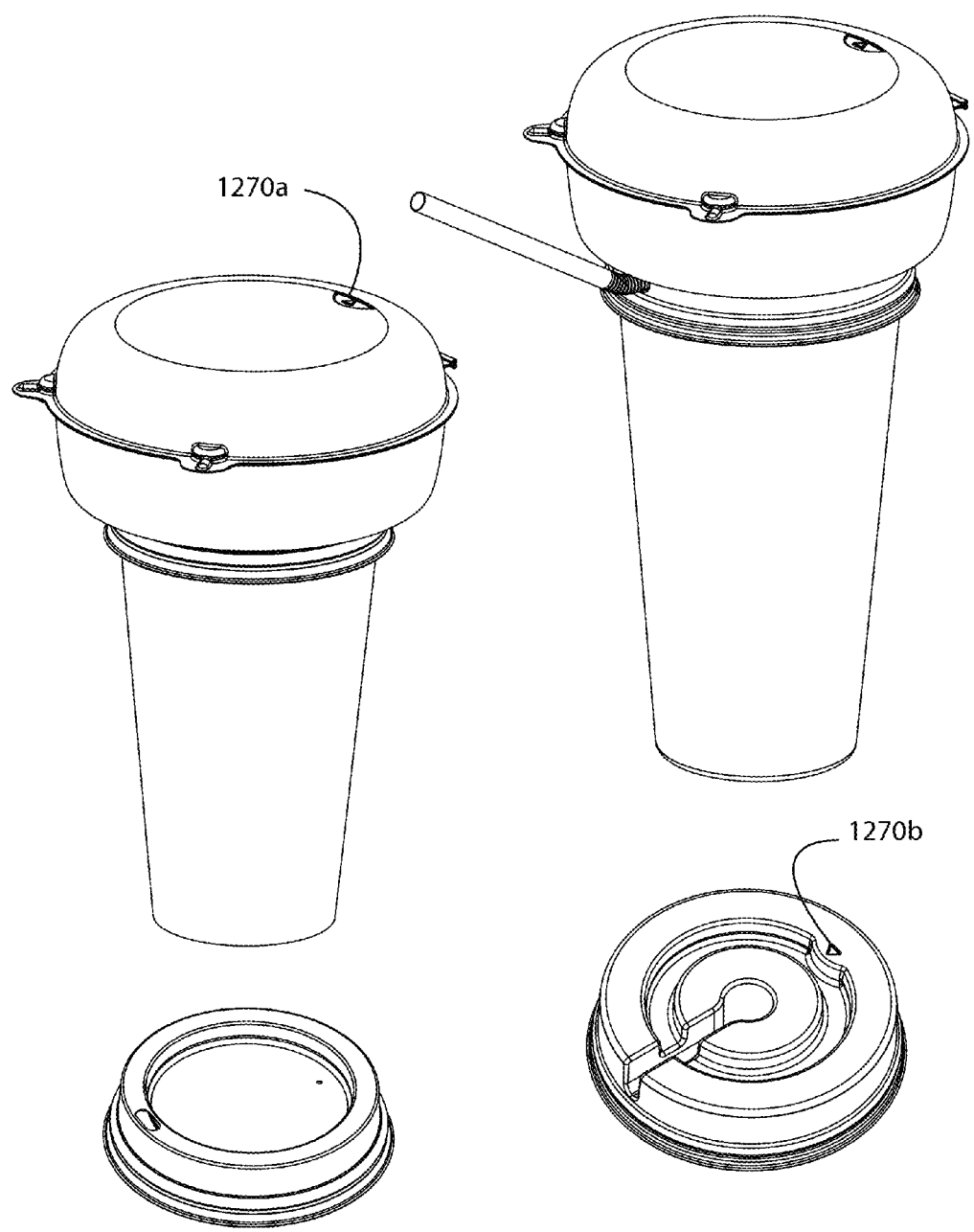
FIG. 12E illustrates an embodiment with a clamshell cover showing a sip hole that is covered when the top container is coupled to a coffee cup or tea cup on the left side of the page, and a straw hole embodiment wherein the top container is coupled to a cold drink cup on the right side. The lid/container for the straw channel embodiment includes an alignment annotation along with a corresponding alignment male bump for rotational alignment. The same clamshell container may be utilized on both lid embodiments since the sip hole may be covered on the coffee cup, it does not matter what rotational value the top container has on the coffee cup.
Figure 12F:
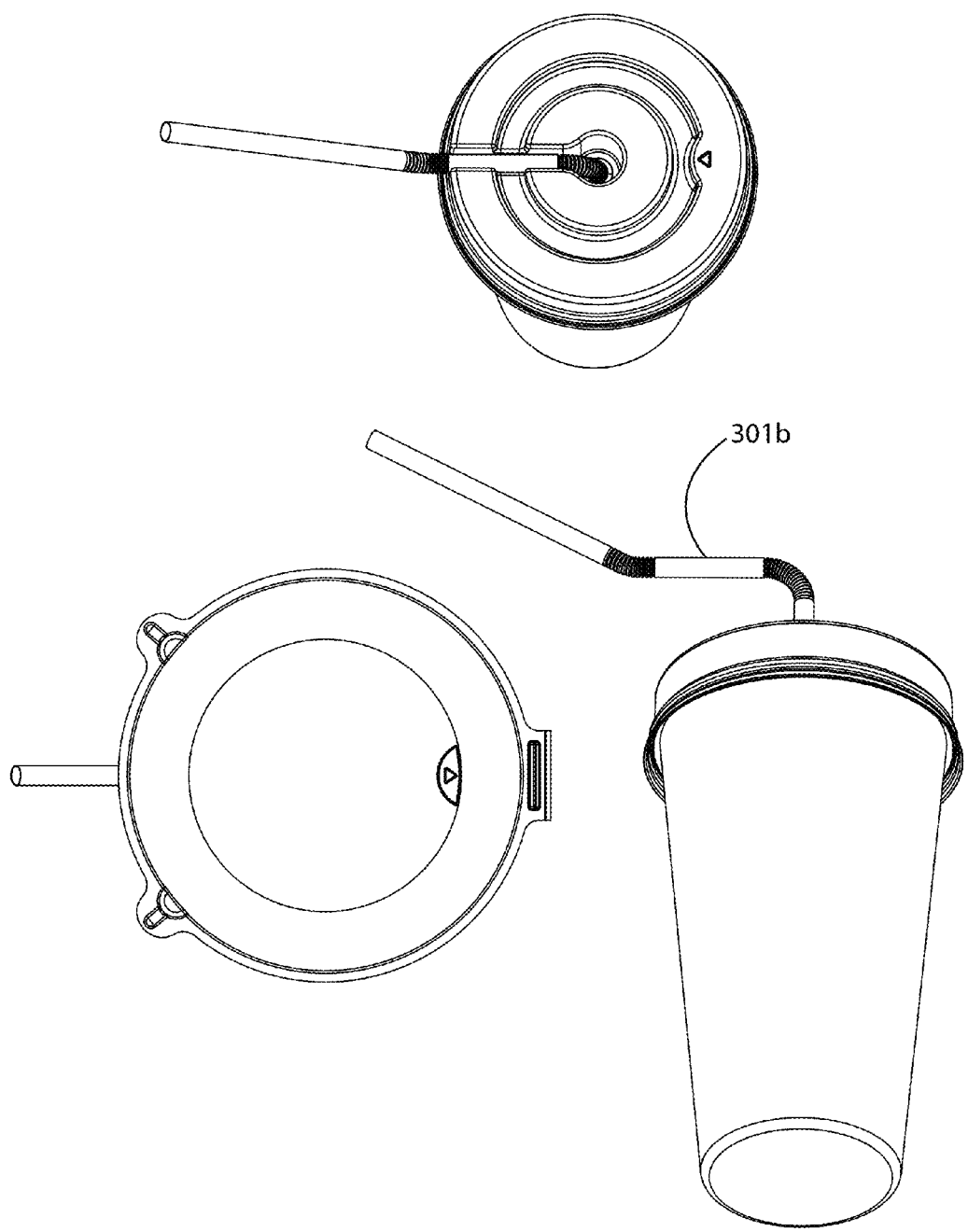
FIG. 12F shows the straw hole embodiment with a tri-bend straw and alignment annotation indicators.
Figure 19:
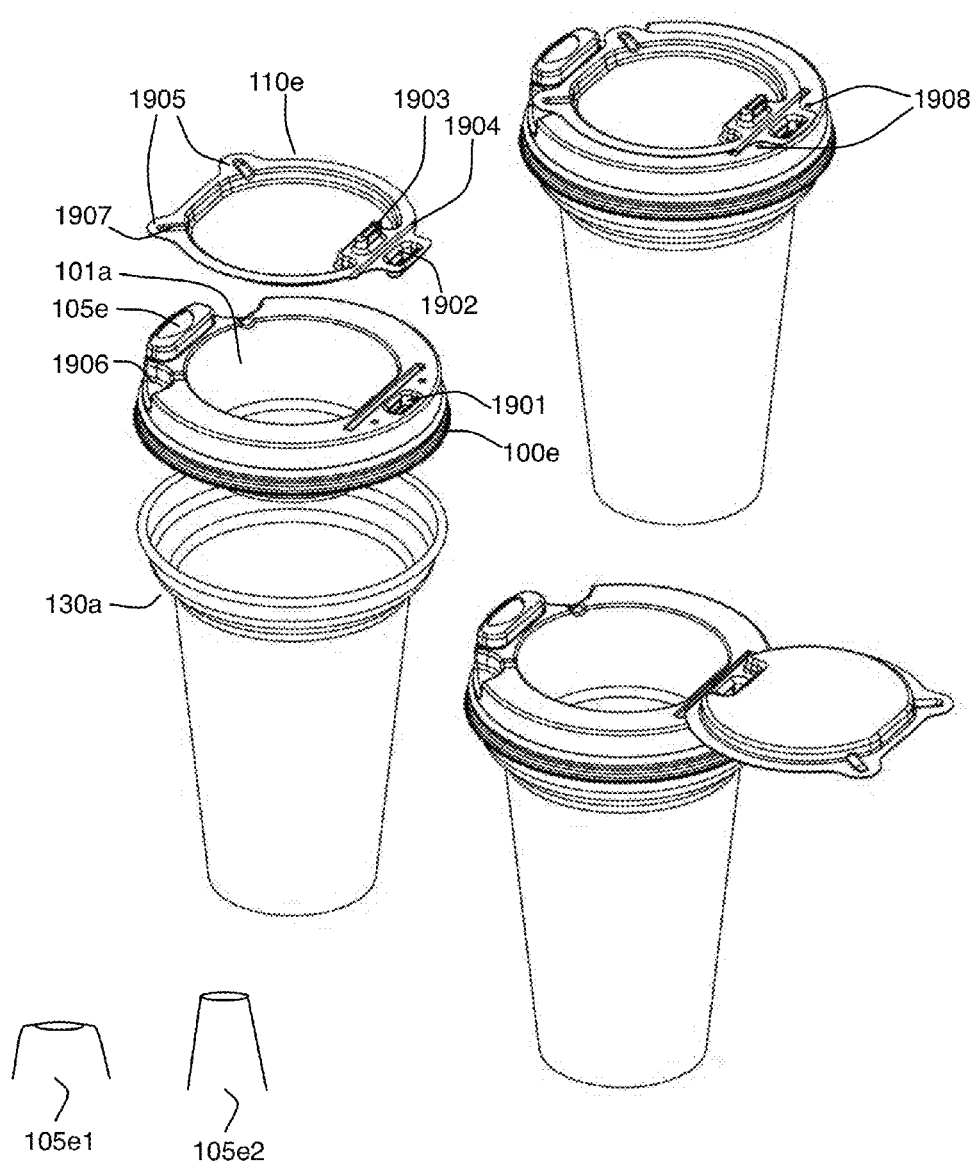
FIG. 19 illustrates an embodiment of the invention that employs a hinge lid/cover.

FIG. 12A illustrates a perspective view of an embodiment of the invention 100c with a container with an optional upper press-on friction dome style cover 110c coupled with cup 130, and configured to allow access to the contents of the cup via straw 301b. An alternative to using a press-on friction dome cover is to use an optional clamshell hinge cover, which may be selected depending upon the shape and height (hamburger, for example) of the food item that is chosen to reside within the container, is shown in FIG. 12B. In addition, FIG. 12B illustrates a rotationally aligned embodiment of the container of FIG. 12A with tabs 1905 for easy opening of the cover and wherein the clamshell style cover is align in one orientation so as to open away from the straw and wherein the contents of the cup are accessed via a hole in a vertical sidewall of the bottom cup lid via the straw. In one or more embodiments, tabs include strengthening ribs that project relatively orthogonal to the plane of the tabs to provide for a stronger tab and/or enable use of thinner plastic or both. The strengthening ribs are also shown in FIG. 19 as downward indentations that provide strength for the tabs. Clamshell hinge containers that may be utilized may have covers that may be upwardly contoured (in any shape), domed, or flat. Clamshell hinge containers may be molded and die cut from one piece of material where the upper and bottom parts are connected by a bridge of material that has a perpendicular hinge trough, (single or double trough) located at the halfway point of the bridge that connects the two halves. The clamshell hinge cover may optionally include a hole through the top for a fork or a spoon. To keep the clamshell hinge container closed while transporting food from one location to another, the top and bottom of the container may be held together by any type of friction element(s). An example of a friction system that may be utilized is where the top lid inserts slightly downward into the bottom container at the edge where the two meet, i.e., internal wall friction press-on lid or cover. Another friction system that may be employed is male and female indentations of any shape or size that mate together and are located in the horizontal surface of the lip edge that surrounds the top lid and bottom container at the point where the two meet. Any of the embodiments of the cup lid may include a separate or integrated thermal or paper liner configured to reside within the container and configured to hold hot or cold items as one skilled in the art will appreciate. Alternatively, or in combination, at least one wall may be a double wall having for example an air gap that provides additional insulation between the temperatures in the container versus the cup as one skilled in the art will appreciate. FIG. 12C shows channel 105c with a hole in the inner portion of the base of the cup lid for straw 301b to exit from the cup. The upper portion of cup lid 100c may attach in any manner such as via a circular male/female coupling element 1201 to the lower portion of the cup lid that couples with the cup at 1202, as shown in the figure surrounding the straw channel. In one or more embodiments of the invention, the bottom portion of cup lid 100c, i.e., the lower portion of the container, may include a non-permanent, semi-permanent or permanent coupling element to attach with the lower portion of the cup lid shown attached to the top of the cup. In this manner, the container portion of cup lid 100c may be disengaged from the lower portion of the cup lid that then remains on the cup. The coupling element between the upper portion of cup lid 100c and lower portion of the container may be of any type in relation coupling elements. See for example the vertical wall coupling element that couples with the cup itself, shown in FIG. 7A, coupling element 107 for example. A screw type of coupling, or adhesive, or one-way coupling element may also be utilized as desired to provide for non-permanent, semi-permanent or permanent coupling types. In addition to a male/female coupling system, there may be male/female alignment elements (female element 2101 shown while male counterparts not visible on the bottom of the container) as shown in FIG. 12B that align the top clamshell container and lid below, such that, for example, as the top clamshell container opens, it faces the straw location and user. This has the advantage of a frontward oriented configuration in relation to the user, for opening the clamshell container. Frontward oriented opening is ergonomic, logical, and user friendly. This is also shown in FIG. 12D, albeit with the female indentation shown on the opposing side of the straw with respect to the embodiment of FIG. 12B. There is no requirement for the male/female alignment elements to be in any shape or quantity so long as the top and bottom portion of the container may be rotationally aligned at a desired orientation to keep the clamshell opening away from the straw for example. Alternatively, in the absence of male/female coupling systems, the bottom horizontal surface of the lower portion of the container may be permanently bonded to the upper horizontal surface of the cup lid that attaches to the cup rim via heat or thermo-bonding, sonic bonding or welding, spot welding or fusing, epoxy bond, hot melt glue bond, transfer adhesive bond, or double-sided tape bond. FIG. 12E shows an embodiment of the clamshell cover with a sip hole on the left that is covered when the top container is coupled to a coffee cup or tea cup, and a straw hole embodiment wherein the top container is coupled to a cold drink cup on the right side. The top container's cover has an alignment annotation 1270a. The lid for the straw channel embodiment includes an alignment annotation 1270b along with a corresponding alignment male bump for rotational alignment. The same clamshell container may be utilized on both lid embodiments, it does not matter what rotational value the top container has on the coffee cup. FIG. 12F shows the straw hole embodiment with the straw in place. See FIG. 15C for a close up of the coupling element 1574 that is smaller than the outer diameter of the lower cup lid and may be utilized in these embodiments or any other embodiments detailed herein.

Figure 13:
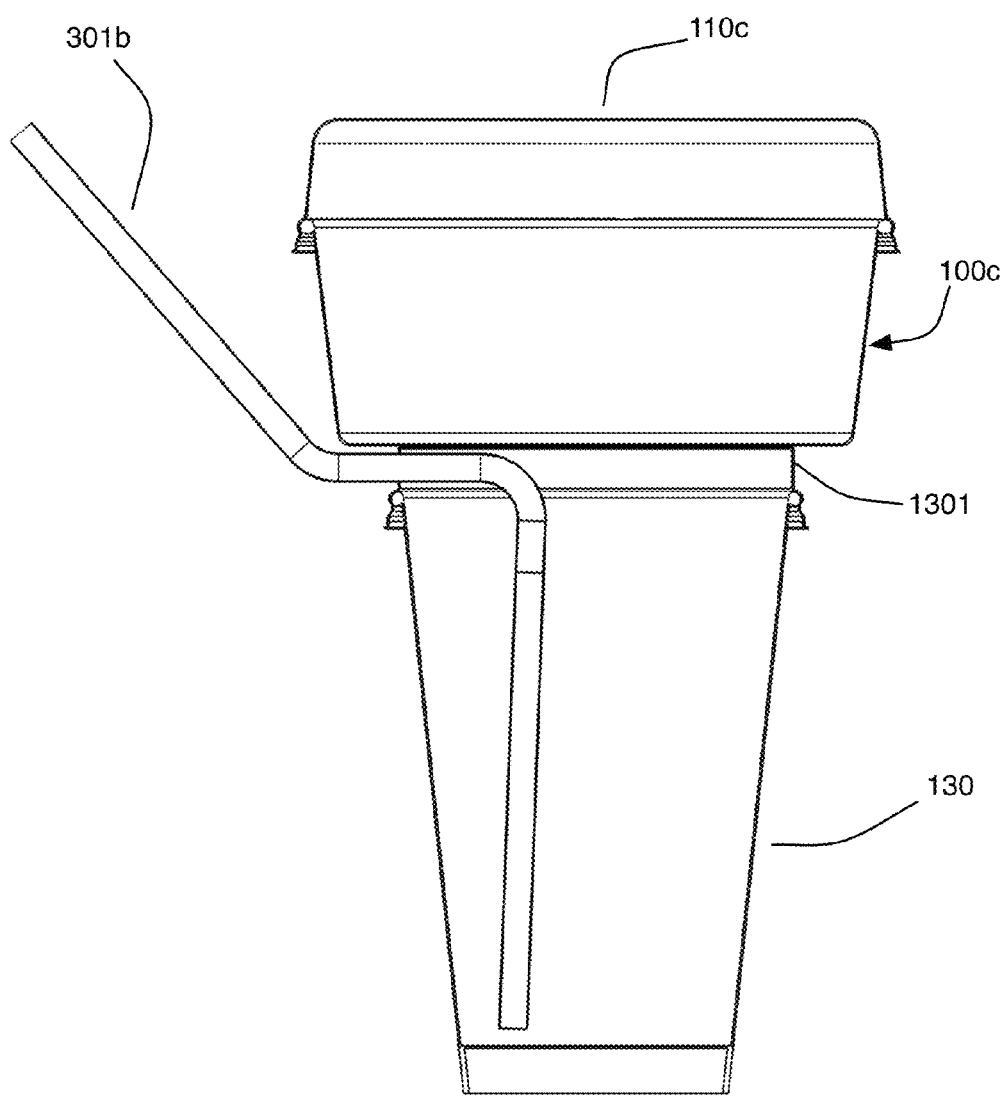
FIG. 13 illustrates a cross sectional view of FIG. 12, along with a tri-bend straw configuration.

FIG. 13 illustrates a cross sectional view of FIG. 12 showing straw 301b exiting from a vertical wall 1301 of embodiment 100c. A straw with more than one bend for example may be utilized with this embodiment. Having the straw hole and straw exit through the vertical side wall is advantageous, in that the straw resides outside of the adjacent food container, which means that the straw never interferes with the food that is in the container.

Figure 14:
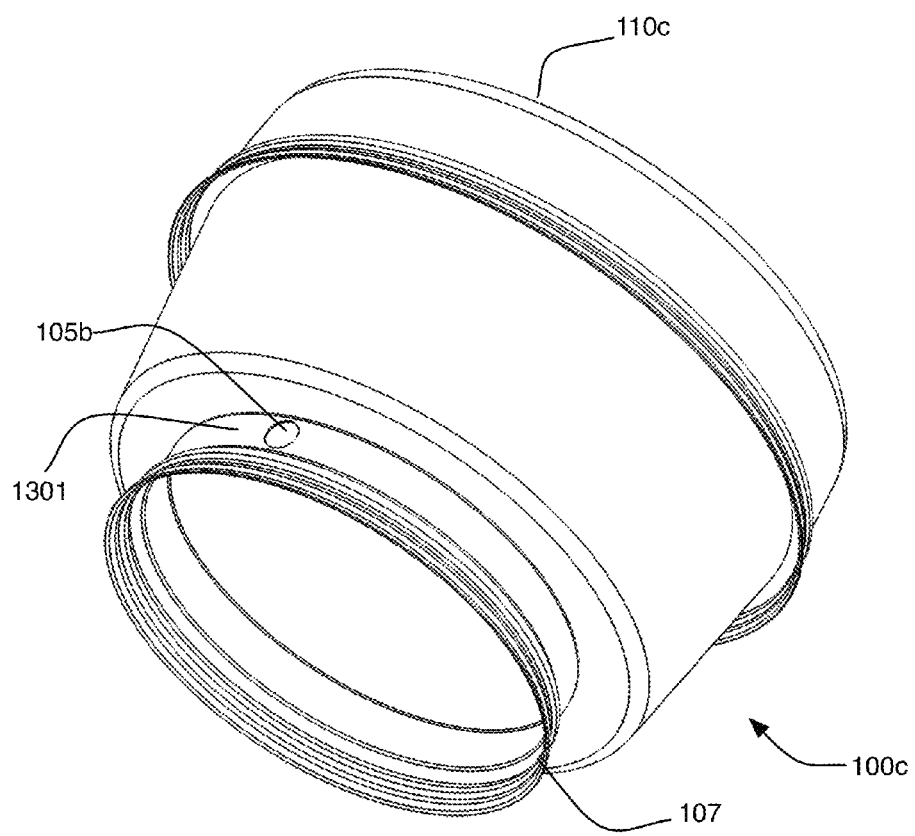
FIG. 14 illustrates a bottom perspective view of the embodiment of the invention shown in FIG. 12 along with an embodiment of the press-on friction dome cover and a straw hole located in the vertical wall of the cup lid.

FIG. 14 illustrates a bottom perspective view of the embodiment of the invention shown in FIG. 12 showing hole 105b along with embodiment that includes the optional press-on friction dome cover 110c. The top horizontal area of the lower cup lid that couples with the cup via coupling element 107 may be bonded to the upper container in any manner or may be formed as part of the upper container as desired. Cover 110c may couple with container 100c in any manner desired as one skilled in the art will appreciate. Cover 110c may be optionally attached to 100c via a clamshell style hinge. When 110c and 100c are attached they are made from a single piece construction in one or more embodiments.

Figure 15:
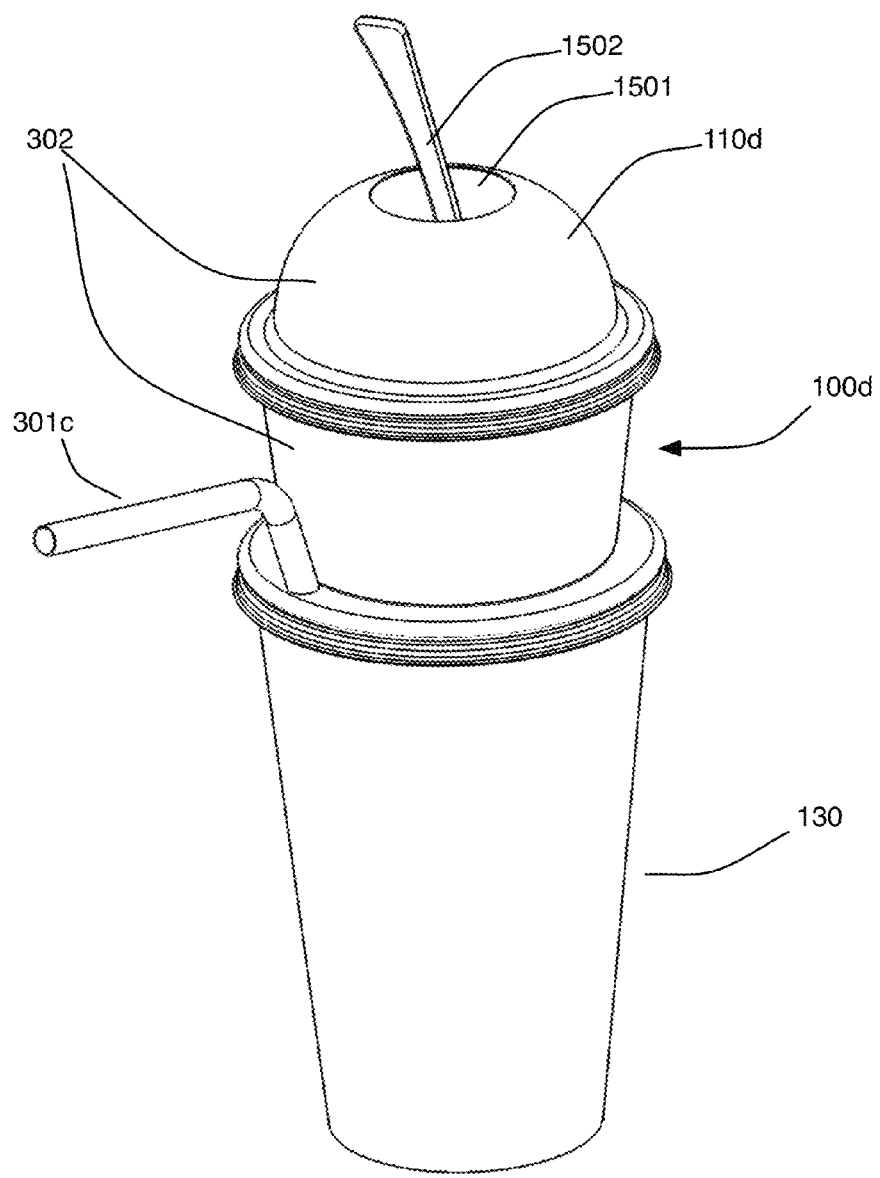
FIG. 15 illustrates a perspective view of an embodiment of the invention coupled with a cup, an optional press-on friction dome cover with a hole for a spoon/fork or any other eating utensil and configured to allow access to the contents of the cup via a straw.

FIG. 15 illustrates a perspective view of an embodiment of the invention 100d coupled with a cup, an optional press-on friction dome cover 110d with hole 1501 for example for access of the contents of the top container via spoon 1502 and configured to allow access to the contents of the cup via a straw via a hole in a horizontal portion of cup lid 100d. This embodiment has a horizontal dimension of the bottom of the container that is less than the diameter of the opening of the cup as opposed to the embodiment shown in FIG. 12 for example. The smaller diameter of the bottom of the top food container is advantageous in that it allows room for a straw hole and straw to reside within the horizontal surface of the cup lid, such that the liquid in the bottom cup may be accessed. Locating the straw hole and straw adjacent to the top food container means that the straw is located next to, or to the side of, the food container, which is advantageous, as the straw does not interfere with the container, or the food that resides within the container. An alternative to using a press-on friction dome cover is to use an optional clamshell hinge cover, which may be selected depending upon the shape and height (muffin 1550, see FIG. 15A, for example) of the food item that is chosen to reside within the container. This is shown in FIG. 15A as an embodiment with easy opening tabs 1905. The advantage of easy opening tabs is that as they overhang past the top lip edge of the bottom container, they are unobstructed by any plastic from the bottom container lip edge. Access to the unobstructed overhang tabs is from the underside where it is easy to lift them with a thumb and/or fingers. Clamshell hinge containers that may be utilized may have covers that may be upwardly contoured (in any shape), domed, or flat. Clamshell hinge containers may be molded and die cut from one piece of material where the upper and bottom parts are connected by a bridge of material that has a perpendicular hinge trough located at the halfway point of the bridge that connects the two halves. The clamshell hinge cover may optionally include a hole through the top for a fork or a spoon. To keep the clamshell hinge container closed while transporting food from one location to another, the top and bottom of the container may be held together by any type of friction element(s). An example of a friction system that may be utilized is where the top lid inserts slightly downward into the bottom container at the edge where the two meet, i.e., internal wall friction press-on lid or cover. Another friction system that may be employed is male and female indentations of any shape or size that mate together and are located in the horizontal surface of the lip edge that surrounds the top lid and bottom container at the point where the two meet. Other lids or covers that may be optionally utilized are seal-on/peel-off covers, which may be used with fruit containers, for example, to seal in the fruit and keep it fresh, while additionally, the container may couple via male and female elements to the cup lid attached to the cup. A male/female coupling system may be utilized to couple the bottom horizontal surface of the container to the top horizontal surface of the lid that attaches to the rim of the cup, or alternatively, these surfaces may be permanently attached or bonded to each other via heat or thermo-bonding, sonic bonding or welding, spot welding or fusing, epoxy bond, hot melt glue bond, transfer adhesive bond, or double-sided tape bond. In addition to a male/female coupling system, there may be male/female alignment elements (female element 2101 shown while male counterparts not visible on the bottom of the container) that align the top clamshell container and lid below, such that, for example, as the top clamshell container opens, it faces the straw location and user, which is advantageous as a frontward oriented configuration in relation to the user, for opening the clamshell container is ergonomic, logical, and user friendly.

Figure 15B:
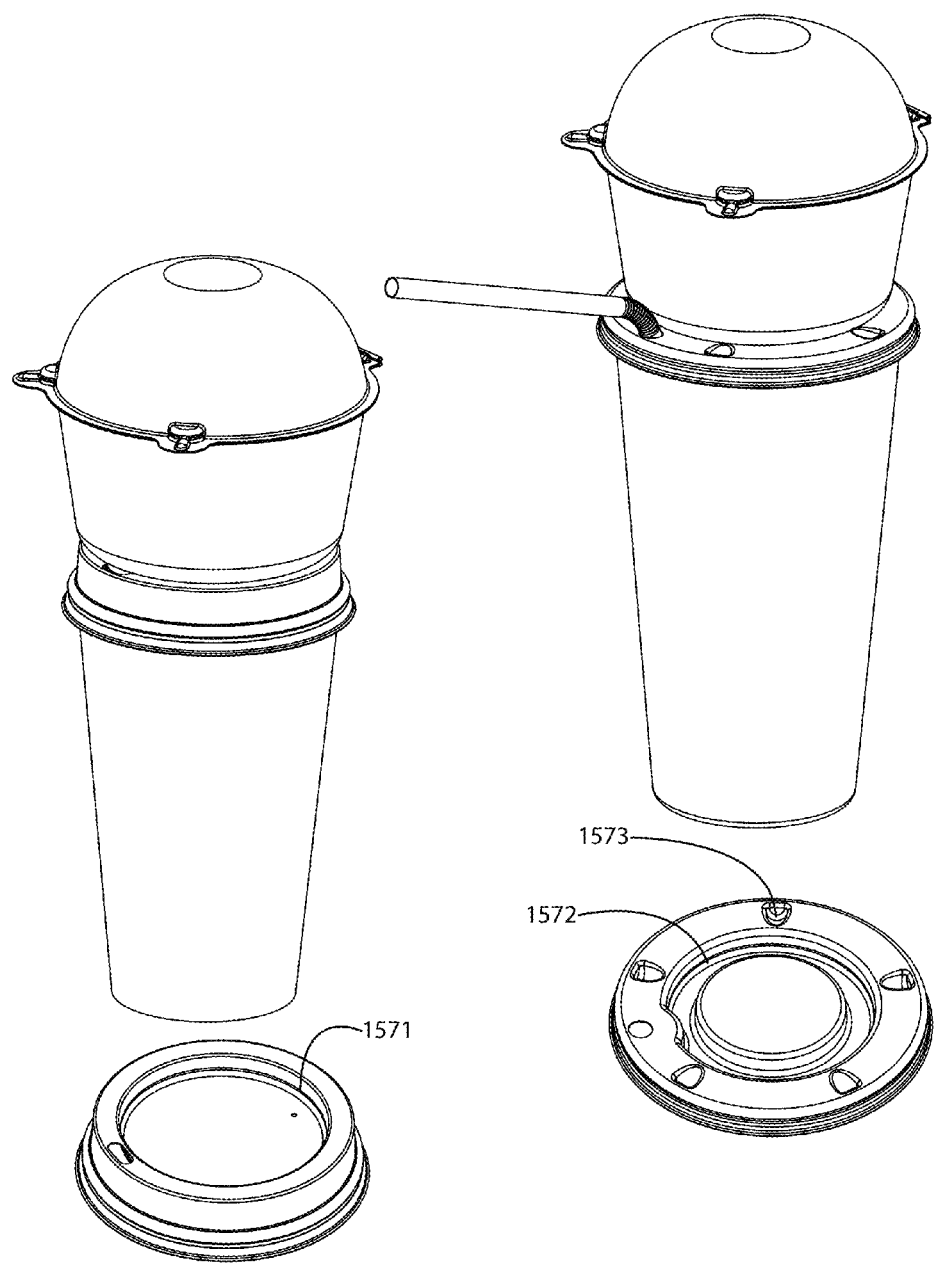
FIG. 15B shows an embodiment of the invention with sip hole lid on the left and straw hole lid on the right, which also includes strength zones.

FIG. 15B shows on the left side of the page an embodiment of the invention with a top container coupled to a coffee or tea cup lid 1571 where the cup lid recessed cavity has a substantially flat bottom and a female clip-on trough located for example at the bottom of the vertical sidewall of the cup lid cavity. The right hand side of the page of 15B shows a top container coupled to a cold drink cup lid 1572 that employs a straw and optional strength zones 1573 that may utilize downward oriented clip-on elements for securing the cup lid to the internal and external upper sidewalls the cup. The bottom horizontal diameter of the top container that couples to the cup lid may be smaller than, as large as, or larger than the top horizontal diameter of the cup opening or cup lid. When the top container couples to various sizes or types of cups, the hole that provides access to the second liquid or solid may be covered by the bottom diameter of the top container. Any embodiments described herein may utilize frictional coupling in keeping with the spirit of the invention.

FIG. 15C shows a side view on the left side of the page and a cutaway view of FIG. 15B on the right hand side of the page, and a close up of the snap in coupling element 1574 that is smaller than the outer diameter of the lower cup lid at the bottom of the figure. One or more embodiments of the invention may include any method of coupling an upper food or liquid container with an interior and/or exterior wall friction press-on cover or clamshell hinged style cover to a lower lid that couples to the rim of a cup. In one or more embodiments, both of the upper and lower components include male and female coupling elements that may project upward or downward in relation to the interfacing horizontal walls of the components and furthermore there may be a continuous or segmented circular coupling ridge or dots in the vertical wall of either component that provides for secure coupling while mated. In addition, embodiments may also include an alignment element that may comprise a bump or indent integrated into the vertical wall at any location of both the upward or downward coupling element(s) and lower lid trough(s) or the upper container so the hinged lid opens away from the user. In one or more embodiments, the primary circular, ring-shaped or segmented ring-shaped (or other shape) coupling element is smaller than the outer diameter of the lower cup lid such that the primary circular or ring-shaped coupling element is one size fits all for example that may couple with any size or shape, i.e., coffee cup or cold drink cup lid that attach to various size cups. This is advantageous in comparison to an upper container that couples to the outer rim of a cup or lower cup lid as this type of configuration is limited to one size cup. Additionally, the primary circular or ring-shaped coupling element that accommodates various size cups and lids may be configured as a circular trough or indent that only momentarily interrupts the substantially flat bottom of the upper container (as shown in FIG. 15C in the cross section on the lower half of the page) thus facilitating horizontal support for large food items such as a burger, sandwich, or slice of banana bread for example. For example, as shown, the outer portion of the bottom of the container is at the same height as the innermost portion of the container. A male coupling element projects downward toward the cup lid trough. This enables flat items to rest on the outermost and innermost bottom portion of the container without any additional upward projections in the container. Because the primary circular or ring-shaped coupling element may accommodate various size cup lids it is possible that when the bottom horizontal wall of the upper container is as large as or larger than the diameter of the lower cup lid, the sip/gulp or straw hole may be covered. Alternatively, when the top container is as large or larger than the lower cup lid, the embodiment of the invention that employs a straw channel for a tri-bend straw may be utilized to provide simultaneous access to the first solid/liquid and second solid/liquid.

Figure 15D:
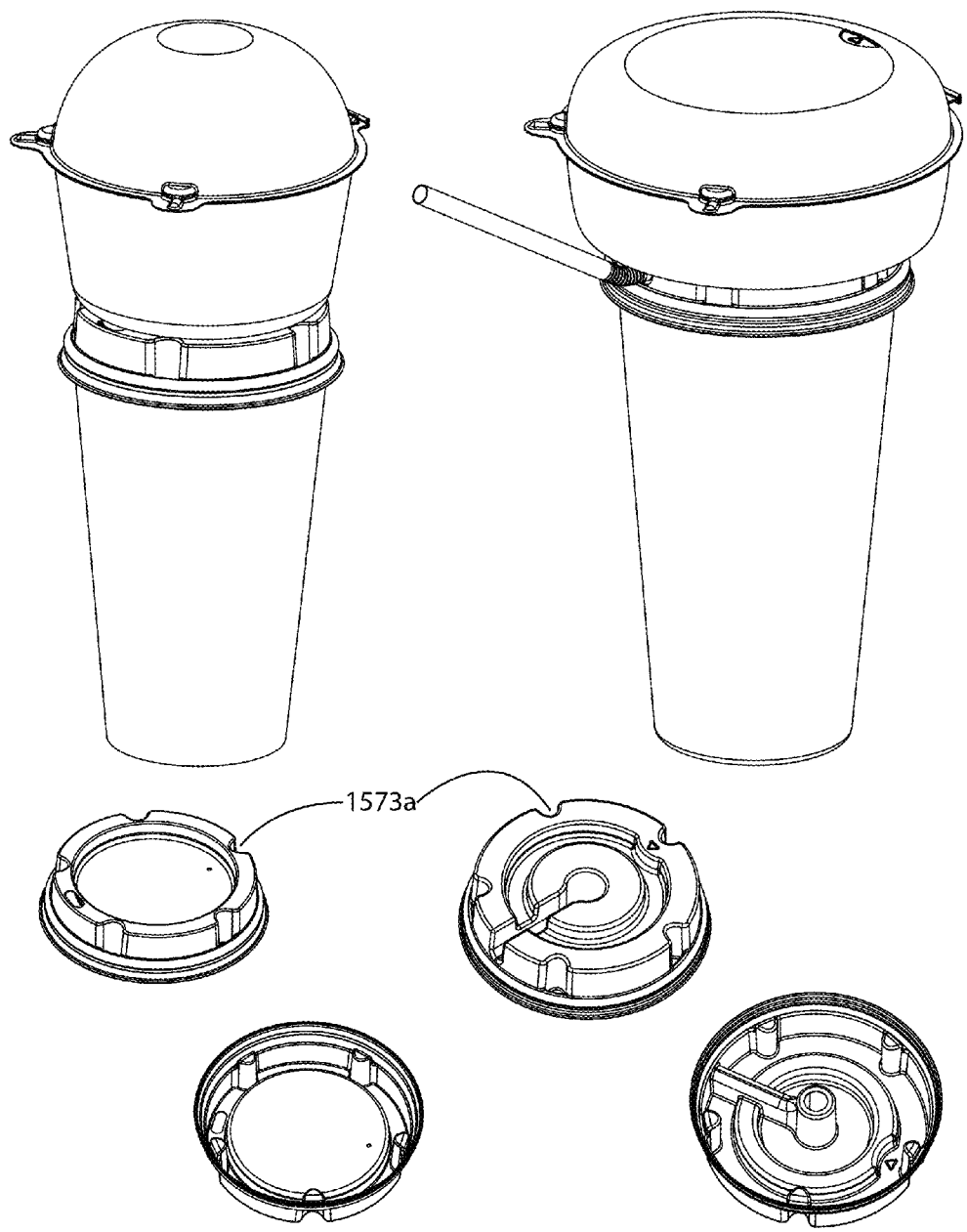
FIG. 15D shows radially oriented strength zones that provide extra strength or rigidity that may be utilized alone or in combination with the optional downward oriented clip-on elements shown in FIG. 15B for example. All of the strength zones may also double as downward oriented clip-on elements to couple the lower cup lid to the cup.

FIG. 15D shows radially configured, downwardly indented, diagonally oriented, trough-shaped strength zones that provide extra strength or rigidity to the horizontal wall of the lower cup lid that may be utilized alone or in combination with the downward oriented clip-on elements 1573 for example. Embodiments may employ optional downward oriented clip-on elements that may be implemented as part of or independently of strength zones 1573, for example in the top horizontal wall or outer vertical sidewall 1573a (as shown in FIG. 15D) of the lower cup lid. As shown, the strength zones may employ downward oriented clip-on elements that provide a interior and exterior wall friction oriented, tight fit, spill preventive seal of the lower cup lid to the interior rim of the cup. The top horizontal wall or vertical sidewall clip-on elements may occur as three or more clip-on elements, however as shown for example in the embodiments presented here within, there are five downward oriented clip-on elements. An alternative or optional configuration for the three or more strength zones and clip-on elements is where the diagonal trough-shaped indent that is part of the configuration becomes a series of side-by-side connected trough-shaped indents or ribs, or a flat diagonal wall with no ribs, such that the clip-on elements become one extended non-continuous ring-shaped strength-oriented clip-on element that proceeds adjacent to, and to the inside of, the diameter of the cup rim, and stops either side of the outer diameter hole that leads to a second solid or liquid or wherein the non-continuous ring-shaped strength-oriented clip-on element is continuous but bends inwardly (toward the center of the cup lid) in a tight arch to go around the outer diameter hole that leads to a second solid or liquid. In addition to providing a secure spill preventive seal of the lower cup lid to the interior and exterior rim of the cup, the clip-on elements additionally act as the strength zones, or strength "ribs" that reduce flex in the horizontal or vertical wall of the lower cup lid which makes it faster and easier to couple or decouple a first solid or liquid container to the lower cup lid. Optional strength zones 1573 and downward oriented clip-on elements may be utilized in any or all of the lower cup lid configurations that are part of the various embodiments of the invention.

Figure 15E:
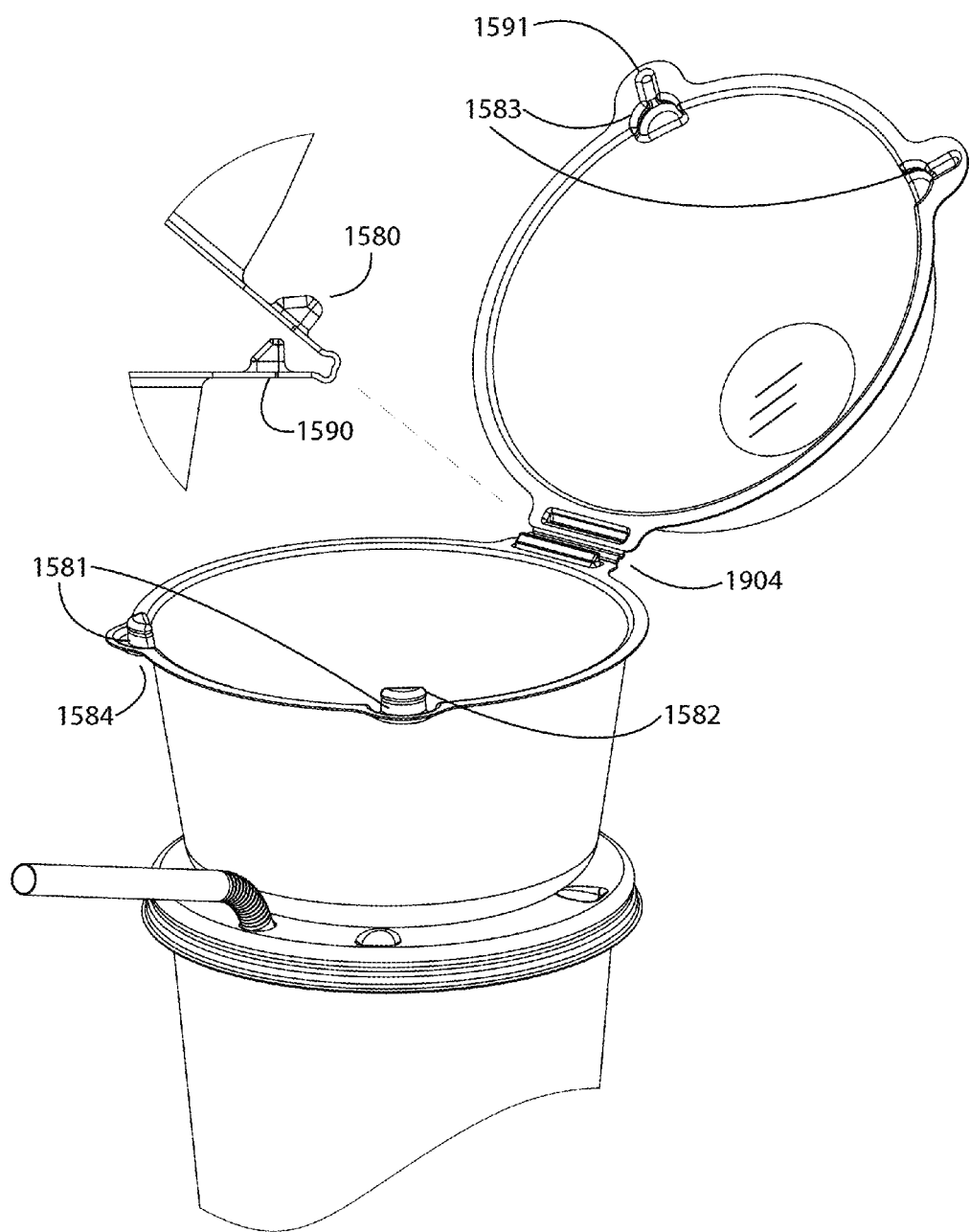
FIG. 15E illustrates a perspective close-up of the hinge and half circle raised male posts and corresponding female indentations that may be employed in the front lip edge of the embodiment shown in FIG. 15D.

FIG. 15E illustrates a perspective close-up of the hinge and half circle raised male posts and corresponding female indentations that may be employed in the front lip edge of the embodiment shown in FIG. 15D. In the embodiment where the upper container employs a hinge cover and the upper container couples to the lower cup lid via male and female coupling and alignment elements (FIG. 15E and FIG. 15F), the lower portion of the top container may employ two (although there may be one) half circle male vertically oriented raised posts 1581 that are located at the front lip edge of the lower portion of the container for example opposite the hinge 1904. Additionally the two half circle male posts may include a vertically oriented snap bump ridge 1582 at the top front curved edge such that the two male posts and snap bumps ridges mate and snap together with two corresponding female indentations 1583 located at the front lip edge of the top cover and where additionally the female indentations may employ a corresponding vertically oriented snap bump ridge trough at the top front curved edge.

Due to the fact that the male posts are located horizontal lip area of the lower portion of the top container, for example that may not be very strong, two narrow downward vertically oriented half circle strength troughs 1584 (FIG. 15F) or moats, that intersect the vertical wall of the lower portion of the container, are incorporated at the base of the male posts. The strength of the half circle trough(s) or moat(s) that anchor the male post(s) is facilitated through a direct intersection with the vertical wall of the container.

Additionally, due to the fact that the male and female coupling elements are located at the front horizontal lip edges of the top container, the coupling elements are configured to couple or snap together via an open wall coupling system that employs a single front wall (farthest away from the hinge) friction method for mating parts as opposed to closed wall mating system where all of the outer surfaces or walls of the parts are in direct contact while coupled or snapped together. An open or single wall friction coupling system reduces the bulk and protrusion of the coupling elements that are located at the front lip edges of the top container. Reduced bulk and protrusion prevents the user from bumping into the male or female coupling elements that extend from the front lip edges of the top container.

An open or single wall friction coupling system that reduces bulk and protrusion while coupling may advantageously implement an upwardly indented, vertically oriented, male tension bar or ridge 1590 (FIG. 15E) that is located to the inside of, and parallel to the hinge 1904 of the top container. In the lower portion of the top container the upwardly indented bar or ridge is a male component 1590, while in the top cover portion the bar or ridge is a female component 1580. The two components mate while the cover is in a closed position. To facilitate closure the parallel upward male wall of the bar or ridge that is closest to the container is diagonally slanted to prevent interference while the cover in the process of being closed. The parallel upward male wall of the bar or ridge and the corresponding upward female intent wall that is closest to the hinge are substantially vertical which mates the upward oriented walls to create tension between the single wall male/female coupling elements and the bar or ridge elements. Finally, there may be two radially oriented narrow straight upwardly indented strength ribs 1591 located at the midpoint of the grasp tabs that lift the top cover. In a preferred embodiment the strength rib indents intersect at a midpoint, the female coupling indents at the front lip edge of the top cover.

Figure 15F:
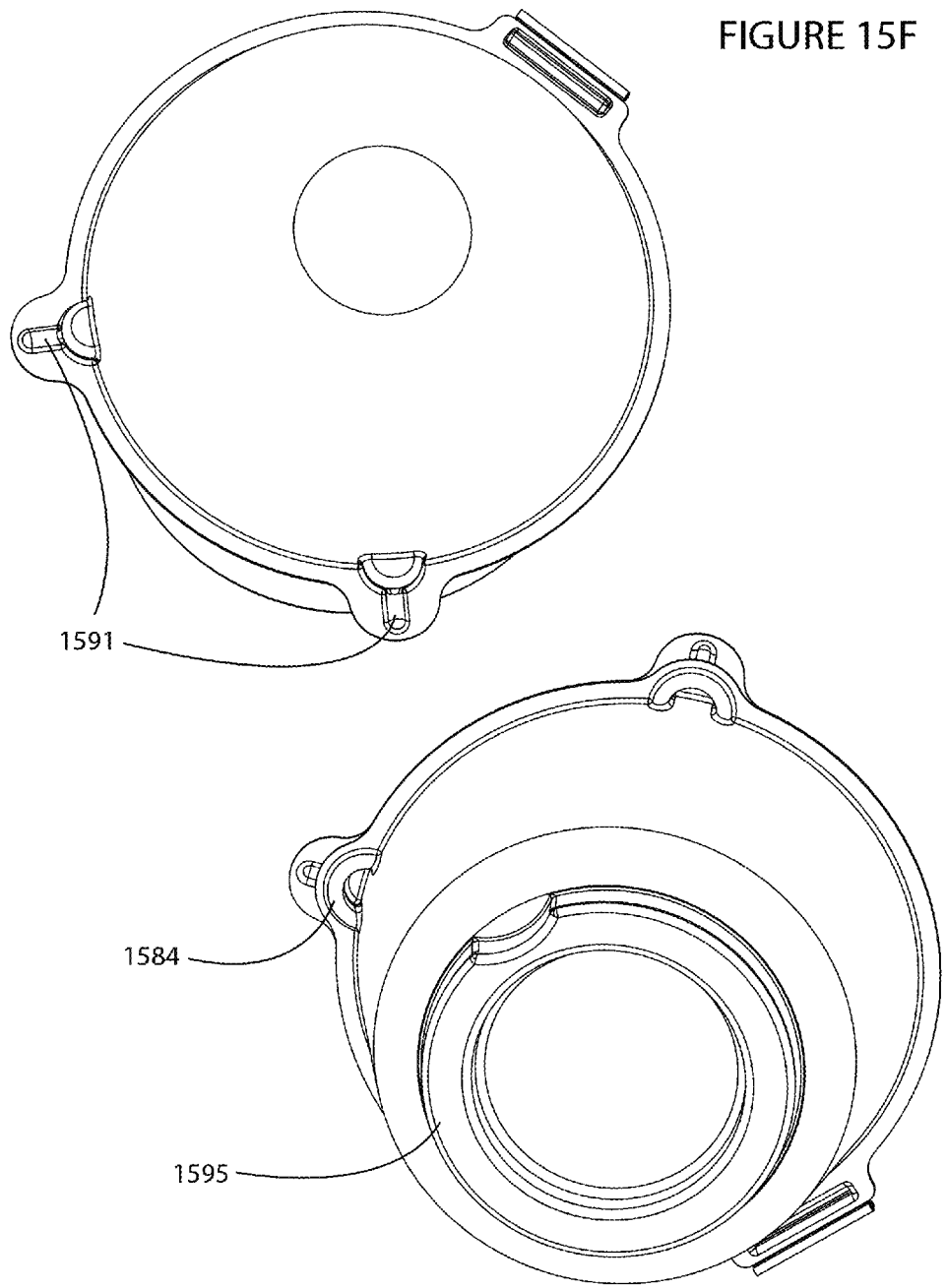
Figure 15G:
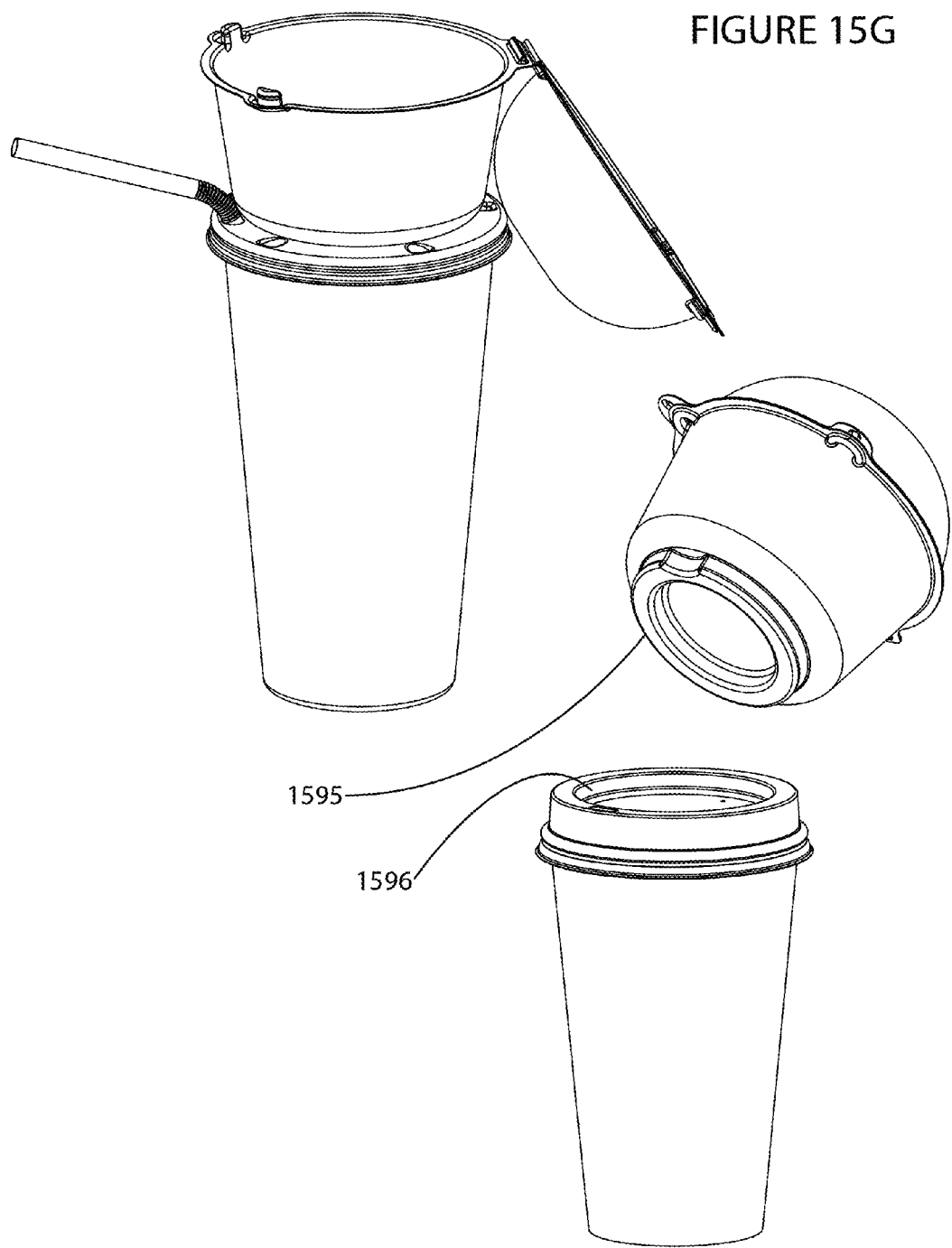
FIG. 15G illustrates male and female coupling elements with an integrated alignment element for the top container in relation to the cup lid.

FIG. 15F illustrates a top and bottom perspective view of one of the embodiments of FIG. 15D, while FIG. 15G illustrates male and female coupling elements with an integrated alignment element for the top container in relation to the cup lid. The male/female coupling elements shown in FIG. 15A or FIG. 15B for example, which may be male/female or female/male with respect to the lid and container may be sized so that any size container may couple with any sized cup lid that employ a one-size-fits-all male/female coupling element as is shown in FIG. 15G with a medium size container and two different types and sizes of lids and FIG. 15F with a large container and two different types and sizes of lids, for example with coupling element 1595.

Figure 15H:
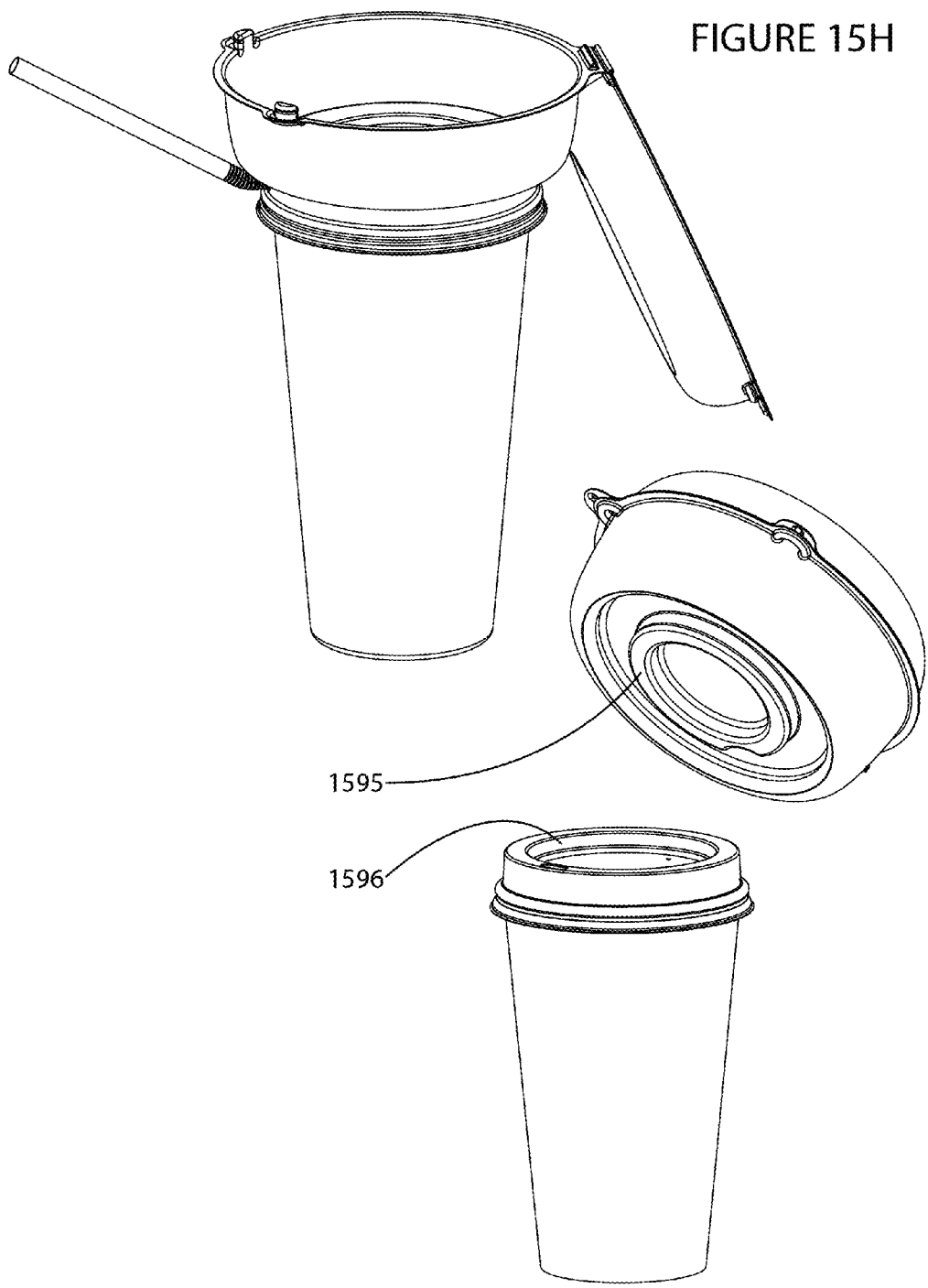
FIG. 15H illustrates the one-size-fits-all coupling element on a larger container than is shown in FIG. 15G, while using the same sized coupling element.

FIG. 15H illustrates the one-size-fits-all coupling element 1595 integrated into the bottom of a larger container than is shown in FIG. 15G, while using the same sized coupling element 1595 and same size female indent 1596 for example in the lower cup lid. As shown at the bottom right hand side of the page in FIG. 15H, with embodiments not employing a straw channel or trough to access the contents of the lower cup and as shown in the upper portion of FIG. 15H where the contents of the lower cup may be accessed via a straw channel, straw, and a hole in the outer wall of the lower cup lid. In the embodiment that appears at the lower right of the page, access to the contents of the cup may be provided as shown through the disengagement of the large container from the cup.

Figure 16:
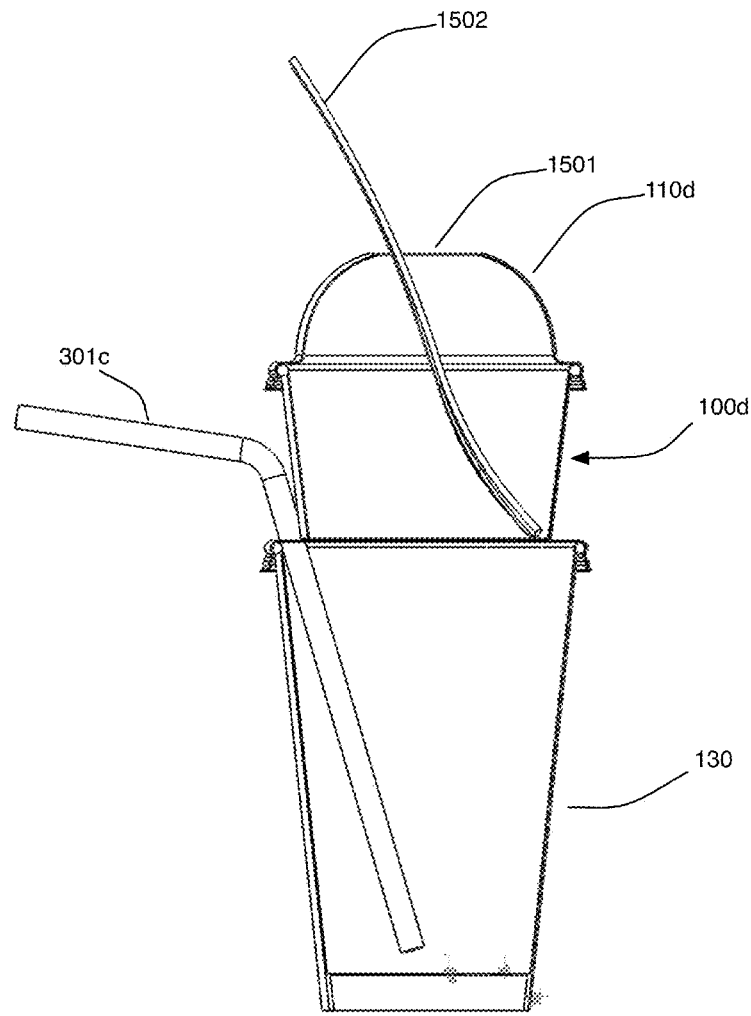
FIG. 16 illustrates a cross sectional view of FIG. 15.

FIG. 16 illustrates a cross sectional view of FIG. 15. Although the vertical dimension of the container has a depth that is at the plane of the opening of the cup, this is not required and may be of any depth into or out of the plane defined by the opening of the cup as desired based for example on the type of solid or liquid to be placed in the container and also in the cup.

Figure 17:
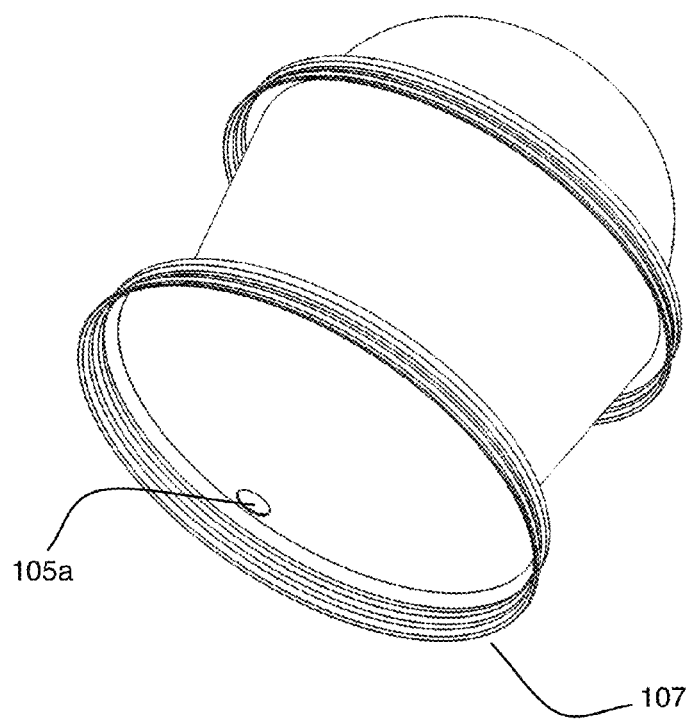
FIG. 17 illustrates a bottom perspective view of the embodiment of the invention shown in FIG. 15 along with an embodiment of a press-on friction dome cover and a straw hole located in the horizontal wall of the cup lid.

FIG. 17 illustrates a bottom perspective view of the embodiment of the invention shown in FIG. 15 along with an embodiment of the optional press-on friction dome cover with a hole. As shown hole 105a is located in a horizontal plane of the cup lid as opposed to the embodiment shown in FIG. 13 where the straw hole is located in the vertical portion or wall of the cup lid based on the diameter of the container in that embodiment which has an overall horizontal dimension, including the bottom of the container that is greater than the diameter of the opening of the cup for example.

Figure 18:
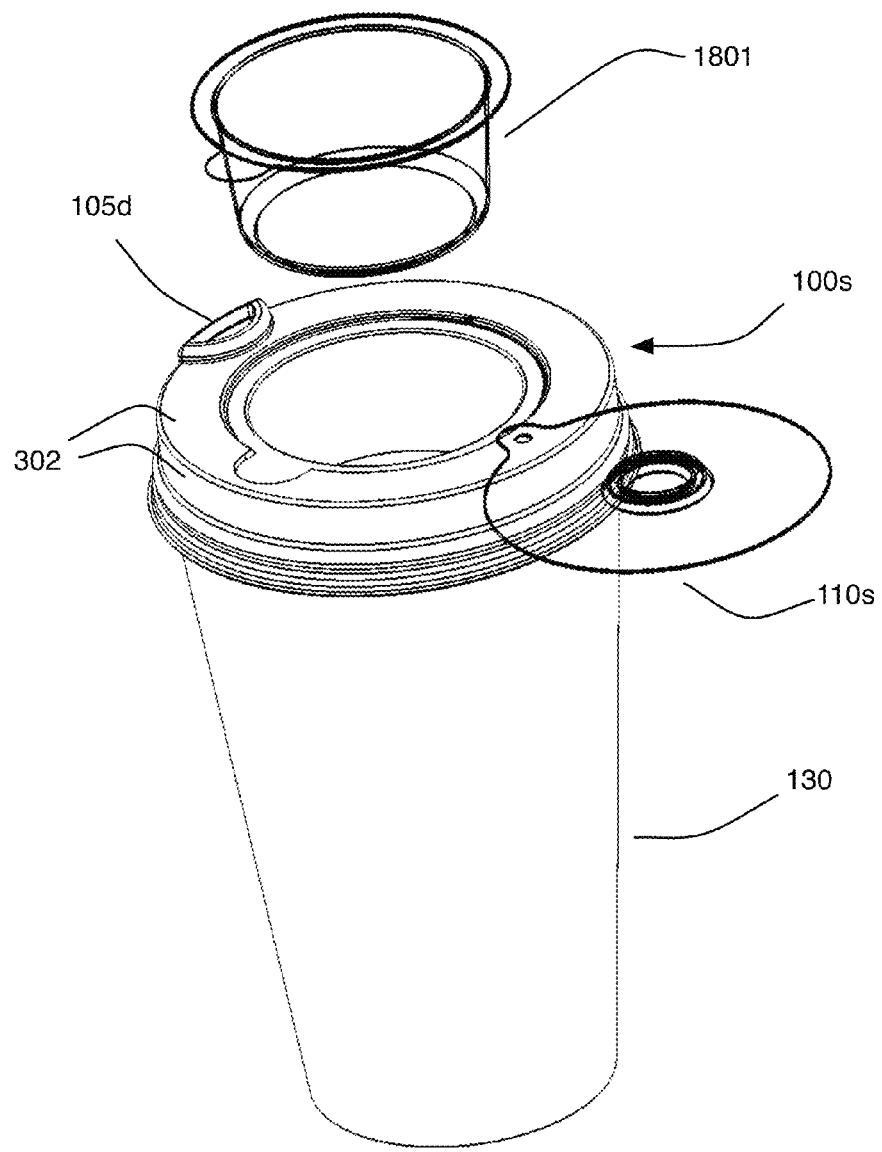
FIG. 18 illustrates an embodiment of the invention with a swivel cover and independent drop-in/removable container.

FIG. 18 illustrates an embodiment of the invention with swivel cover 110s and independent drop-in removable container 1801. As shown cup lid 100s includes a sip hole/straw or gulp-size hole/straw 105d shown on the left side of the figure, although optionally a straw of any shape or size may be utilized in conjunction with this hole. The side walls of sip hole/straw 105d may optionally be of any height with respect to the top of cup lid 100s, and if tall enough may be utilized in place of a straw. In addition, this embodiment includes swivel cover 110s that may be opaque or transparent or any level of translucency as desired. In one or more embodiments, although not shown in FIG. 18 for brevity, the axis of rotation of the swivel cover may be around the sip hole, straw hole or gulp hole or located anywhere else on the cup lid. The swivel cover 110s is swiveled shut to close off or contain the contents of the independent drop-in/removable container after the seal-on/peel-off cover is removed and discarded. In one or more embodiments, the swivel cover is closed to contain loose contents such as nuts prior to lifting and tilting the cup in order to gulp or sip liquids such as beer. Spilling loose contents from the top container is not an inherent issue when using straw configurations. Independent drop-in/removable container 1801 may utilize a clamshell type lid that is attached to the upper top edge of the container at any location. In this clamshell embodiment, the independent container 1801 and the press-on friction lid for example may be made as a one piece construction. Although not shown within FIG. 18 for brevity, the independent drop-in/removable container may clip or fasten via various coupling elements and/or systems within the lid cavity in any manner. As one skilled in the art will appreciate, more than one independent drop-in/removable cups or containers may be placed in the lid cavity or cavities, for example cream and sugar. One such clip-on or coupling system that may be utilized is previously shown in FIG. 12B, where 100c is configured to clip on or couple, via a horizontal wall bottom-oriented system, to the cup lid that is positioned directly below. Vertical wall ridge based coupling systems may also be utilized to attach the independent drop-in/removable container to the lid cavity. An example of an independent drop-in/removable container that may use a bottom-oriented coupling system within the lid cavity, is a low-profile, single-cookie container with a seal-on/peel-off cover that clips within the lid cavity of a coffee cup. An additional example is an independent drop-in/removable container with a seal-on/peel-off cover that holds beer nuts that couples within the lid cavity of a plastic beer cup. Additionally, a coupling system may have been used in this latter embodiment, where a circular ridge based coupling system is located in the vertical wall area of the independent drop-in/removable container and cup lid cavity. This additional vertical wall location, where a circular ridge based coupling system may occur, applies to fixing a low-profile cookie container to a coffee-cup lid cavity, or fixing a medium-deep, i.e., proceeds vertically downward into the cup volume, salty-sweet nut container to a beer-cup lid cavity, or a high-profile hamburger or French-fry container to a beer, soda, or milk shake lid cavity.

FIG. 19 illustrates an embodiment of the invention, namely hinge lid/cover 110e that couples with cup lid 100e. As shown, cup lid 100e is oriented above cup 130a and then coupled to cup 130a either before or after hinge lid/cover 110e is coupled with cup lid 100e. Cup 130a in this embodiment may include a widened portion, shown just beneath the rim of cup 130a, which may be utilized as a fill line for example. The fill line shows how much liquid may be placed into cup 130a so that when cup lid 100e is coupled with the cup, the liquid does not spill out of the cup. In other words, container 101a may extend down into cup 130a (depending on the height of the vertical side walls of cup lid 100e), and the fill line shows the safe level of liquid that may be displaced by container 101a without liquid for example exiting hole/straw 105e. The side walls of sip hole, gulp hole, or straw 105e may be of any height with respect to the top of cup lid 100e, e.g., embodiment 105e1 shown in the left portion of the lower two side views in the bottom left of the figure, and as shown having a horizontal portion at the top edge of the hole/straw in the perspective view. If tall enough, the hole may be utilized in place of a straw, e.g., embodiment 105e2 shown in the right portion of the lower two side views in the bottom left of the figure. In either embodiment the top portion of the sip hole or gulp hole 105e may optionally include a horizontal area having a hole or alternatively include no horizontal surface, such as a rounded surface for example. Straight cups such as cup 130 shown in FIG. 1 may also be utilized with this embodiment of the cup lid and may or may not include a fill line that is indented or drawn on the inside or outside of the cup to show how much liquid may be placed in the cup for a given depth of container 101a and/or vertical wall height of cup lid 100e. Alternatively, multiple fill lines, either physically shaped as shown in cup 130a or with slight indentations or markings or colors may be utilized. Any other type of fill line may optionally be utilized in keeping with the spirit of the invention. Cup 130a may be made from paper, plastic, hard-molded plastic (with or without double wall construction), ceramic or metal, such as stainless steel, for example.

Hinge lid/cover 110e may be permanently or non-permanently coupled with cup lid 100e. Hinge lid/cover 110e and cup lid 100e may be made from two separate pieces or may be formed as one piece, such as a typical clamshell construction. Hinge lid/cover 110e may attach to cup lid 100e through various methods of attachment other than male and female parts that mate or interlock. In the absence of male and female parts for example, two flat surfaces may be attached to each other via thermo-bonding, sonic bonding or welding, spot welding or attached with adhesive or any other permanent or non-permanent bonding mechanism. Hinge 1904 may be formed with any type of mechanism that allows hinge lid/cover 110e to make the contents of container 101a available, including an axle, tooth and hook, pivot, trough, score line, double score lines or any other mechanism. As shown female indent 1901 couples cup lid 100e with male extension 1902 on hinge lid/cover 110e to enable hinge lid/cover 110e to open by pivoting or folding at trough 1904. Optional second male extension 1903 may snap into second female indentation 1902 to hold hinge lid/cover 110e open. All female and/or male indentations or extensions respectively may include narrowing areas or bumps that enable the male and female parts to snap together to hold the parts together. Alternatively, hinge lid/cover 110e may be welded or permanently attached in any other manner to cup lid 100e. Trough 1904 may be implemented as shown or alternatively may utilize a double score line, i.e., two closely spaced indentations that enable hinge lid/cover 110e to bend at those two locations to enable a full 180 degree rotation or pivot of hinge lid/cover 110e about an axis parallel to the two score lines.

Tabs or grasp tabs 1905 and tab indents or grasp tab indents 1906 enable opening of hinge lid/cover 110e while hole/straw 105e enables access of the contents of cup 130a directly or via a straw. The grasp tabs may optionally include strength ribs 1907 as shown. The contents of container 101a may be accessed, then hinge lid/cover 110e may be closed against cup lid 100e and then re-opened again when desired. Thus, intermittent access to the contents of cavity 101a and re-closure of cavity 101a is provided through hinge lid/cover 110e. The access of liquid may occur while the hinge lid/cover 110e is in either the open or closed position. Embodiments of the cup lid cavity 101a (also see FIG. 1) may optionally include a paper liner or ruffled paper liner or any other type of liner that separates the cup lid from the food item placed inside the cup lid. Embodiments of the cup lid may optionally include one or more vacuum release air holes 1908. As one skilled in the art will recognize, hole/straw 105e may be made to fit a straw or may be of any other size. Embodiments of the invention may also utilize indented cut-outs 106 placed in the top horizontal wall adjacent to (as shown in FIG. 1) the container area to enable easier access to cookies or other food items for example.

Figure 19A:
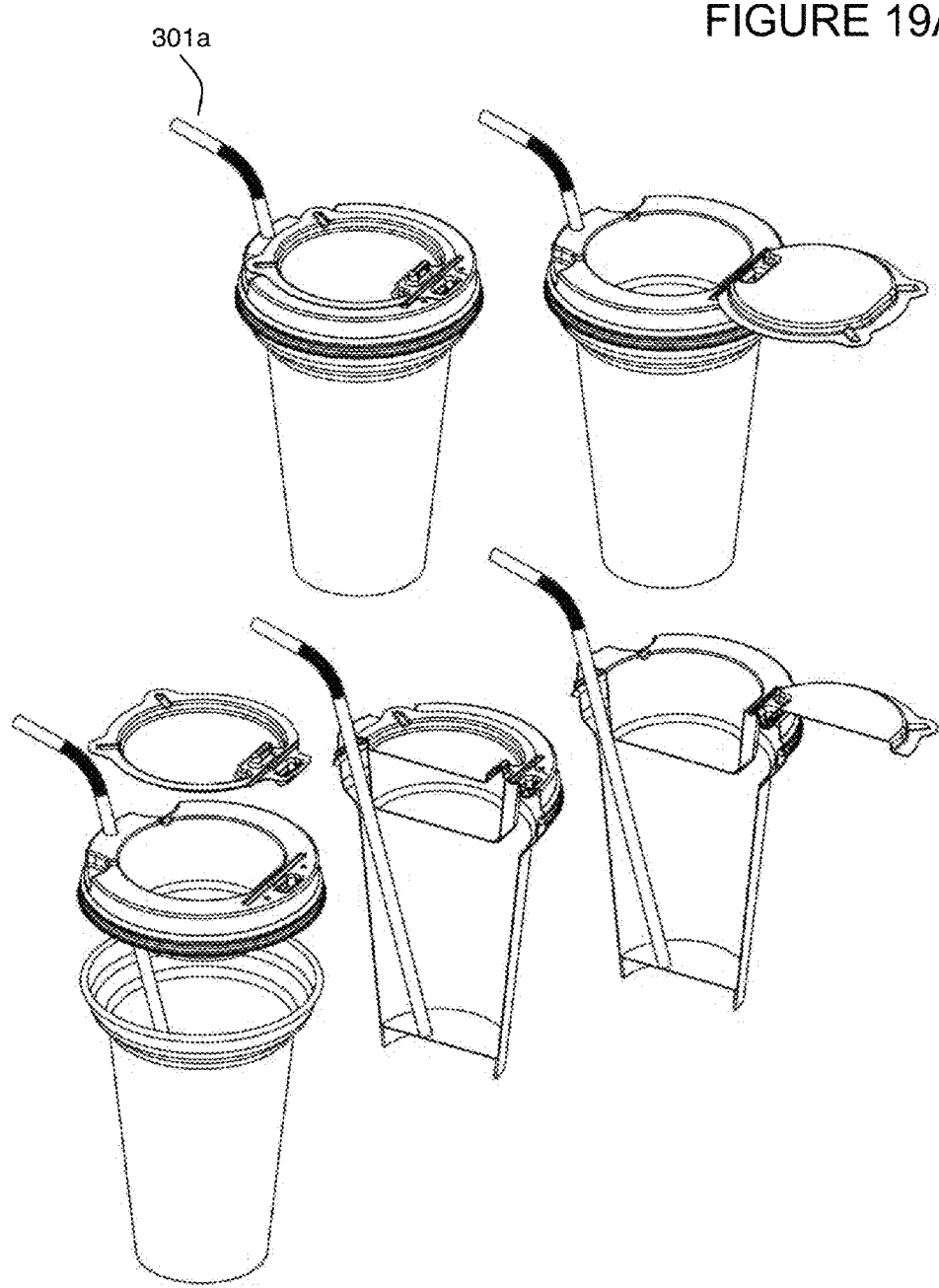
FIG. 19A shows embodiments of FIG. 19 configured for use with a straw.

FIG. 19A shows embodiments of FIG. 19 configured for use with straw 301a. One or more embodiments include a straw hole instead of the raised gulp-sized hole as shown in FIG. 19 for example. Embodiments as shown in FIG. 19A may be utilized for stadium cold drink embodiments for example or for any other scenario where a straw and hinged lid/cover and container are desired.

Figure 20:
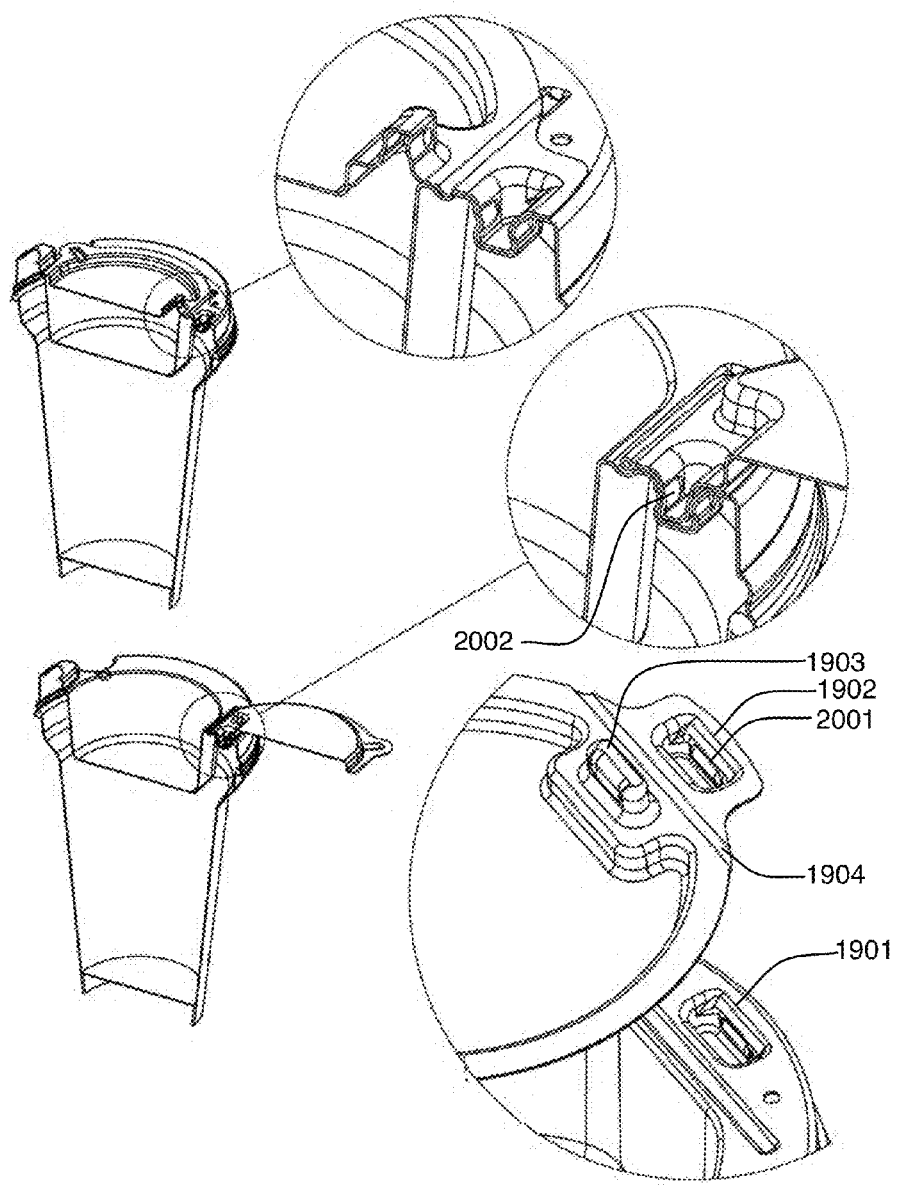
FIG. 20 illustrates a close-up of the hinge lid/cover coupling element of FIG. 19.

FIG. 20 illustrates a close up of the hinge lid/cover coupling element of FIG. 19. As shown, bump 2001 in a female indentation may snap against bump 2002 in a corresponding male extension to hold hinge lid/cover to the cup lid and/or hold the hinge lid/cover in the open position. By constructing the two female indentations of slightly different size and by constructing the two male extensions of corresponding slightly smaller size, all four elements may fit within one another. Alternatively, multiple indentations in the cup lid may be utilized to hold the hinge lid/cover to the cup lid in a non-rotational manner and hold the hinge lid/cover to the cup lid in a specified area.

Figure 20A:
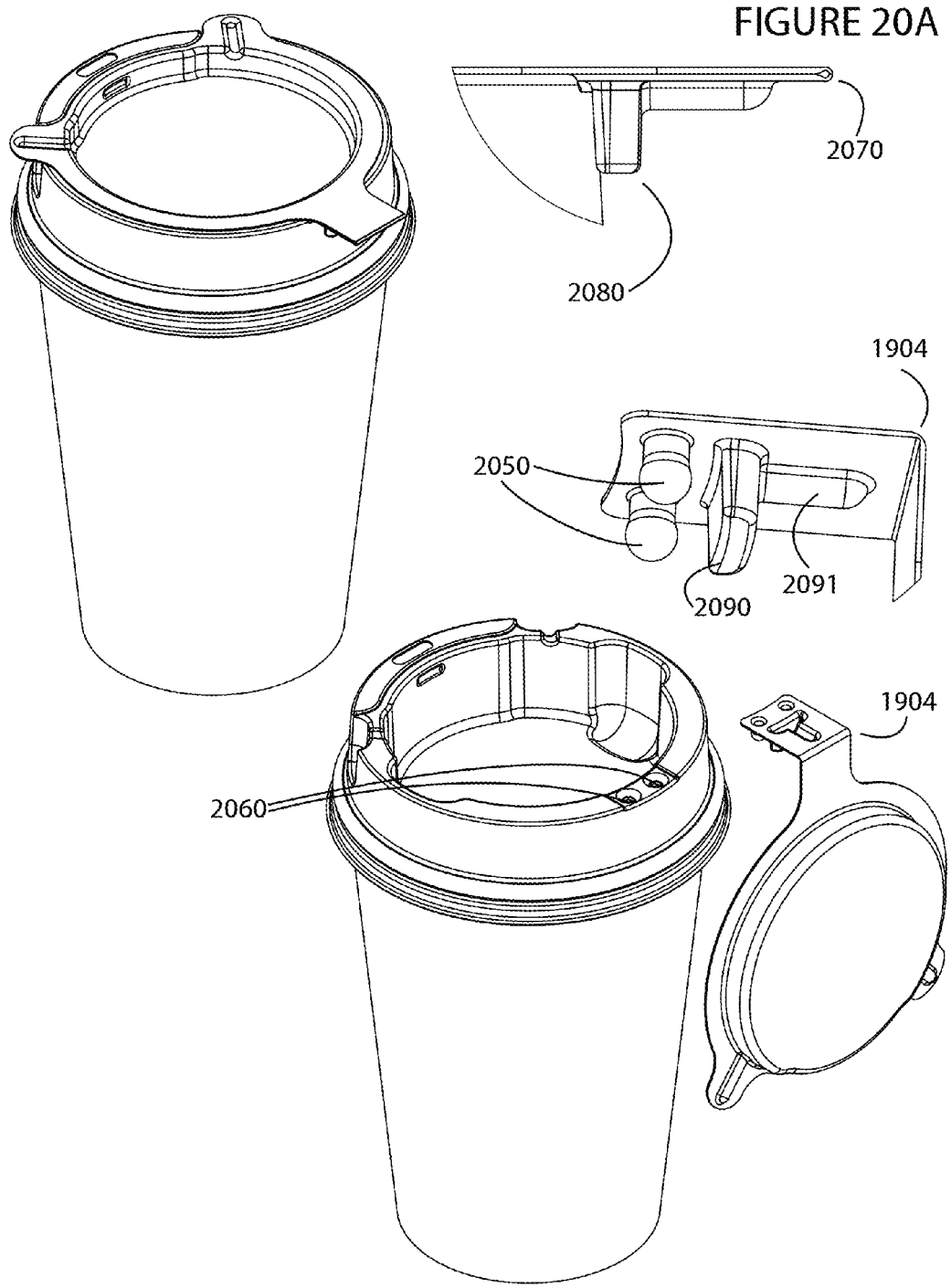
FIG. 20A illustrates perspective and close-up views an embodiment of the hinge cover that couples to the lid/container or cup lid at an outer location of the top wall.

FIG. 20A illustrates perspective and close-up views another embodiment of the hinge cover that couples to the lid/container or cup lid at an outer location of the top wall, that may for example be utilized for coffee applications. The cup lid with integrated container may hold a cookie for example. In this embodiment, the top cover couples to the lower lid/container by employing one or more downward male element (s) adjacent to the hinge that mate(s) with corresponding female indent(s) located at the outer edge of the top horizontal wall of the lower lid/container to facilitate sturdy yet non-permanent coupling. For example a preferred embodiment employs two small round downward posts 2050 adjacent to the hinge 1904 which are configured to snap into or mate with two corresponding small round female indents 2060 located at the outer edge of the top horizontal wall of the lid/container. Respectively, two small downward posts or elements are more compact and may require less top horizontal wall area than one large downward male element. Additionally, the two small downward male posts utilize friction and may be employed in an overlapping hinge system that folds back upon itself as shown at 2070, where after the two small male posts are snapped into position, and the cover is the closed position, a portion of the top cover folds back upon itself and covers over both the small male posts and small female indents.

FIG. 20B shows a lower perspective view of the embodiment of FIG. 20A and shows the single or double pivot hinge of this assembly may be located outside the diameter of the top cover or lower lid/container, for example at location 2080. Locating the pivot point(s) of the hinge(s) outside the diameter of the top cover or lower lid/container means that while the top cover is in the open position there is no interference with all related parts such that the top cover hangs vertically downward (bottom half of page, FIG. 20B) and touches nothing almost as if suspended in space. The farther the hinge pivot point(s) are from the outer diameter of the top cover or lid/container, the farther the lid will hang from the substantially vertical wall of the cup. The preferred distance for the pivot point(s) of the hinge(s) is such that when the top cover hangs down, just enough space is provided for the fingers to grip the outside of the substantially vertical wall of the cup. There may be an optional downward vertically oriented support bracket or indent 2090 (FIG. 20A) that touches or leverages itself against the outside vertical wall of the lower lid/container which adds support for the hinge portion that extends beyond the outer diameter of the lower lid/container. A narrow straight downward strength rib 2091 may be employed perpendicular to the outer wall of the lid/container in the top horizontal wall of the lid portion, for example that extends outward toward the hinge. The narrow downward perpendicular straight strength rib may intersect the midpoint of the downward support bracket or indent as shown in FIG. 20A.

Figure 21:
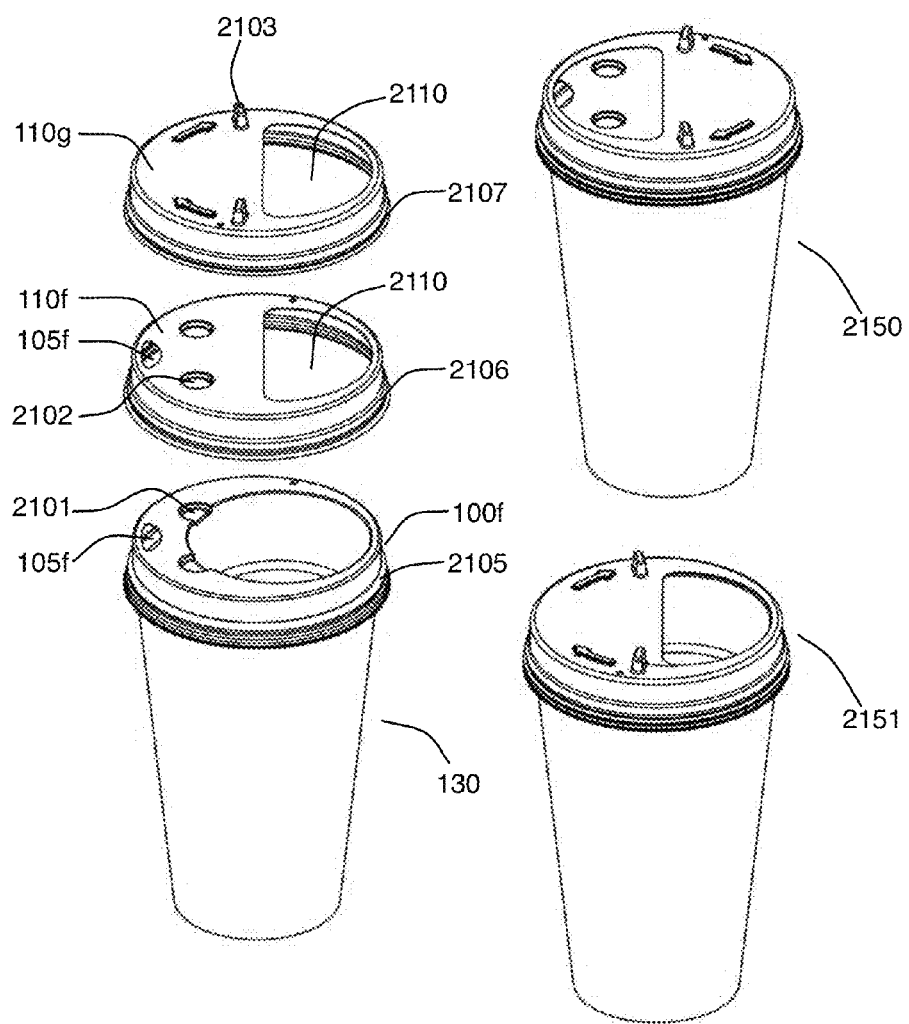
FIG. 21 illustrates a rotational cover with a closeable embodiment of the invention with a large opening to enable access of the contents of the container with fingers.

FIG. 21 illustrates a rotational lid with a closeable embodiment of the invention with large opening 2110 to enable access of the contents of the container with fingers for example. As shown, cup lid 100*f* includes sip/gulp hole 105*f* and interlocking female indentations 2101. Cover 110*f* includes a corresponding sip/gulp hole 105*f* and male extensions 2102 that couple with female indentations 2101. This interlocking arrangement keeps large opening 2110 in cup lid 100*f* from rotating with respect to cup lid 100*f*. Alternatively, more than one coupling ridge may be used to couple covers 110*g*, 110*f* to cup lid 100*f*. Rotational lid 110*g* couples with cover 110*f* via ridge 2107 and 2106 that couples with ridge 2105 on cup lid 100*f*. Rotational lid 110*g* may be rotated for example using grasp tab or post 2103 to close container 101*a* as shown in closed arrangement 2150 or rotated further to open container 101*a* for access as shown in open arrangement 2151. Any number of vacuum release air holes may be employed on any embodiment described herein if desired.

Figure 22:
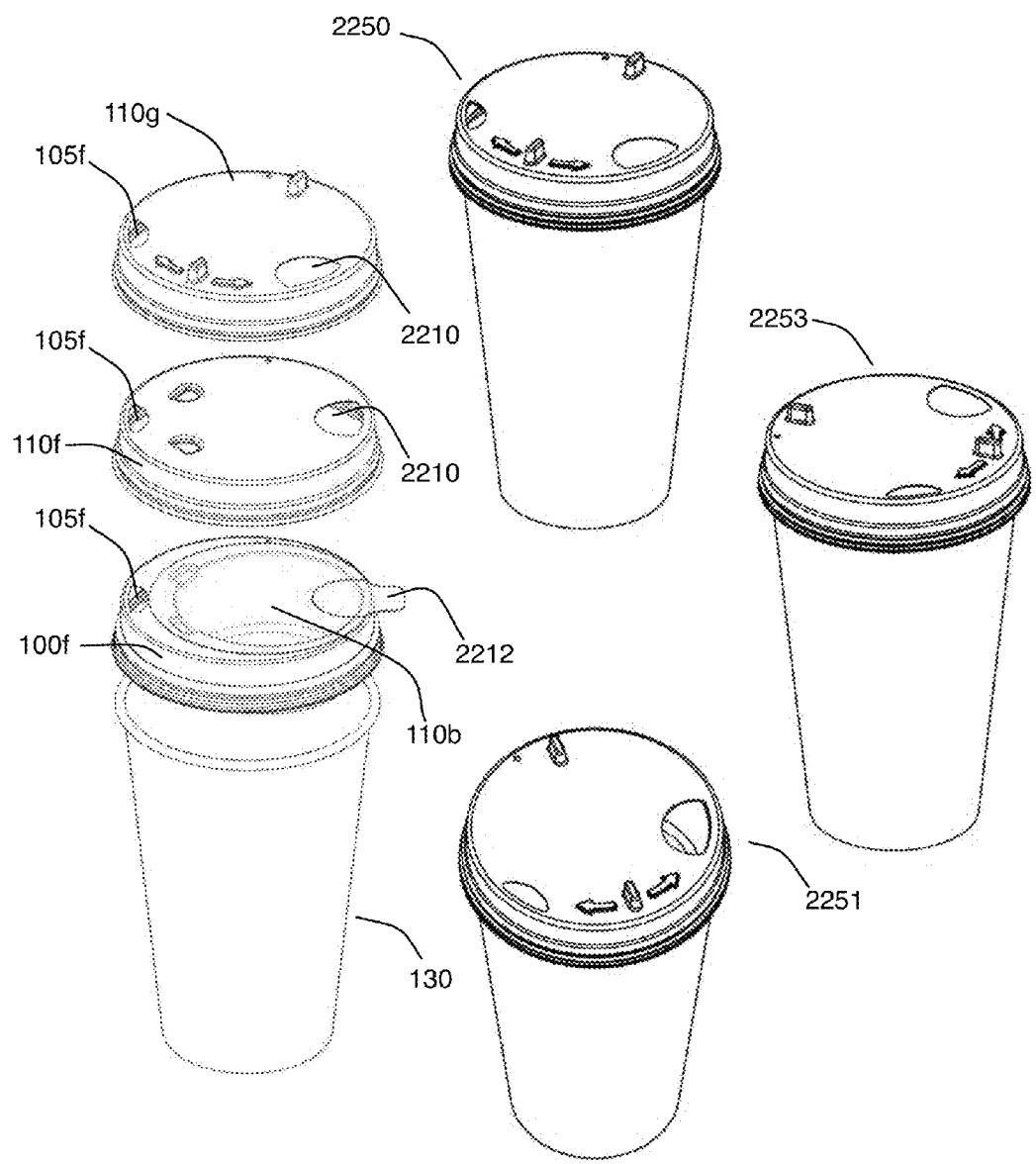
FIG. 22 illustrates a rotational cover with a closeable embodiment of the invention with an optional seal-on/peel-off cover, and medium size opening to enable access of the contents of the container by lifting and pouring the contents into the mouth.

FIG. 22 illustrates a rotational cover with a closeable embodiment of the invention with medium size opening 2210, to enable access of the contents of the container 101*a* (FIG. 1) by lifting and pouring the contents into the mouth. Opening 2210 may be sized large enough for example to enable nuts or other small food items to pass through opening 2210. First open arrangement 2250 shows sip/gulp hole 105*f* aligned over the corresponding sip/gulp holes in the cover 110*f* and cover 100*f* shown respectively beneath the rotational cover 110*g* in the figure. Second open arrangement 2251 shows medium size opening 2210 (for nuts for example) aligned over the corresponding hole in the cover 110*f* when the rotational cover 110*g* is rotated to align cover holes 2210. Although not shown for brevity, there may be rotational stop elements as part of the configuration that stop the rotational cover at specific locations (to align holes) configured to allow access to either the sip/gulp hole or snack/nut hole. Closed arrangement 2253 is shown with neither sip/gulp hole 105*f* or hole 2210 aligned over holes in the additional cover and/or lid. This prevents access to the contents of the cup or cup lid. This embodiment is arranged similarly to the embodiment shown in FIG. 21, albeit with a smaller opening 2210. Additionally, less rotation is required to open and close the hole openings shown in FIG. 22 versus FIG. 21. In addition, optional seal-on/peel-off cover 110*b* may be provided to cover or otherwise enclose the contents of the cup lid cavity. If provided, seal-on/peel-off cover 110*b* may include a pull tab 2212 with optional score line so that only a portion of the seal-on/peel-off cover 110*b* is opened via the tab. If seal-on/peel-off cover 110*b* is utilized on the cup lid 100*f*, then the middle cover 110*f* is optional. Alternatively, if no score line for the tab is provided, the tab may open the entire container of the cup lid as desired. The embodiment shown may be utilized for a beer/nut combination for example or any other combination of items that may be accessed through sip/gulp hole 105*f* and hole 2210.

Figure 23:
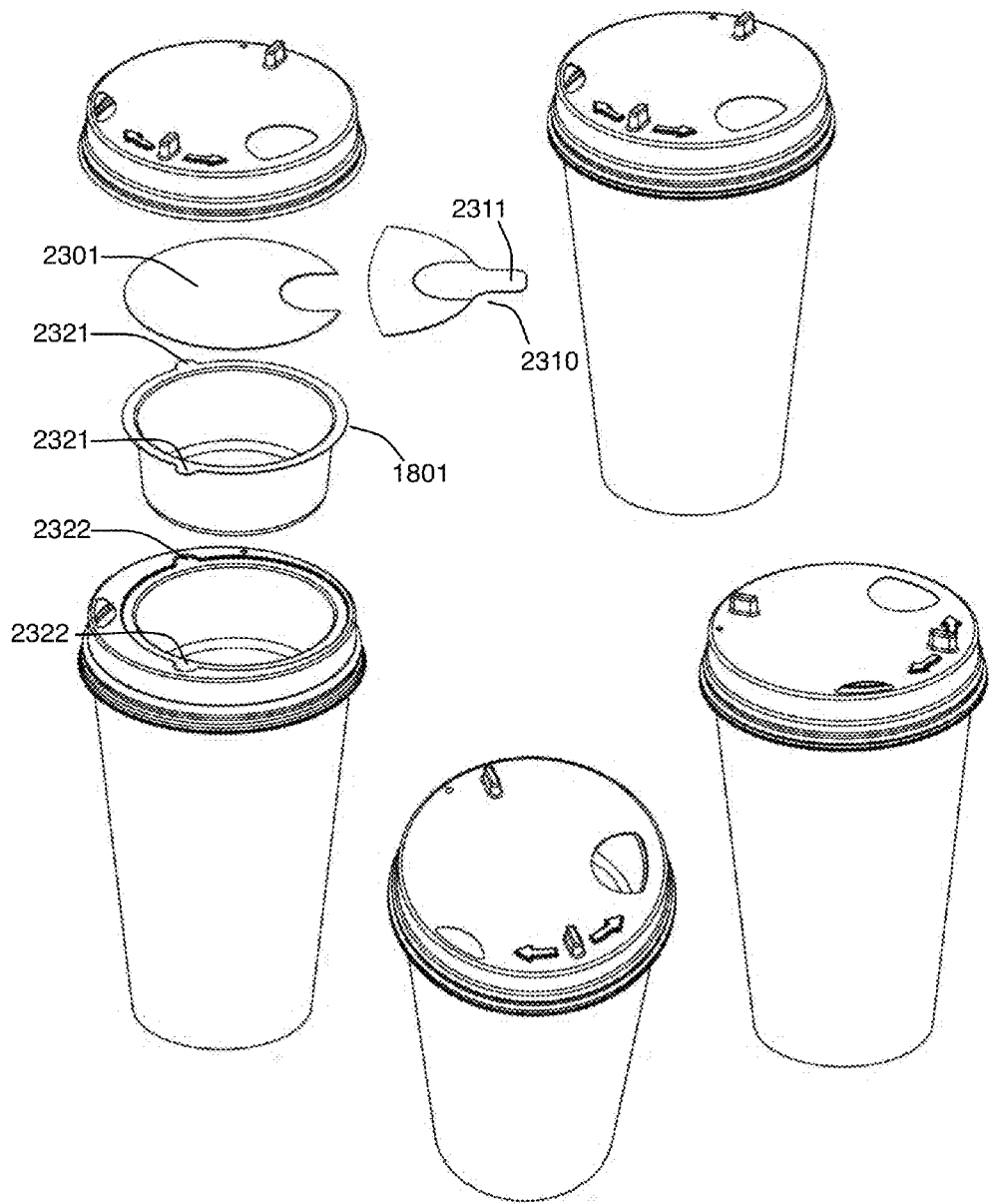
FIG. 23 illustrates a rotational cover with a closeable embodiment of the invention with a medium size opening to enable access of the contents of the container by lifting and pouring the contents into the mouth of a user wherein the container may be in the form of an independent drop-in/ removable seal-on/peel-off unit, which may be optionally scored and may be foil or any singular or plural combination of materials.

FIG. 23 illustrates a rotational cover with a closeable embodiment of the invention with a medium size opening to enable access of the contents of the container by lifting and pouring the contents into the mouth wherein both contents and container may be in the form of a sealed drop-in/removable unit, optionally with a scored seal-on/peel-off cover made from foil or any other material or combination of materials. One or more embodiments of the invention may include one or more alignment tabs 2321 that fit within alignment slots 2322 to keep the independent drop-in/removable container 1801 from rotating.

Embodiments of the invention may utilize seal-on/peel-off cover 2301 and press-on friction covers (not shown but which are known to close a container that has been opened by pressing the cover onto an open container) alone or in combination as desired for the intended application. As shown, seal-on/peel-off cover 2301 may include a score line 2310 and tab 2311, wherein once tab 2311 is removed along the score line, the contents of container 1801 may be accessed. A portion of the closed cover is shown with reference characters 2310 and 2311, while the full cover albeit with the open portion is shown to the left of the partial view. In one or more embodiments of the invention the entire cover of container 1801 may be removed via a tab or in any other manner.

FIG. 24 illustrates a rotational/hinge lid/cover configured for example to hold a cookie or other item and configured with grasp tabs or posts and optional snap open element 2402 and snap close element 2401. These may be configured as optional bumps that enable the hinge lid to snap open and shut respectively. Without bumps the hinge lid may stay secure in the closed position via press-on friction systems of engagement for example. Grasp tabs 2403 enable the hinge lid/cover to be opened and optional cut-outs 2404 for example enable easy extraction of a food item from within the cup lid cavity. As shown, a cookie for example is held within the cup lid. The top of the cup lid rotates to open position 2410 and closed position 2411. Embodiments may hold one or more cookies, doughnut(s) or muffin(s) for example. The hinge may be formed in any manner including double score lines or through use of any other element.

FIG. 25 illustrates the embodiment of FIG. 24 with the cover off and showing a food item, for example the cookie shown between the cover and the cup lid and optional indented cut-outs 2404 for lifting the food item for example. The hinge lid/cover may have a longer vertical sidewall and clip to the lower ridge 107 that attaches to the cup rim, as well as ridge 121. Optional vacuum release air holes may be located anywhere in embodiments of the invention, as shown on the right side of the cup lid, 100*t* for example. 2405 shows an optional raised male post that includes an optional small raised bump on the inside wall that faces the cup lid cavity. This male post and bump ridge allow the hinge lid/cover to click into place while in the open position.

FIG. 26 illustrates an embodiment for example as shown in FIGS. 24 and 25 with a straw hole and top cover, which is non-rotational in one or more embodiments. Bump(s) may be located at 2401 to enable the hinge lid to click shut for example.

FIG. 27 illustrates the embodiment of FIG. 26 in further detail.

FIG. 28 illustrates an embodiment with an optional seal-on/peel-off cover 110b and non-rotational cover that may be configured to click open for example. Sip/gulp size opening 2803 is shown along with non-rotational element(s) 2801a and 2801b and optional seal-on/peel-off cover 110b.

FIG. 29 illustrates an embodiment of FIG. 28 with a straw hole at enlarged area 2901. In one or more embodiments of the invention, the container volume is as deep at 2902 as desired for the particular food item(s) that are to be held. The crescent shaped inward indentation 2903 in the vertical sidewall of the cup lid container provides ample room for a straw to move freely within the lower main cup cavity without being constricted by the vertical side walls of the lower main cup and cup lid cavity.

FIG. 30 illustrates an embodiment configured for independent drop-in/removable container 1801b. As shown on the right side of the figure, exploded view 3001 shows the hinge lid/cover, seal-on/peel-off cover, container, cup lid and cup vertically oriented from top to bottom along with integrated view 3003.

FIG. 31 illustrates an embodiment of FIG. 30 in further detail. As shown, the independent drop-in/removable container 1801b is held in place by being sandwiched between the bottom cup lid 3103 and the top hinge lid/cover 3101. Top hinge lid/cover 3101 overlaps the rim edges of the independent drop-in/removable container 1801b such that the container cannot exit the cavity, for example. Also shown in great detail is bump 3104 that enables the hinge lid to snap open, for example.

FIG. 32 illustrates an embodiment of FIG. 30 with a straw hole. The crescent shaped inward indentation 2903a in the vertical sidewalls of the independent drop-in container and the cup lid container provide ample room for a straw to move freely within the lower main cup cavity without being constricted by the vertical side walls of the main cup and the vertical sidewalls of the inwardly located adjacent containers.

FIG. 33 illustrates an embodiment having a round off center volume to hold an optional cup/arm rest independent drop-in/removable container 1801c and a straw hole and optional container cover 3302 configured to fit under the bottom of the large cup and also on top of the cup/arm rest independent drop-in/removable container as well. A seal-on/peel-off cover may optionally be applied directly to the cup lid with cavity in place of using a cup/arm rest independent drop-in removable container. Recesses 3303 may be of any depth, and may be optionally employed to enable container 1801 to be removed from the cup lid. These are shown at the bottom left configuration as two diagonally opposed slots. The upper right portion of the figure shows the optional drop-in container with seal-on/peel-off cover configured within the cup lid cavity in cutaway view. Although not shown for brevity, the optional drop-in container may have a medium-sized (for nuts and candy) score line (laser or any other method) in the seal-on/peel-off cover. The score line aligns with the removal tab located at the outside edge of the cover. When the drop-in container is removed from the lid cavity and the tab with medium-sized cover portion is removed, then the container may be lifted to the mouth, and a small amount of the contents may be shaken into the mouth, while the majority of the contents are retained within the container by the remaining cover material.

FIG. 34 illustrates the embodiment of FIG. 33 in greater detail. As shown in the closed orientation, lid 3402 is situated on top of the cup/arm rest independent drop-in/removable container to enable the container to be closed and taken home for example. The diameter of the cup/arm rest independent drop-in/removable container is configured to have a diameter as shown at 3401 that enables the arm rest independent drop-in/removable container to fit within the hole of an arm rest that is part of a seat in a theater or stadium for example. Cover 3402 may be held to the bottom of the large cup and top of the independent drop-in container via friction or in any other manner for example. Cover 3402 may also be held to the bottom of the independent drop-in/removable container via male-female counterparts as shown for example or in any other manner.

FIG. 35 illustrates the cup/arm rest independent drop-in/removable container in an armrest hole and shown in the bottom portion of the figure above the arm rest. Cup/arm rest independent drop-in/removable container with seal-on/peel-off cover 110b is shown in arm rest 3501. Container 1801c is shown without the seal-on/peel-off cover while in the hole of the arm rest in the middle configuration. Container 1801c may be closed with cover 3402 and removed from the arm rest and taken home for example.

FIG. 36 illustrates a lower perspective view of the cup/arm rest independent drop-in/removable container 1801c with container cover 3402 also configured to fit the bottom of the cup/arm rest independent drop-in/removable container on the bottom and top of the container. Cover 3402 may also be held to the bottom of the cup/arm rest independent container via male/female counterparts as shown for example or by friction or any other mechanism or method.

FIG. 37 illustrates an embodiment of the invention 3700 for use in an armrest for example wherein the primary clip-on top cover 3701 includes a secondary flap-style lid 3702 with a curved-sided opening. This embodiment enables use in a movie theater or stadium seat 3501 for example to minimize the potential for contact with the open lid 3702 and also enables the independent drop-in container 3750 to be placed in the armrest hole (see FIG. 46), as well as the cup. Embodiments may utilize flap style lids to provide convenient access to items in the container. Specifically, one or more embodiments of the invention enable a primary clip-on top cover 3701 with an integrated secondary flap-style lid 3702 configured within the top horizontal surface of the primary top cover where additionally the flap-style lid intersects and cuts through the outer diameter edge of the top primary cover at 3703 for example. The straight score-line hinge 3704 of integrated flap-style lid may be located anywhere in the top horizontal surface of the primary cover however in one embodiment, the location is proximal to the diagonal midpoint of the primary top cover as shown. The sides 3705 of the flap-style lid that cut through the top horizontal surface and outer diameter of the primary cover may be curved or straight, while the front leading edge 3706 of flap-style lid is substantially arched to match the outside diameter of the primary top lid. FIG. 38 illustrates an embodiment of the flap-style lid with a straight-sided opening. The downward vertical clip-on lip 3707 of the top primary cover does not extend between the two points where the flap-style lid intersects with the outer diameter of the primary cover, at location 3708 in one embodiment, i.e., roughly between elements 3707 and 3703 when the flap-style lid is closed. FIG. 39 illustrates a top perspective view of a closed and open flap-style lid.

In one or more embodiments, a singular half-circular shaped lift tab 3709 at mid-point of the front leading edge of the integrated flap-style lid. The half circular shaped lift tab may include a strength rib 3710 on the bottom side that follows the outer diameter of the lift tab. Additionally the strength rib has rounded edges that add comfort for the user. Below the lift tab (at the back edge of the lift tab) there is a downward vertical wall clip-on element 3711 for securing the flap-style lid to the container lip edge located directly below. There are two small half circular tabs 3712, one located at each side of the curved front leading edge of the flip-style lid. These tabs match the directional/alignment tabs 3713 integrated into the container lip that is located directly below, and additionally act as visual aids for orienting of the top primary cover.

In one or more embodiments, a lid clip-on element 3714 is located centrally on the top horizontal surface of the integrated flap-style lid. This holds the flap-style lid in the open position by securing it to the primary cover via the clip-on element that clips into a small clip-on trough (see FIG. 43) that is located in the outer surface of vertical wall that forms the lip of the primary cover. There is a slant-wall receiving edge 4302 as is shown in FIG. 43, integrated into the bottom portion of the downward vertical clip-on lip of the primary cover. The slant-wall slants diagonally downward and outward from the interior lip wall and allows the primary cover to be easily attached to the container to lip edge.

FIG. 40 illustrates an embodiment of the invention with independent drop-in container 3750 with an optional seal-on/peal-off layer in exploded view. Embodiments of the invention may employ an optional Seal-On/Peal-Off Layer 4001. The optional Seal-On/Peal Off layer may include a removal tab 4002, and in one or more embodiments, additionally there is a laser or die scored shape that directly corresponds with the shape of the opening of the flap-style lid, which is not shown for brevity having already been described and illustrated in other embodiments herein. FIG. 41 illustrates an embodiment of the independent drop-in container with and without the optional seal-on/peal-off layer. FIG. 42 illustrates an embodiment of the flap-style lid with a curved-sided opening attached to the drop-in container and removed from the drop-in container. FIG. 43 illustrates an embodiment of the primary cover clip-on element and secondary flap-style lid clip-on element configured to hold the flap-style lid open and closed with respect to the primary cover in perspective and close up views. FIG. 44 illustrates an embodiment of the drop-in container with laser scored 4403 seal-on/peal-off layer having removable portion 4001a. Also shown in the bottom corner of the container there is a portion that is removed or notched around the entire diameter and also shown from a top and side perspective is a slant wall integrated into the bottom of the drop-in container. Referring to FIGS. 40-44, a half-round vertical wall alignment trough/indent 4051 shown in a side portion of the container, can also be made in the bottom horizontal surface of the container if desired. One or more embodiments of the invention may include directional/alignment tabs 3713 that project outward from the container top lip edge to allow for only one way in which to attach the primary cover. The flared opening 4052 at the top portion of the independent drop in container provides a small horizontal shelf in the vertical side wall of the container which elevates the top edge of the container from the top surface of the lower cup lid and arm rest, such that a space is provided wherein finger tips can reach under and lift the container from within the item in which it has been placed. An optional indent 4410 as shown in FIG. 44 may be removed from the bottom circular corner edge of the independent drop in container such that the upward projecting clip-on element of the flap-style lid is prevented from interfering with the bottom of an additional independent drop-in container as it is stacked upon the original container. This enables shipping or allows the independent drop-in container to be sold separately. The independent drop-in container may have an optionally slanted interior bottom wall 4401 that causes round shaped food items to roll or shift to the open side of the container thus reloading or replacing food items as they are scoped from the open half of the container. The optional slanted bottom wall of the container may occur at an interior location in relation to the outer vertical wall of the container. Small circular posts 4402 (drafted from top to bottom horizontal wall) that are each spaced 120 degrees from each other for example may project downward from the slanted bottom wall of the container such that primarily of the longer legs compensate for the maximum upward height of the slant wall and provide support so the top of the container and rest of the container remain level while the container is placed or stacked upon other horizontal surfaces. The optional outer bottom corner indent and bottom slant wall may occur alone in the container bottom while the cup lid cavity bottom wall that is below remains flat, or additionally the cup lid cavity bottom wall that is below may conform to the above features such that these dual components mate.

Embodiments of the invention may utilize a lower cup lid 100g that includes an interior vertical wall half-round alignment trough or indent 4051a. The alignment indent can optionally be placed in the bottom horizontal surface of the container and lower cup lid. The lower cup lid has a low profile cylindrical shaped projection 4061a that extends outward from the exterior vertical wall while additionally there is a corresponding top horizontal surface 4062 as shown in FIG. 40 above the low profile cylinder that specifically provides a surface area location for a straw hole 4061. FIG. 45 illustrates an embodiment of the container residing on a cup that may still be accessed via the straw and where the drop-in container (due to ample finger space) may be easily lifted from the lower cup lid.

Additionally as a result of the flap-style lid having a straight score-line hinge located at the diagonal midpoint of the primary cover, this means that when the flap-style lid is in the open position, the open half of the lid folds back over the back half of the lid such that the majority of the two halves overlap, which leaves only a small portion of the open half of the lid overhanging past the outer diameter edge of the primary cover (see FIG. 47, element 4701, which shows the any overhanging portion that is minimized with respect to the armrest in one or more embodiments). In movie theaters it is important that lids do not substantially overhang past the outer diameter of the cup rim or primary cover, because in these environments people are coming and going and space is tight and limited such that possibility of bumping into overhanging lids is magnified or increased. FIG. 46 illustrates the container residing in and out of an armrest. The flap-style lid enables the drop in container to be reclosed and then removed from the movie theater cup or arm rest and put a jacket pocket or purse where at a later time the container may be removed again and placed in a car cup holder or any other desired location. FIG. 47 illustrates a top perspective of the drop-in container with the secondary flip lid in the open position while in an armrest and a cross-section of the drop-in container and primary top cover where there is ample finger space to lift and remove the drop-in container from the armrest. By placing the hinge in a particular location and with an armrest having a hole with an outer portion of a given thickness, when the flap-style lid is open, the lid may approximate or not exceed the outer bounds of the armrest as is shown from above at 4701 for example. Movie theater cups are large, oversized and clumsy for most outdoor activities. Thus, by resizing the cup to a standard size soda or drink cup additional venues such as fairs and amusement parks may be accessed. To the cup, the mid-portion of the cup may be made to fit the average size hand while the top portion of the cup may flair outward toward a wide top opening, (see FIG. 19 cup 130*a*). At the midpoint in the vertical wall where the top portion begins to flair outward, this point may be utilized to determine a fill-line for the beverage that will be poured into the cup. Flaring the top portion of the cup outward means the drop-in container may retain its original large movie theater container size. A large diameter drop-in container is paramount for marketing and sales where it is important to project a visual image of a large amount of candy or snacks within the container. Similar strategies are currently used in movie theaters where large candy boxes are used to project the idea of a large amount of candy.

Although not shown for brevity, there may be an optional integrated tab with a centrally located hole that extends from the outside diameter edge (at any location) of the seal-on/peal-off layer or primary clip-on top cover that may act as a hang tab for the drop-in container as it is hung from a post, peg, or wire as part of a point of purchase display.

In relation to the movie theater embodiment of the invention, either the primary top cover, drop in container, or lower cup lid may be made from FDA approved glow in the dark plastic. Additionally all three of the components listed above may be made from this specialty material. If only one component such as the lower cup lid for example is made from glow in the dark plastic, then when the theater is dark a glowing ring will appear around the drop-in container.

Other embodiments of the invention that may be utilized in armrests are shown in FIGS. 48-52. As shown in FIG. 48*a*

Any embodiment of cup described herein may be made or include any material including but not limited to paper, plastic, hard molded plastic, ceramic, metal, stainless steel, and may utilize any type of optional seal such as silicon for example between the cup and the cup lid. Additionally, if the cup and cup lid with integrated cavity are made of hard non-flexible plastic for example, the secondary lid, which covers the integrated cavity, may be made entirely from molded silicon of various hardness. Embodiments employing hard plastic may utilize an insulative double wall construction in the vertical sidewalls and/or bottom of the lower main cup as desired per application.

Embodiments of the invention may be utilized with the BOTTOMS-UP™ draft beer dispensing system that fills beers from the bottom of the cup, or with any other dispensing system. Embodiments of the invention may be utilized with INSULAIR™ insulated cups or any other insulated cup.

While the invention herein disclosed has been described by means of specific embodiments and applications thereof, numerous modifications and variations could be made thereto by those skilled in the art without departing from the scope of the invention set forth in the claims. Various configurations of the invention have been shown, each containing individual embodiments. For the sake of brevity and repetition not all embodiments have been mentioned in every configuration. The embodiments described herein may implement or combine any features from any other embodiment and as such any new configuration/embodiment combination, which arises from embodiments herein, is in keeping with the spirit of the invention.

What is claimed is:

1. A cup lid with integrated container comprising:
a container configured with a substantially flat bottom having a diameter of at least 1.75 inches and configured to store a first solid or a liquid separate from a second solid or liquid stored in a cup wherein said cup comprises an annular opening that lies in a plane on top of said cup wherein said container comprises a container coupling element on a bottom portion of said container;
a cover configured to enclose said container;
at least one wall configured with a substantially flat bottom having a diameter of at least 1.75 inches wherein a bottom portion of said at least one wall is configured to contact said second solid or liquid;
said at least one wall comprising a coupling element configured to couple said at least one wall to said annular opening on top of said cup wherein said at least one wall comprises a second coupling element to temporarily couple with said container coupling element to couple said container to said at least one wall, wherein said second coupling element is complimentary to said container coupling element, and wherein said container coupling element and second coupling element are configured with a particular size that enables any size container to couple with said at least one wall;
said at least one wall configured to enable access of said first solid or liquid and said second solid or liquid without disengagement of said coupling element from said cup;
said at least one wall comprising a hole configured to enable access of said second solid or liquid stored in said cup with or without disengagement of said second coupling element and wherein said hole is configured at an outer portion of said at least one wall proximal to an outer wall of said cup wherein said hole is not located within said container where said first solid or liquid is stored;
a hinge;
said cover coupled with said hinge wherein said hinge is coupled with said container and configured to enclose said container wherein said cover is configured to optionally fixedly snap open or closed to enable and disable access to said first solid or liquid respectively.

2. The cup lid with integrated container of claim 1 wherein said container comprises at least one half circle vertically oriented posts that employ open or closed wall coupling at a front lip edge and where additionally said at least one half circle vertically oriented posts optionally include a vertically oriented snap bump ridge or ridges at a top front curved edge and wherein said at least one half circle vertically oriented posts and optional vertically oriented snap bump ridge or ridges are configured to snap into at least one corresponding female indents that employ open or closed wall coupling and optional snap bump ridge troughs at front lip edge of said container.

3. The cup lid with integrated container of claim 2 further comprising at least one strength trough at a base of said at least one half circle vertically oriented posts and wherein said at least one strength trough intersect a vertical wall of the container at a perpendicular angle.

4. The cup lid with integrated container of claim 2 further comprising a male tension bar or ridge at an outer portion of said container that mates with a corresponding female indentation located at an outer portion of said cover, and wherein said tension bar or ridge mating components are located to the inside of and parallel to the hinge.

5. The cup lid with integrated container of claim 1 wherein said cover employs at least one male posts adjacent to the hinge that utilize friction and couple or snap into at least one corresponding female indentations located at an outer edge of said at least one wall.

6. The cup lid with integrated container of claim 1 wherein said cover comprises a downward oriented indent at an outer location adjacent to said hinge that is configured as a support bracket for said hinge and wherein said downward oriented indent is configured to touch or leverage against an outer portion of said at least one wall and wherein said downward oriented indent is optionally intersected by a perpendicular downwardly indented strength rib.

7. The cup lid with integrated container of claim 5 wherein said hinge folds back upon itself such that when said at least one male post and female indentations are mated or snapped together and the cover is in a closed position, a portion of the cover folds back upon itself and furthermore resides over the location of said at least one male post and female indentations.

8. The cup lid with integrated container of claim 1 wherein said container employs one or two grasp tabs at a front lip edge to disengage and lift the cover from the container and wherein said one or two grasp tabs optionally employ a narrow straight upwardly indented strength rib that perpendicularly intersects an upward indented female coupling indent at a front lip edge of the container.

9. The cup lid with integrated container of claim 1 wherein said hinge comprises one or more pivot points that are located outside of an outer diameter of said annular opening that lies in said plane on top of said cup.

10. The cup lid with integrated container of claim 1 wherein said cover in an open position, hangs vertically downward.

11. The cup lid with integrated container of claim 1 wherein said cover comprises a clamshell, seal-on/peel-off, external and/or internal wall friction press-on, press-on friction dome configured with a second hole to allow access via a fork, spoon or straw, rotational, hinge, hinge coupled via adhesive, or any combination thereof wherein said cover optionally comprises at least one optional score line configured to enable a portion of said cover to be removed and wherein said cover, container, said at least one wall, comprise paper, plastic, hard molded plastic, ceramic, metal, or silicon or any combination thereof.

12. The cup lid with integrated container of claim 1, wherein said container, cover or at least one wall or any combination thereof comprises a glow in the dark material and/or a thermochromic plastic configured to change color based on a temperature of said first solid or liquid and/or wherein said container, cover or at least one wall or any combination thereof comprises graphic symbols, arrows or lettering or both graphic symbols and lettering of visual or tactile form or logos, advertisements, puzzles, bar codes, promotions, trivia or information.

13. The cup lid with integrated container of claim 1, wherein said hole is configured as a sip hole or gulp hole with raised side walls wherein said sip hole or gulp hole is configured to be utilized as a straw and wherein said straw optionally comprises a top horizontal wall comprising said sip hole or gulp hole.

14. The cup lid with integrated container of claim 1, wherein said hinge is configured as an axle, tooth and hook, pivot, double pivot, trough, score line or double score line.

15. The cup lid with integrated container of claim 1, wherein said at least one wall comprises strength zones or downward oriented clip-on elements or both in a horizontal or vertical wall of said at least one wall and wherein said downward oriented clip-on elements are configured to provide a secure, tight fit, spill preventative seal of at least one wall to the interior and exterior wall adjacent to the rim of the cup and additionally wherein said strength zones reduce flex in said at least one wall when said container is coupled or decoupled from said at least one wall.

16. The cup lid with integrated container of claim 15, wherein said strength zones and downward oriented clip-on elements in said at least one wall form an extended non-continuous ring that stops on either side of an outer diameter hole in said at least one wall that leads to the second solid or liquid or wherein said strength zones sand downward oriented clip-on elements form an extended continuous ring that bends inwardly in a tight arch around said outer diameter hole in said at least one wall that leads to a second solid or liquid.

17. The cup lid with integrated container of claim 1, wherein said container coupling element and said second coupling element comprise one or more male or female coupling elements that mate or couple utilizing friction in a sturdy but non-permanent fashion to one or more corresponding complimentary female or male coupling elements respectively in said at least one wall.

18. The cup lid with integrated container of claim 17, wherein said one or more male or female coupling elements further employ one or more vertically oriented male snap-on bump ridges or dots or one or more female snap-on bump ridges, troughs, or dot indents.

19. The cup lid with integrated container of claim 17, wherein said one or more male and female coupling elements optionally employ one or more alignment elements configured to rotationally align said container and said cover with respect to said at least one wall that couples to said cup.

20. The cup lid with integrated container of claim 1, wherein the cover comprises an alignment indicator symbol and wherein said at least one wall comprises a corresponding alignment indicator symbol.

21. The cup lid with integrated container of claim 1, wherein said at least one wall comprises a straw trough that employs a tri-bend straw.

22. The cup lid with integrated container of claim 1, wherein the container that couples to the at least one wall that couples to a cup employs a vertically offset coupling element as said container coupling element that projects away from the substantially flat bottom wall of said container;
   wherein said vertically offset coupling element comprises an inner and outer vertical wall such that said vertically offset coupling element is configured as a ring-shaped or segmented ring-shaped projection with a raised inner horizontal bottom wall portion that forms an interior portion of the substantially flat bottom wall of said container,
   wherein an outer horizontal wall portion or curved corner is located outside of the exterior vertical wall of said vertically offset coupling element and wherein a corresponding and complimentary vertically offset coupling element is located in a horizontal wall of said at least one wall that couples to a cup,
   wherein said complimentary vertically offset coupling element optionally comprises an inner portion that conforms to the interior raised wall portion of the vertically offset coupling element of the container, and
   wherein said vertically offset coupling element of said container and said at least one wall optionally employ one or more alignment elements and/or one or more male or female snap-on bump ridges, troughs, indents, or dots at an interior or exterior vertical wall to frictionally couple and or/align said container with said at least one wall that couples to a cup.

23. The cup lid with integrated container of claim 1, wherein said cover comprises at least one post and/or tab configured to lift said cover and wherein said container optionally comprises recessed cut-outs configured to reside under said at least one tab.

24. The cup lid with integrated container of claim 1, wherein said cover comprises at least one post and/or tab that includes a strength rib having a depth offset away from a planar area of said cover wherein said strength rib is configured to align said cover with a corresponding indent in said at least one wall that couples to a cup.

25. The cup lid with integrated container of claim 1, wherein said second coupling element comprises a removable adhesive or a heat or thermal bond, sonic bond, spot weld, epoxy bond, hot melt glue bond, transfer adhesive bond, or double-sided tape bond.

* * * * *